United States Patent [19]
Campbell et al.

[11] Patent Number: 4,768,854
[45] Date of Patent: Sep. 6, 1988

[54] OPTICAL FIBER DISTRIBUTION NETWORK INCLUDING NONDESTRUCTIVE TAPS AND METHOD USING SAME

[75] Inventors: Bruce D. Campbell, Portola Valley; Joseph Zucker, Foster City, both of Calif.

[73] Assignee: Raychem Corp., Menlo Park, Calif.

[21] Appl. No.: 754,035

[22] Filed: Jul. 11, 1985

[51] Int. Cl.[4] .......................... G02B 6/28; H04B 9/00; H01J 5/16; G02F 1/00

[52] U.S. Cl. ......................... 350/96.16; 350/96.15; 350/320; 350/96.33; 250/227; 370/3; 455/610; 455/611; 455/612; 455/617

[58] Field of Search .............. 350/96.10, 96.15, 96.16, 350/96.20, 96.21, 320, 96.33; 250/227; 455/610, 612, 611, 617; 370/1, 3

[56] References Cited

U.S. PATENT DOCUMENTS

| | | | |
|---|---|---|---|
| 3,617,109 | 11/1971 | Tien | 350/96.10 X |
| 3,777,149 | 12/1973 | Marcatili | 250/227 X |
| 3,785,718 | 1/1974 | Gloge | 350/96.30 X |
| 3,801,389 | 4/1974 | Fujimura | 250/227 X |
| 3,909,110 | 9/1975 | Marcuse | 350/96.10 X |
| 3,931,518 | 1/1976 | Miller | 250/227 |
| 3,944,811 | 3/1976 | Midwinter | 350/96.10 X |
| 3,969,016 | 7/1976 | Kaiser et al. | 350/96.10 X |
| 3,982,123 | 9/1976 | Goell et al. | 250/227 |
| 4,072,399 | 2/1978 | Love | 350/96.16 |
| 4,089,584 | 5/1978 | Polczynski | 350/96.16 X |
| 4,125,768 | 11/1978 | Jackson et al. | 250/227 X |
| 4,135,780 | 1/1979 | Dyott | 350/96.15 |
| 4,205,900 | 6/1980 | Eve | 350/96.30 X |
| 4,234,969 | 11/1980 | Singh | 350/96.16 X |
| 4,270,839 | 6/1981 | Cross | 350/96.15 |
| 4,317,614 | 3/1982 | Palmer | 350/96.16 |
| 4,342,907 | 8/1982 | Macedo et al. | 250/227 |
| 4,365,331 | 12/1982 | Biba et al. | 370/124 |
| 4,400,054 | 8/1983 | Biard et al. | 350/96.15 |
| 4,447,124 | 5/1984 | Cohen | 350/96.30 |
| 4,450,554 | 5/1984 | Steensma et al. | 370/3 X |
| 4,511,207 | 4/1985 | Newton et al. | 350/96.16 X |
| 4,557,550 | 12/1985 | Beals et al. | 350/96.16 |
| 4,557,552 | 12/1985 | Newton et al. | 350/96.15 |
| 4,586,783 | 5/1986 | Campbell et al. | 350/96.15 |
| 4,588,255 | 5/1986 | Tur et al. | 350/96.16 |
| 4,645,923 | 2/1987 | De Blok et al. | 250/227 |
| 4,675,521 | 6/1987 | Sugimoto | 350/96.15 X |
| 4,676,584 | 6/1987 | Perlin | 350/96.15 |

FOREIGN PATENT DOCUMENTS

| | | | |
|---|---|---|---|
| 0063954 | 4/1982 | European Pat. Off. | 350/96.20 X |
| 0080829 | 11/1982 | European Pat. Off. | 350/96.16 |
| 0080815 | 6/1983 | European Pat. Off. | 350/96.15 |
| 2064503 | 12/1970 | Fed. Rep. of Germany | 350/96.15 X |
| 52-49040 | 4/1977 | Japan | 350/96.16 X |
| 53-75946 | 7/1978 | Japan | 350/96.18 |
| 54-151455 | 11/1979 | Japan | 350/96.21 |
| 55-29847A | 3/1980 | Japan | 350/96.16 X |
| 1420458 | 3/1974 | United Kingdom | 350/96.15 X |
| 1521778 | 4/1977 | United Kingdom | 350/96.15 X |
| 2126749B | 3/1984 | United Kingdom | 350/96.16 X |

OTHER PUBLICATIONS

Storozum, "Mode Scrambling Can Enhance Fiber-Optic System Performance", Electronics (Feb. 24, 1981), vol. 4, No. 54, pp.163-166.
Bennett, "Extending the Range of Long Wavelength Multimode Optical Fibre Transmission Using Decision Feedback", Session A XII: Systemes(1).
Kapany, "Fiber Optics: Principles and Applications", Academic Press, San Francisco, Calif., c. 1967, pp. 12-17.

Primary Examiner—William L. Sikes
Assistant Examiner—Brian M. Healy
Attorney, Agent, or Firm—Dennis E. Kovach; Herbert G. Burkard

[57] ABSTRACT

An optical fiber distribution network includes nondestructive read taps disposed in series which create extremely small attenuations of an optical signal being tapped, and which increase the bandwidth of an optical fiber being tapped. The network further includes nondestructive write taps disposed in another series which each inject an optical signal into a second optical fiber while inducing minimal attenuation of a pre-existing optical signal in the second fiber.

95 Claims, 25 Drawing Sheets

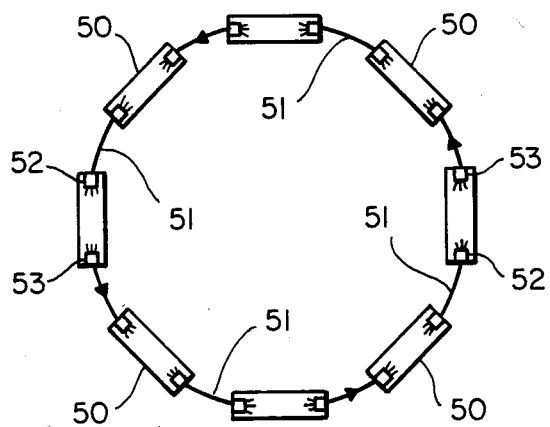
FIG_1
(PRIOR ART)
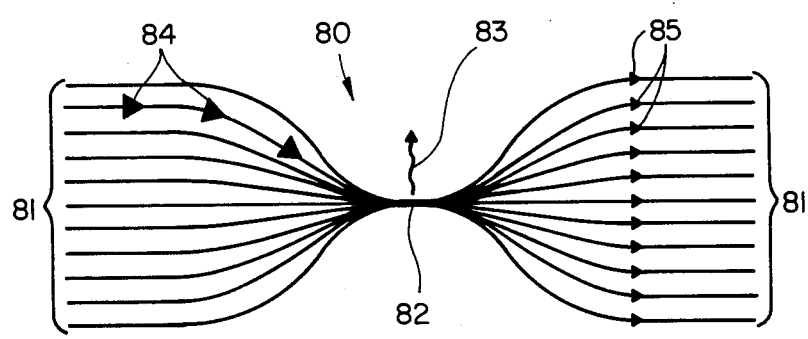
FIG_2
(PRIOR ART)
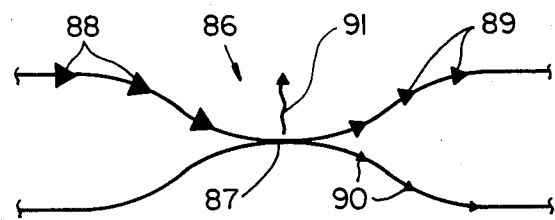
FIG_3
(PRIOR ART)

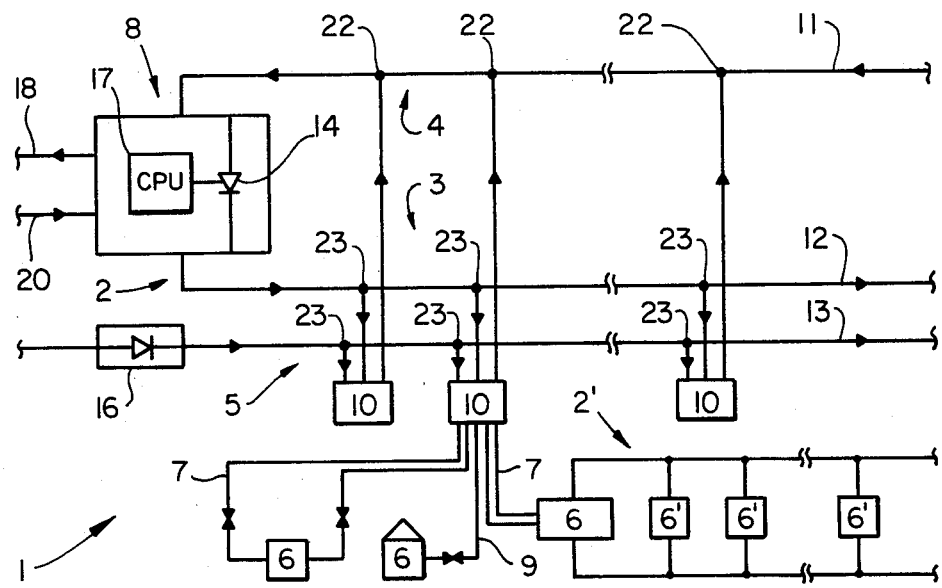
FIG_4
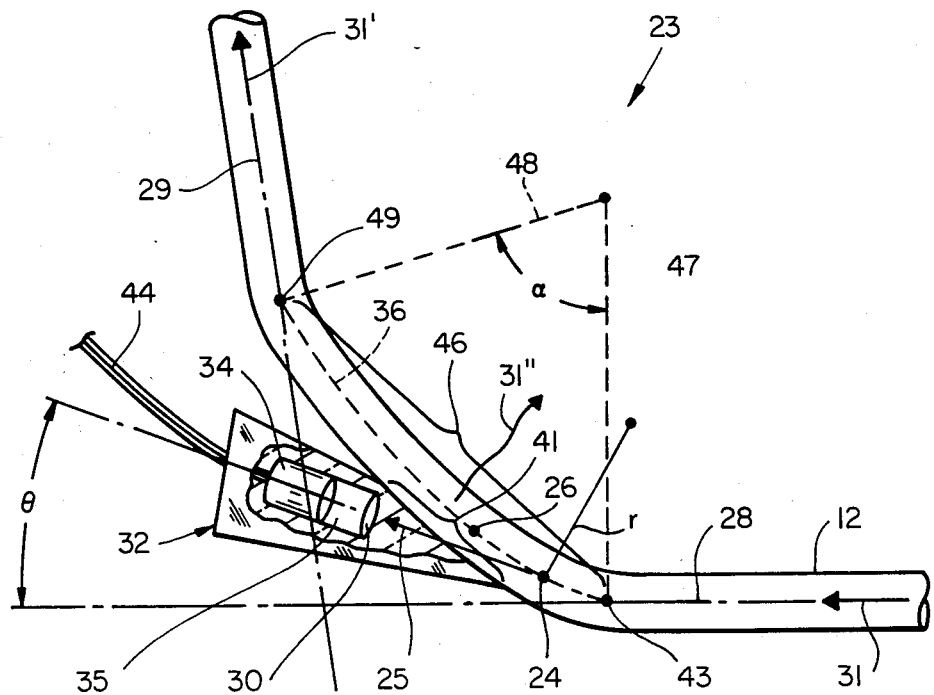
FIG_5

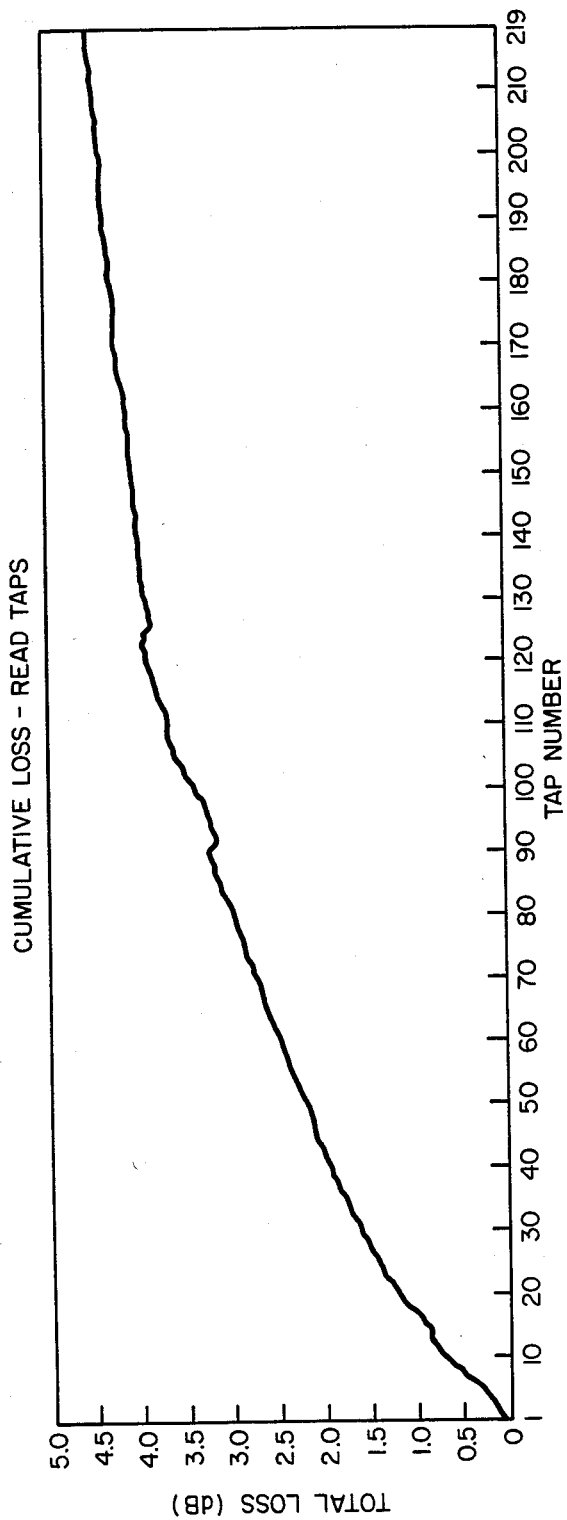
FIG_6

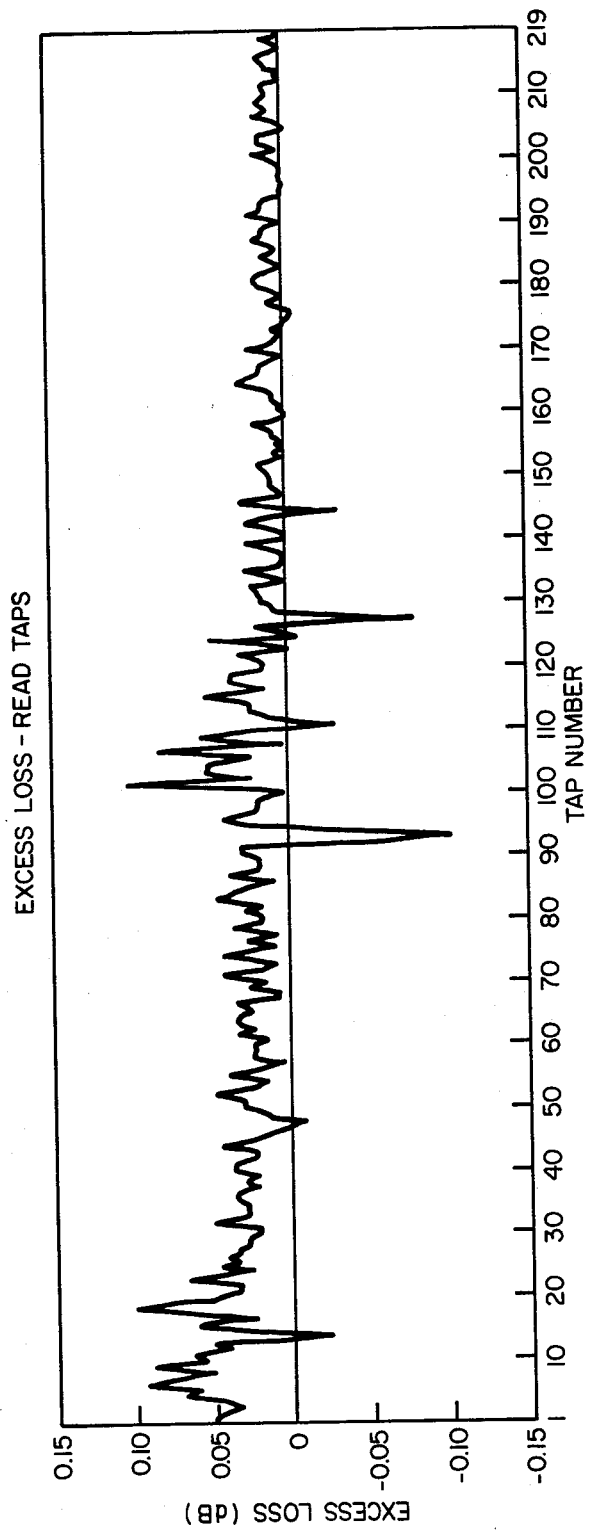
FIG_7

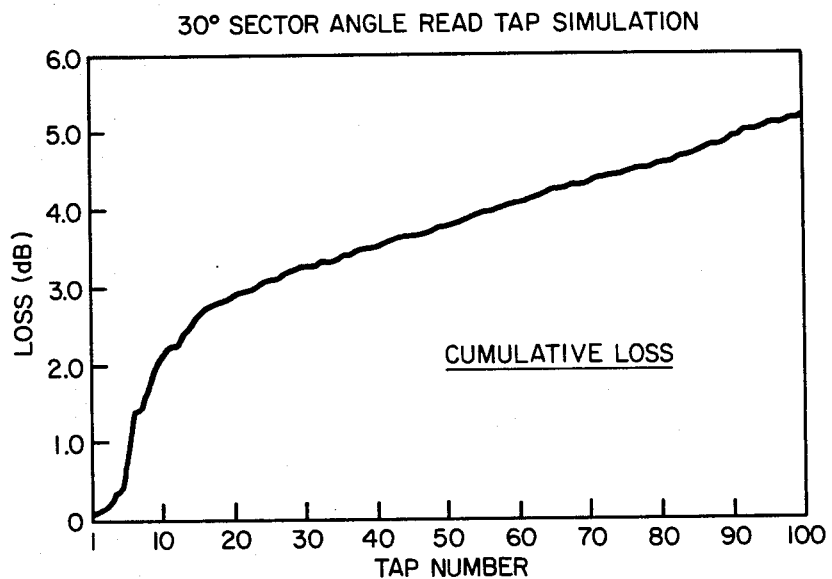
FIG_8
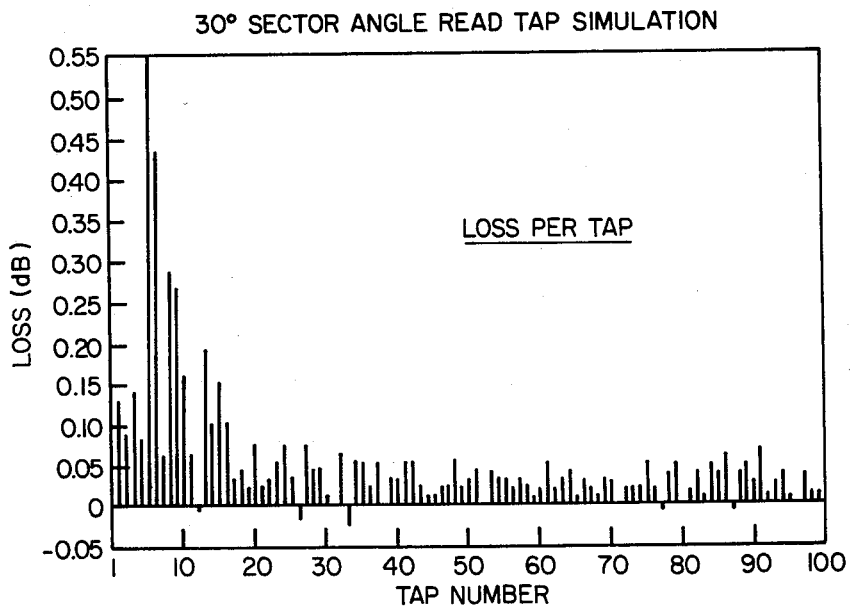
FIG_9

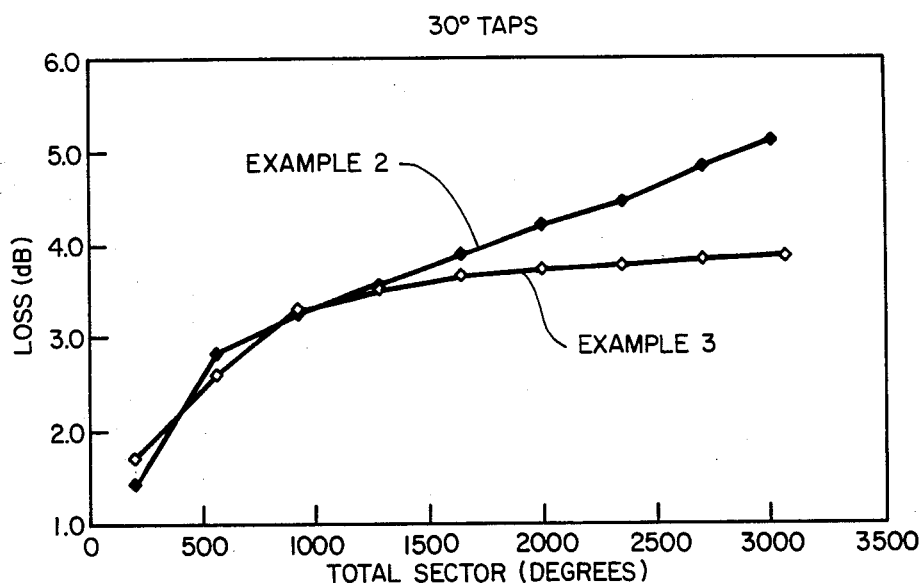
FIG_10
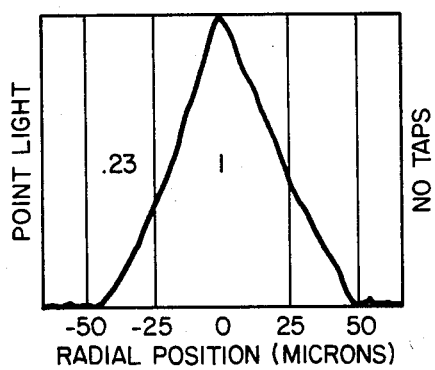 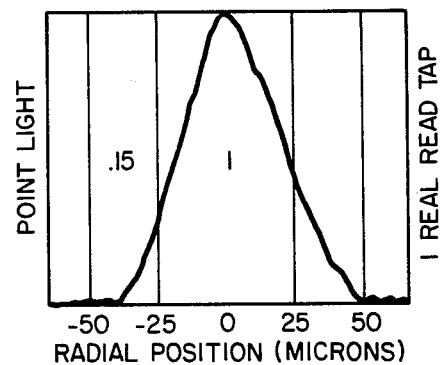
FIG_11  FIG_12

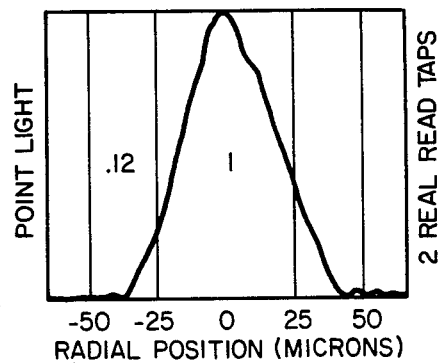
FIG_13
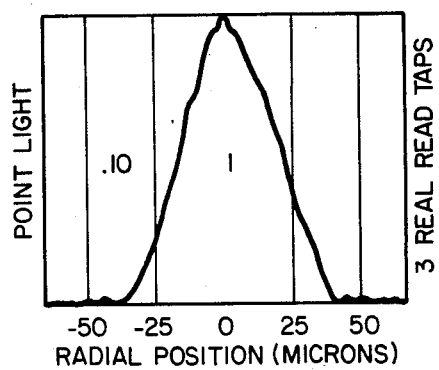
FIG_14
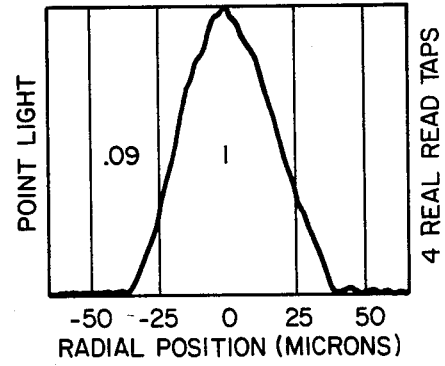
FIG_15
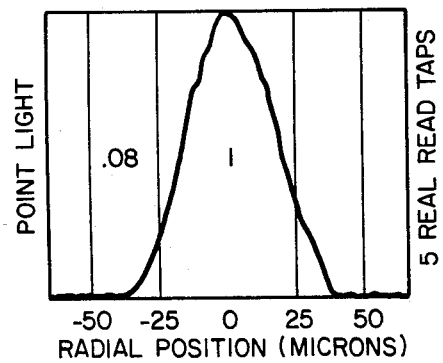
FIG_16
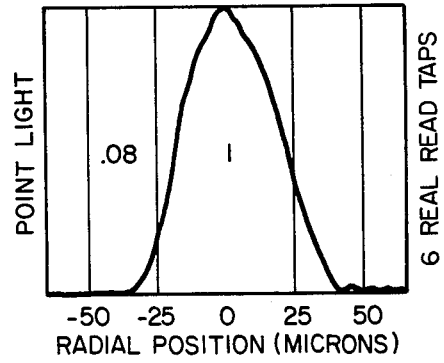
FIG_17

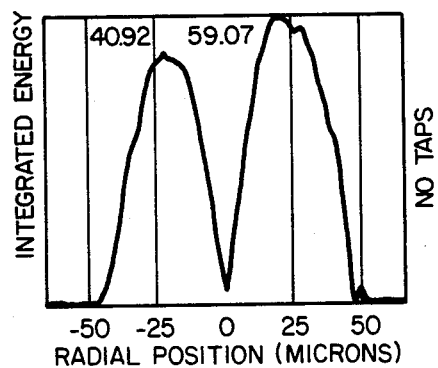
FIG_18
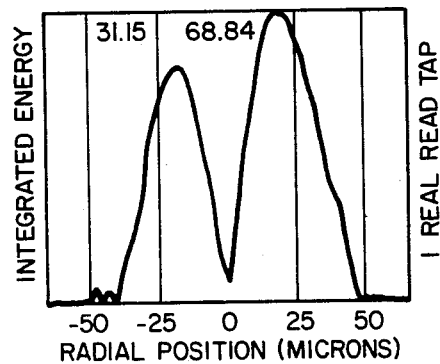
FIG_19
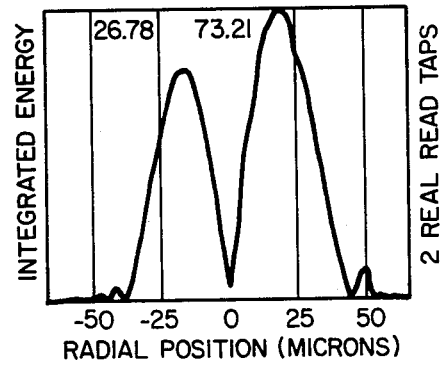
FIG_20
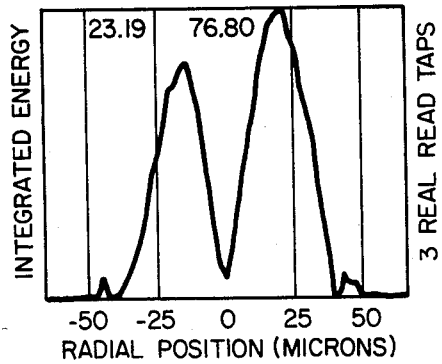
FIG_21
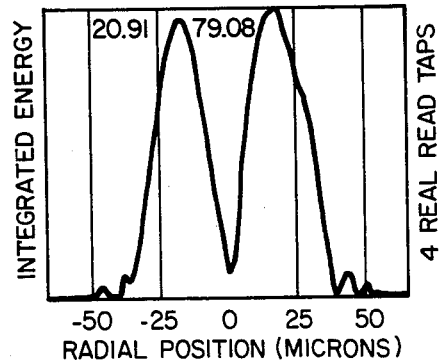
FIG_22

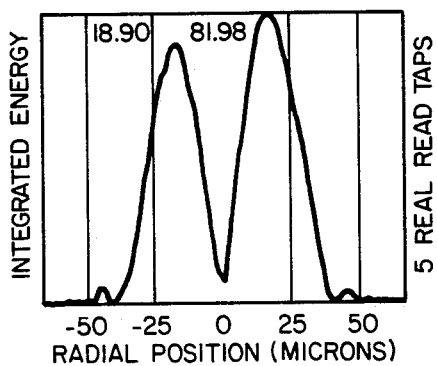
FIG_23
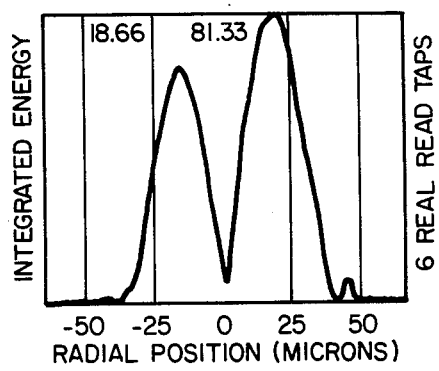
FIG_24
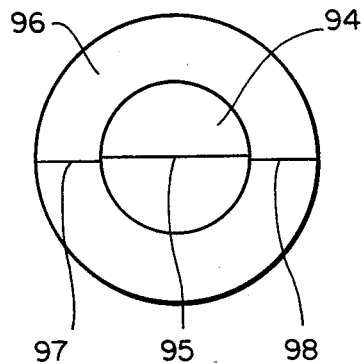
FIG_25
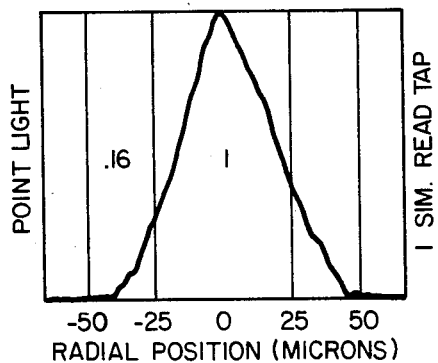
FIG_26
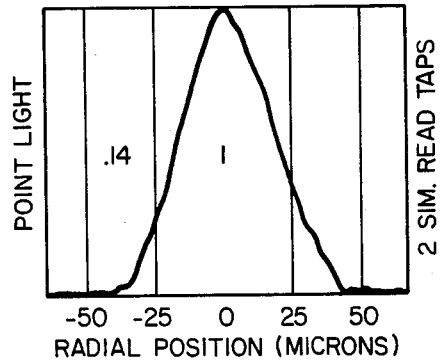
FIG_27

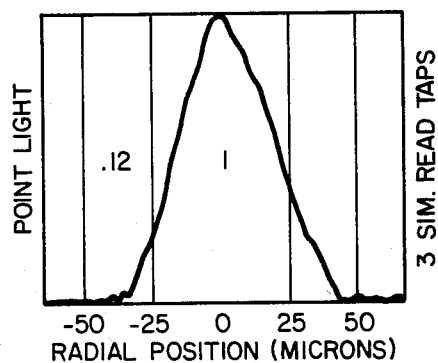
FIG_28
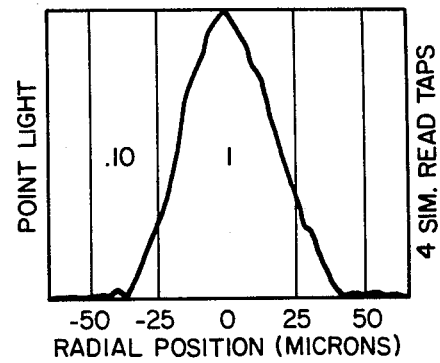
FIG_29
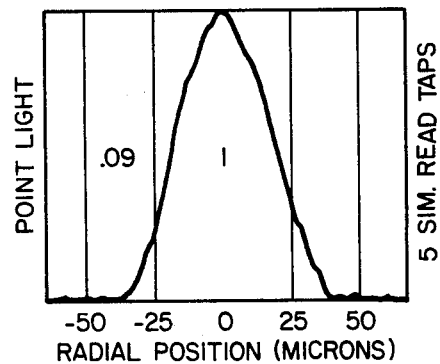
FIG_30
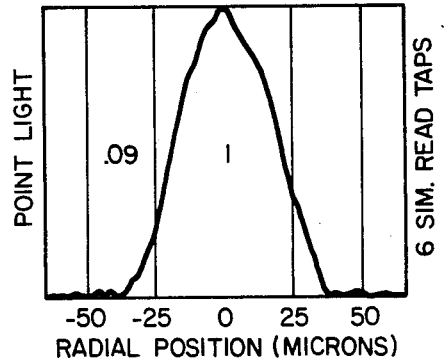
FIG_31
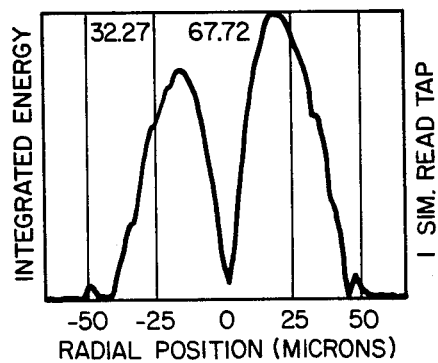
FIG_32

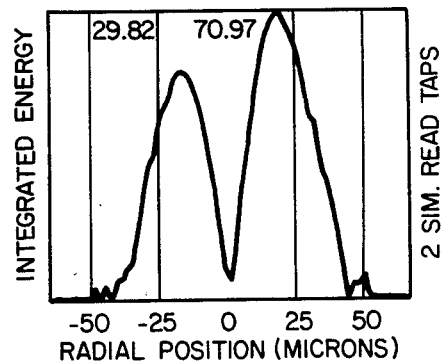
FIG_33
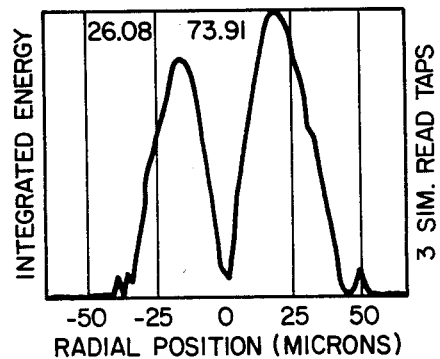
FIG_34
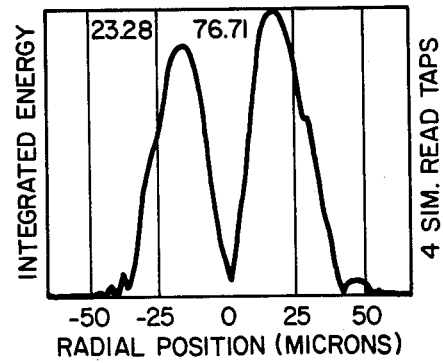
FIG_35
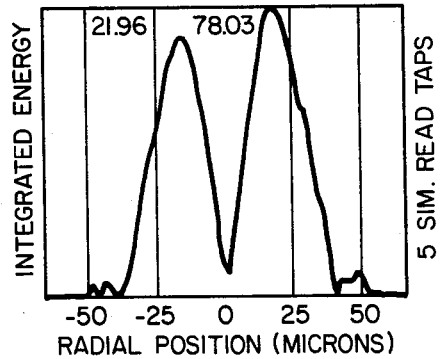
FIG_36
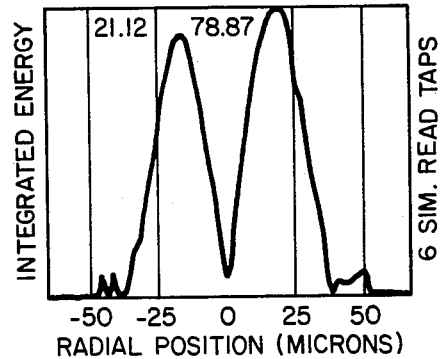
FIG_37

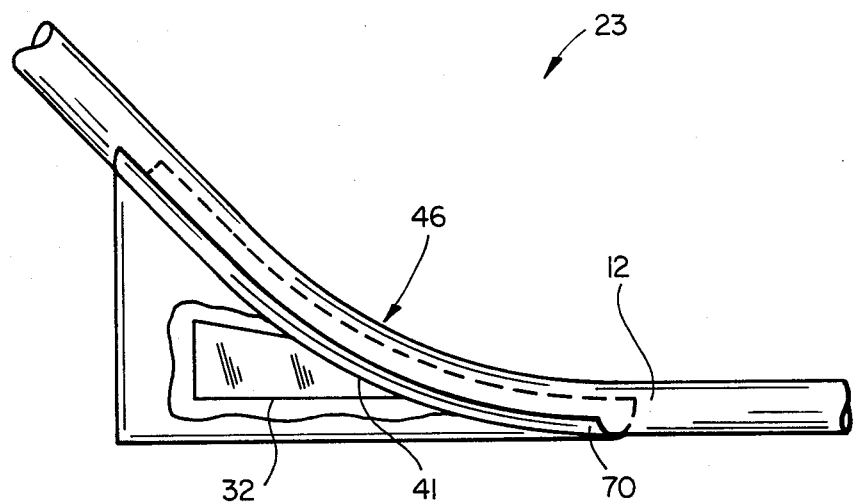
FIG_38
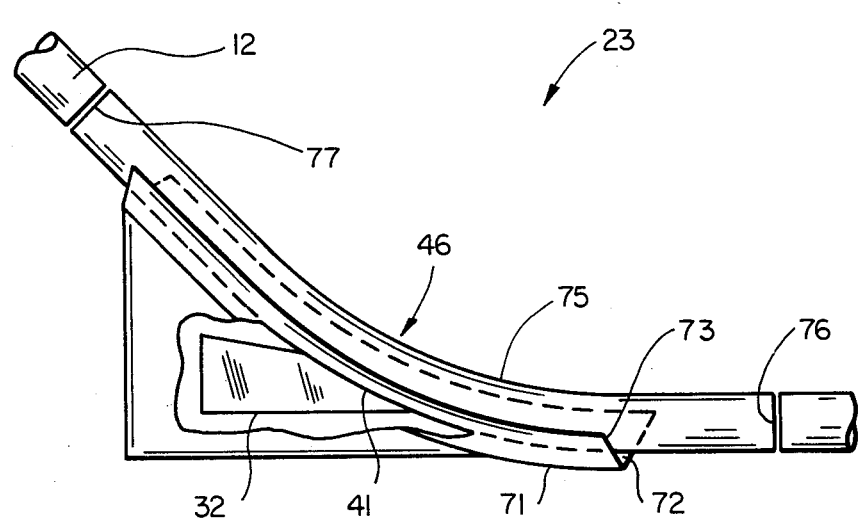
FIG_39

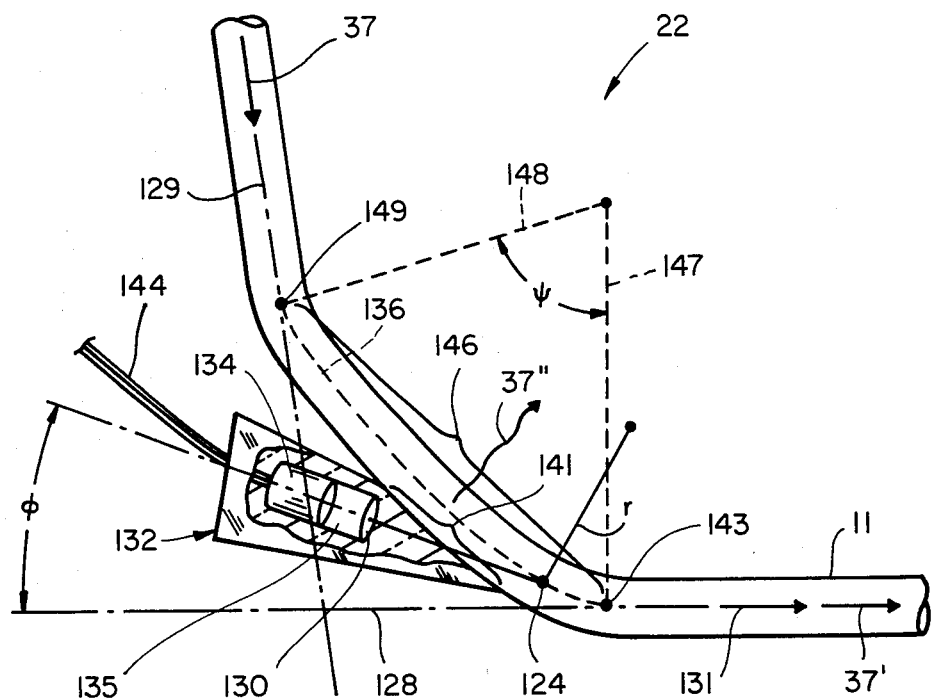
FIG_40
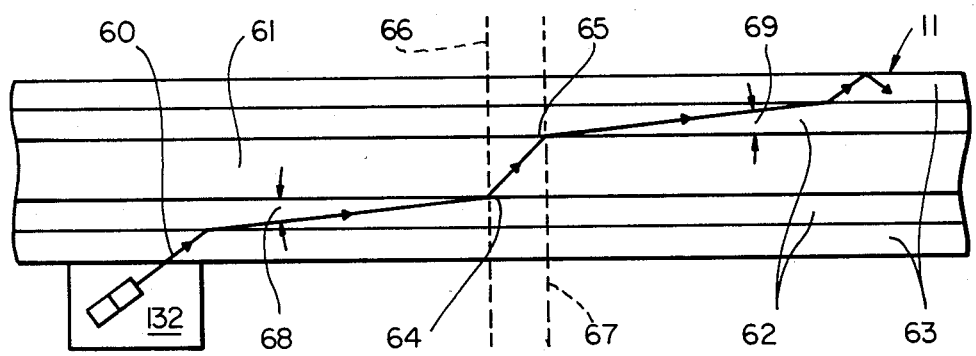
FIG_41

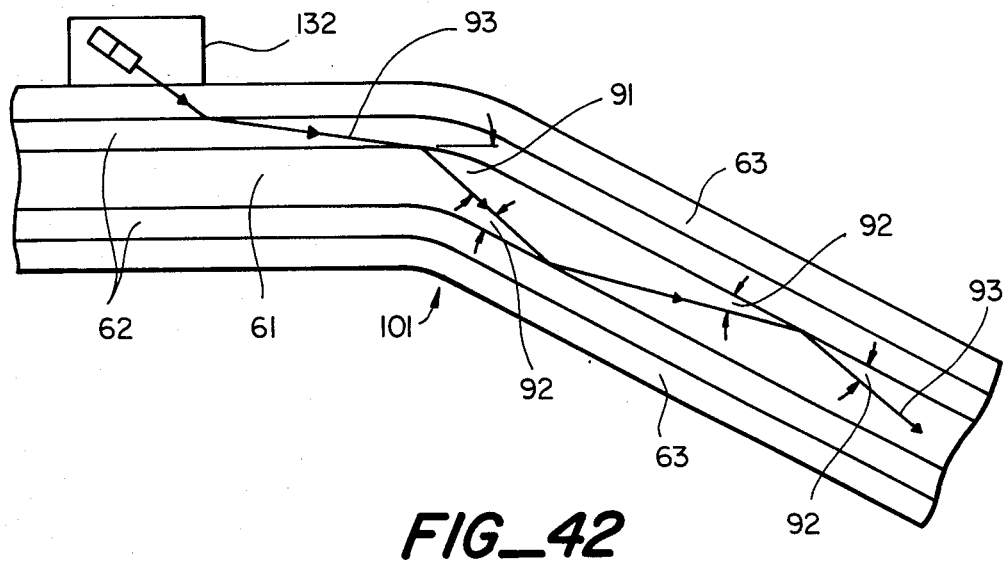
FIG_42
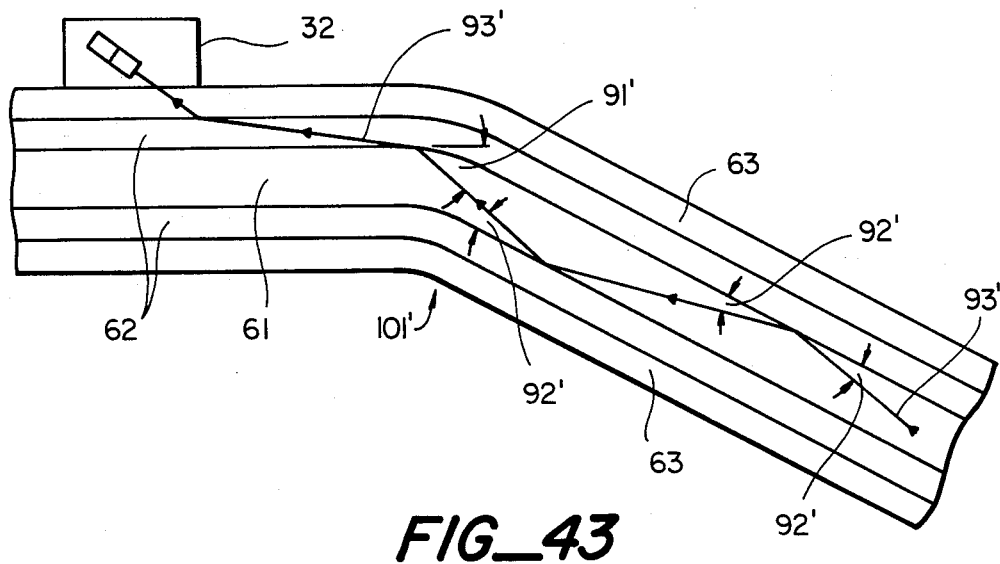
FIG_43

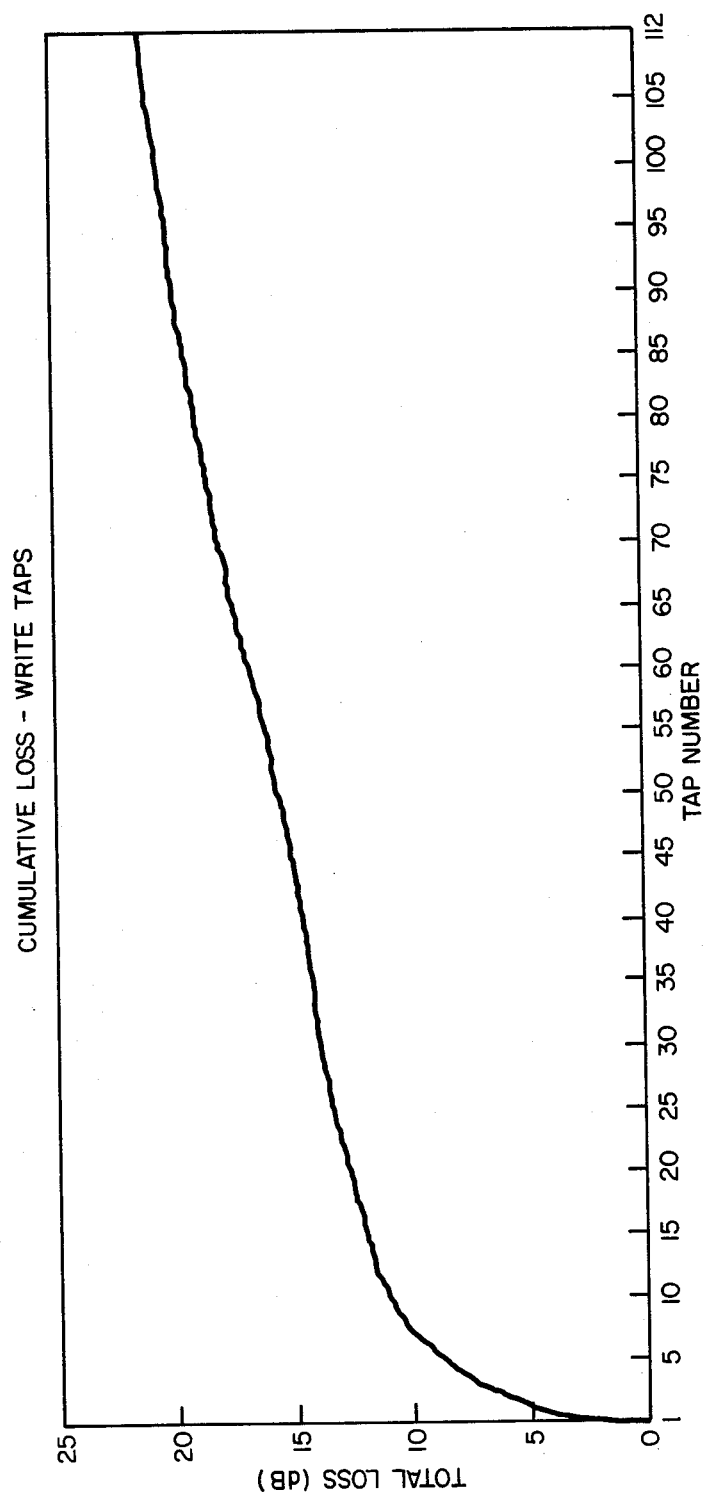
FIG_44

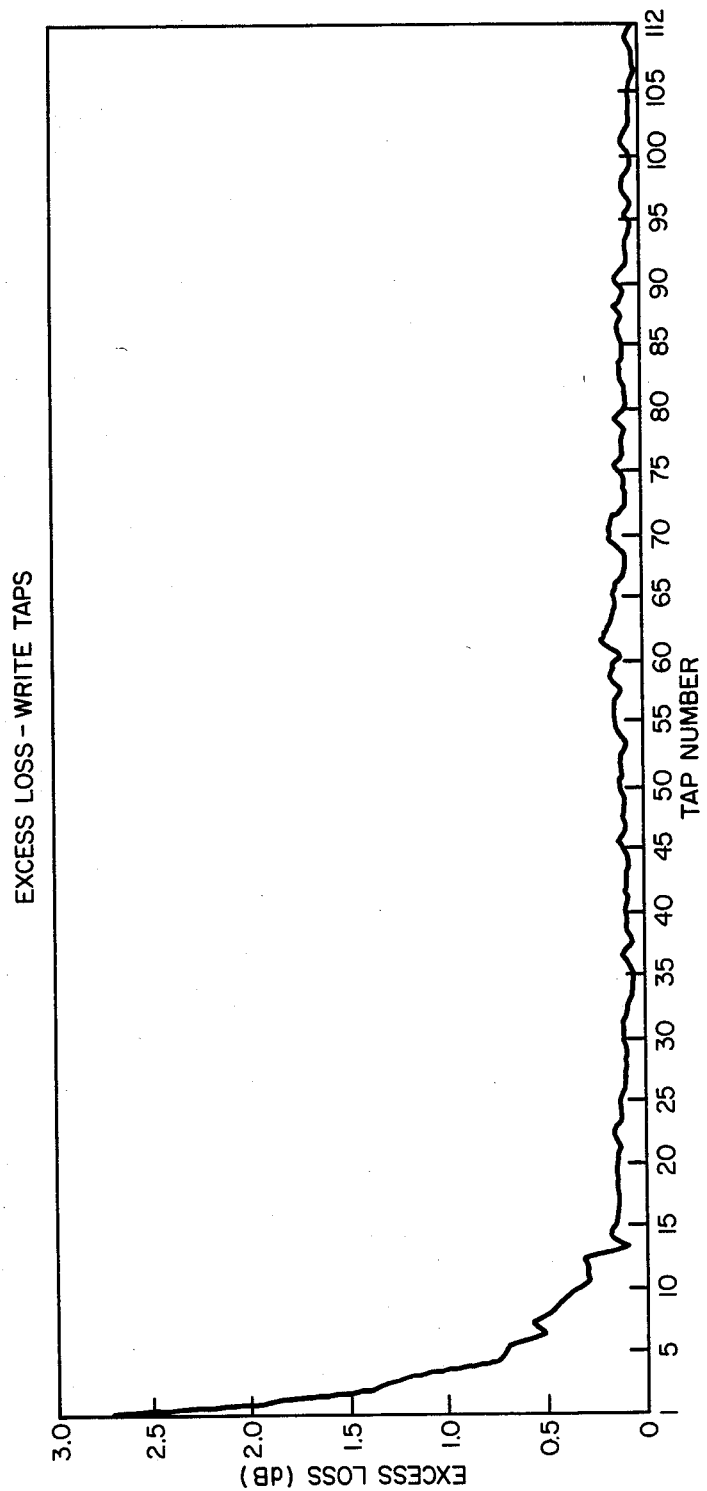
FIG_45

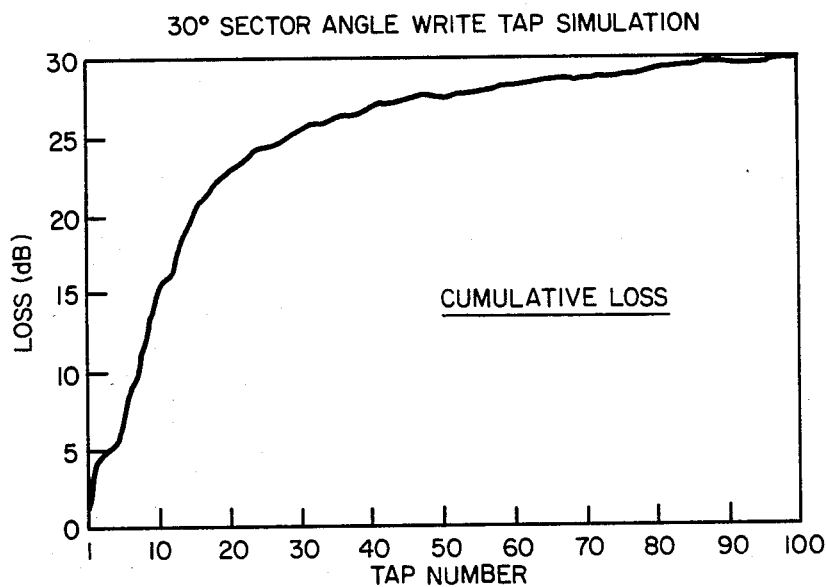
FIG_46
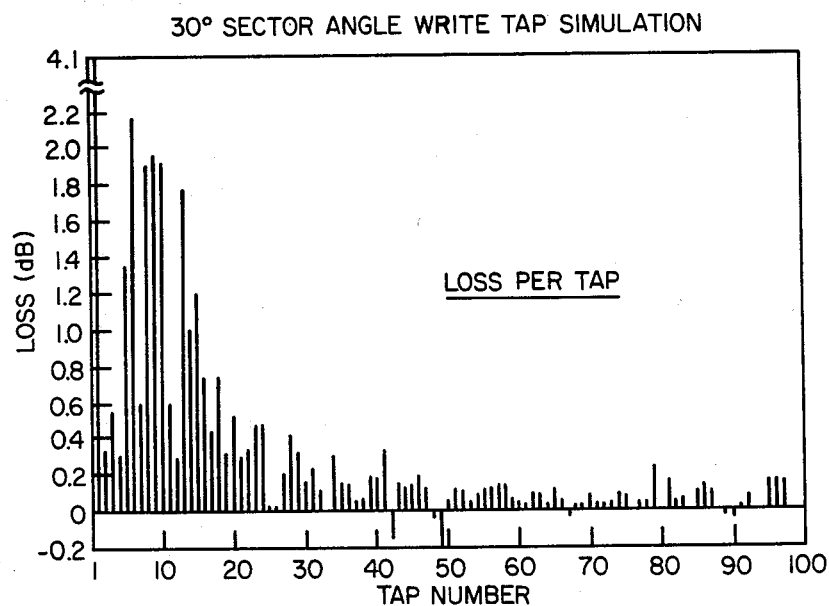
FIG_47

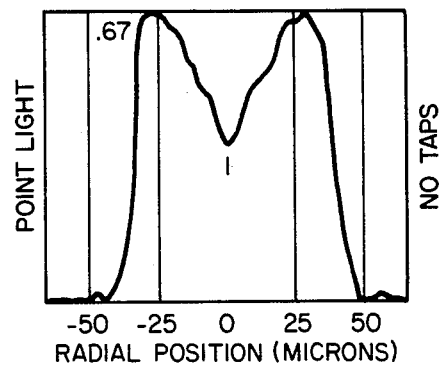
FIG_48
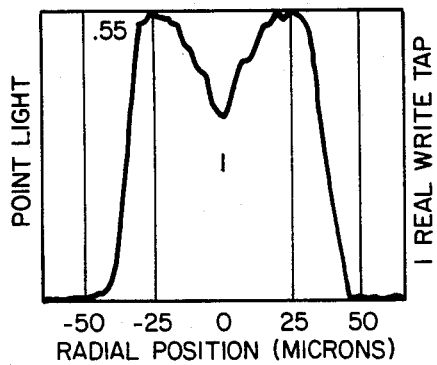
FIG_49
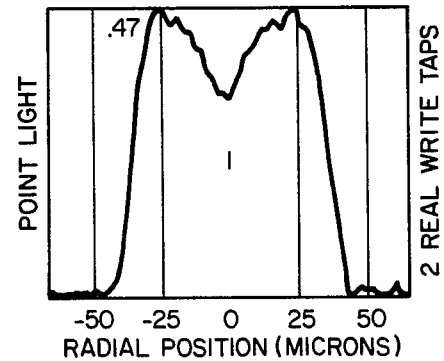
FIG_50
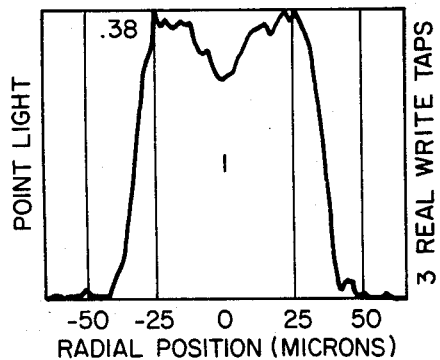
FIG_51
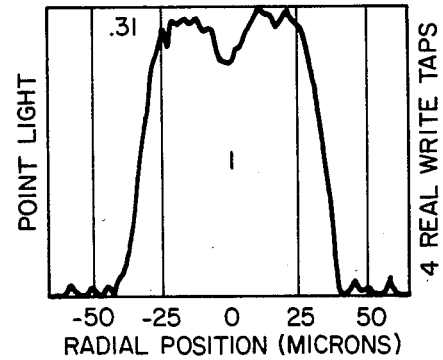
FIG_52

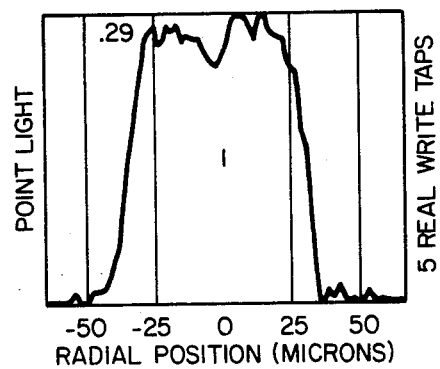
FIG_53
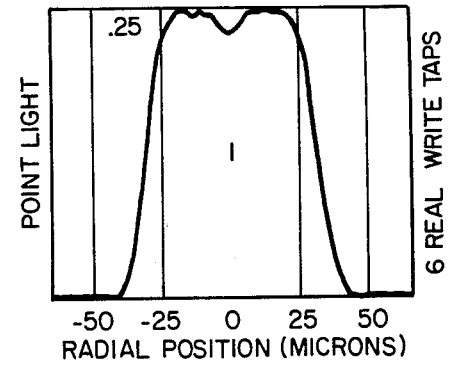
FIG_54
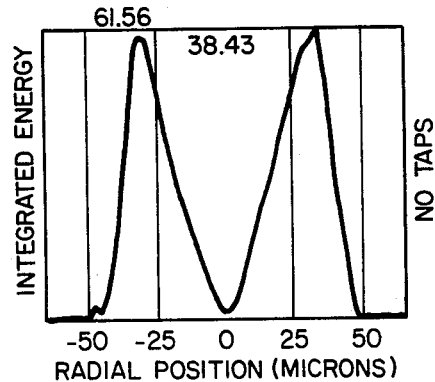
FIG_55
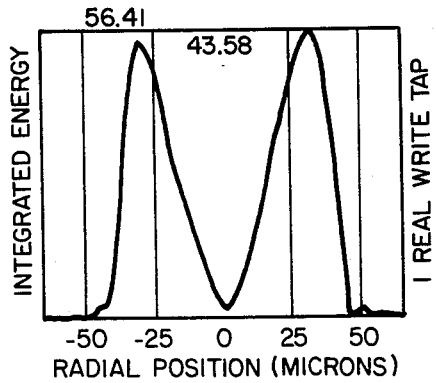
FIG_56

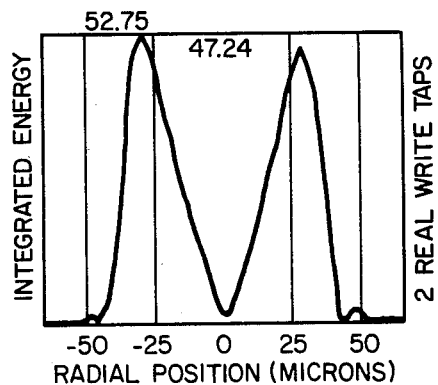
FIG_57
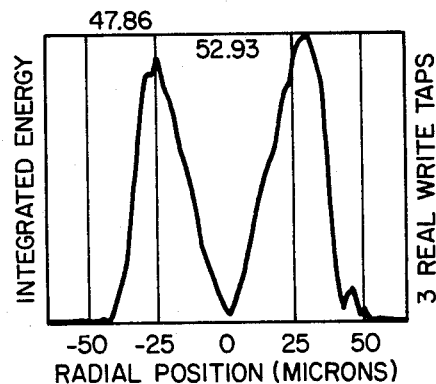
FIG_58
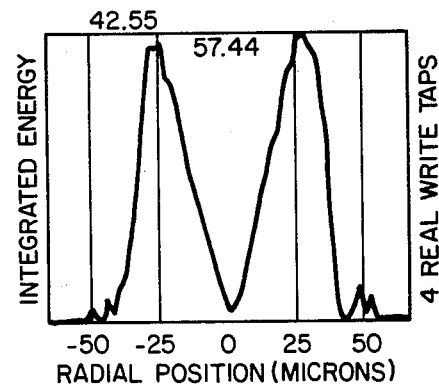
FIG_59
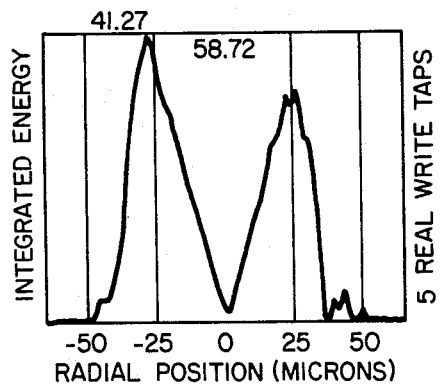
FIG_60
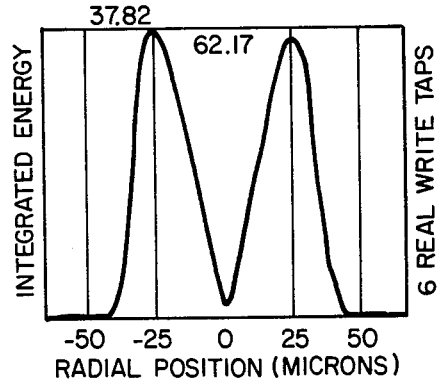
FIG_61

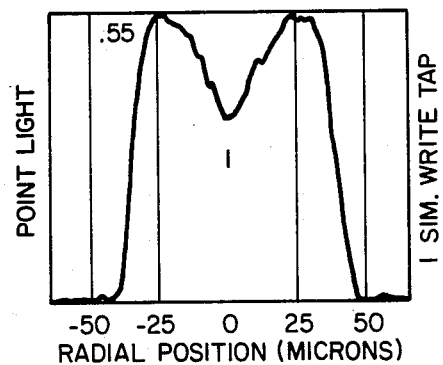
FIG_62
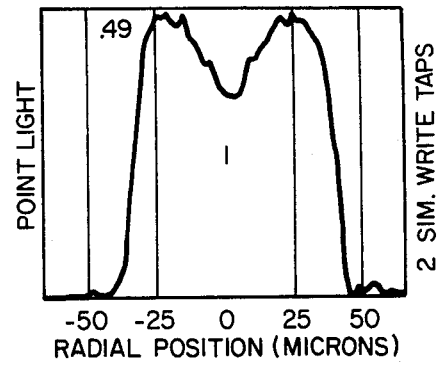
FIG_63
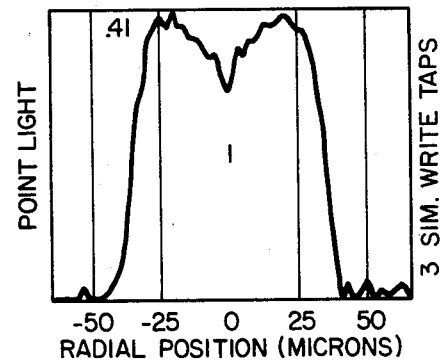
FIG_64
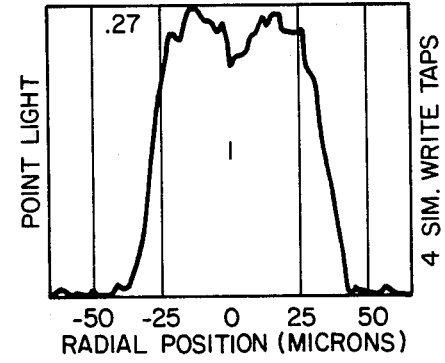
FIG_65
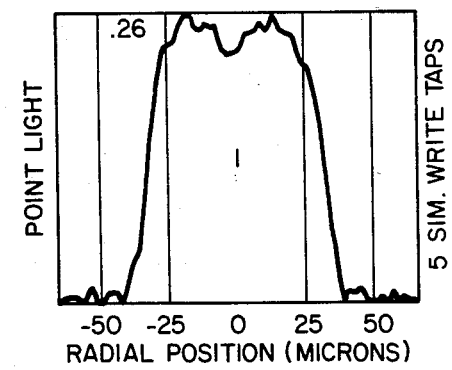
FIG_66
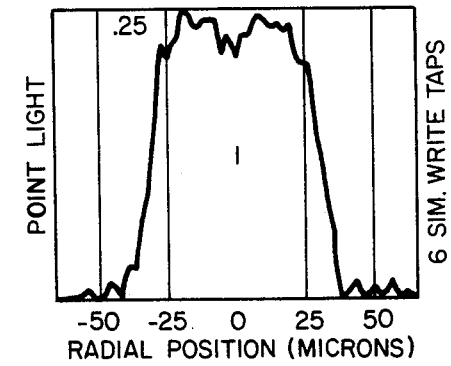
FIG_67

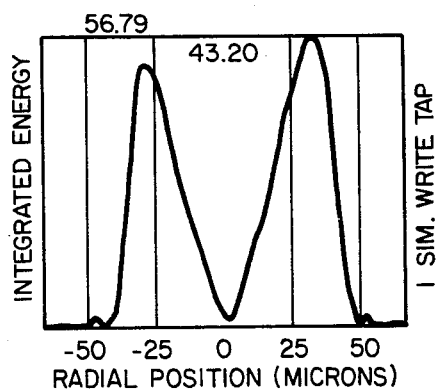
FIG_68
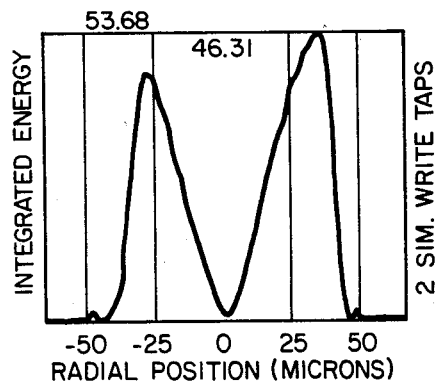
FIG_69
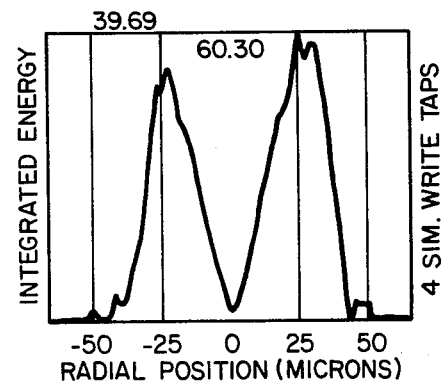
FIG_70
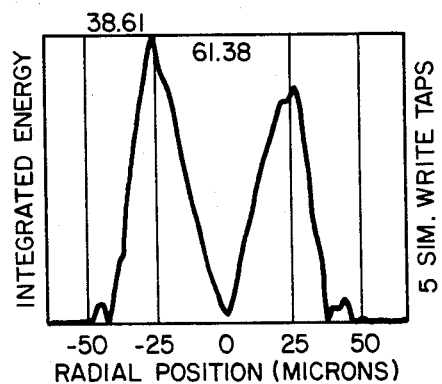
FIG_71
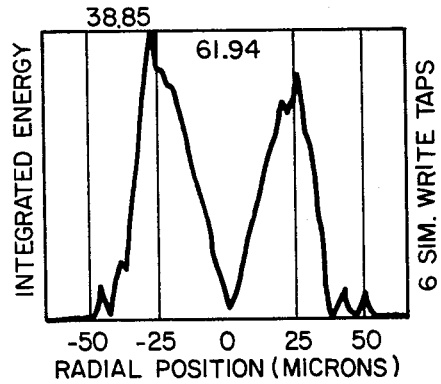
FIG_72

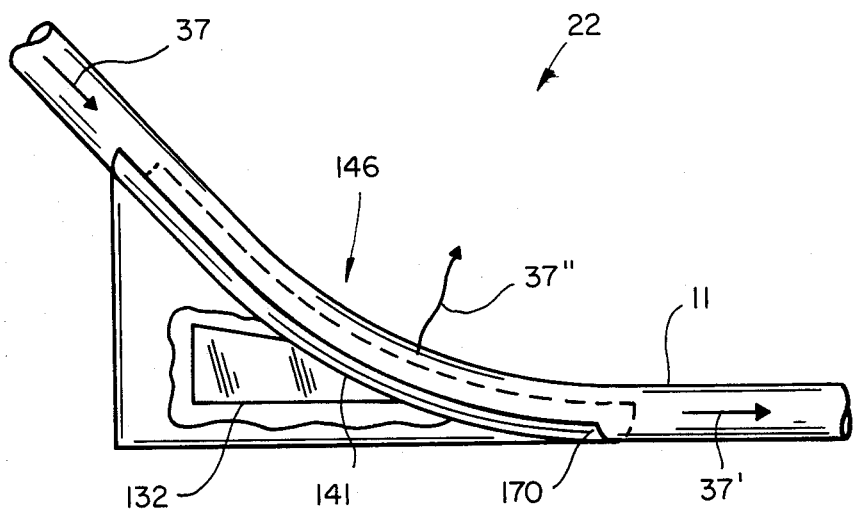
FIG_73
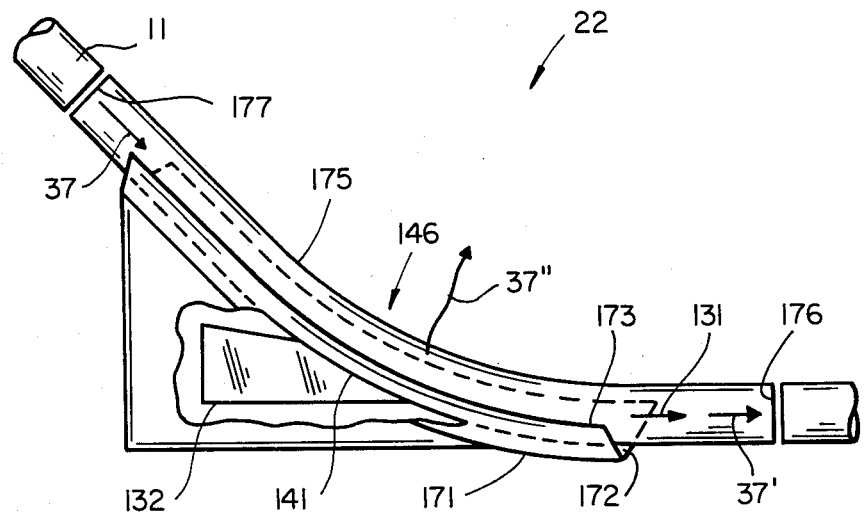
FIG_74

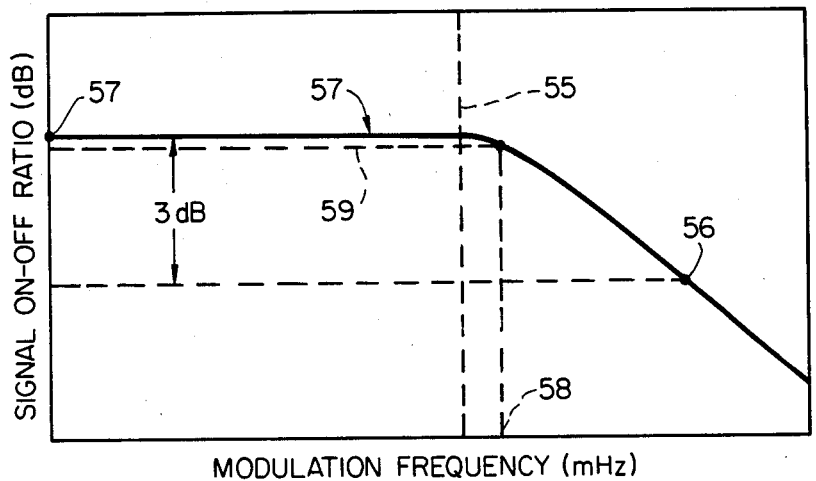
FIG_75
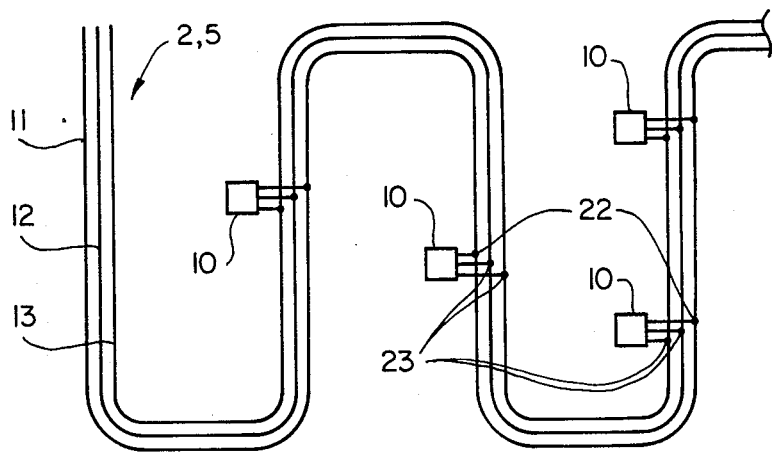
FIG_76

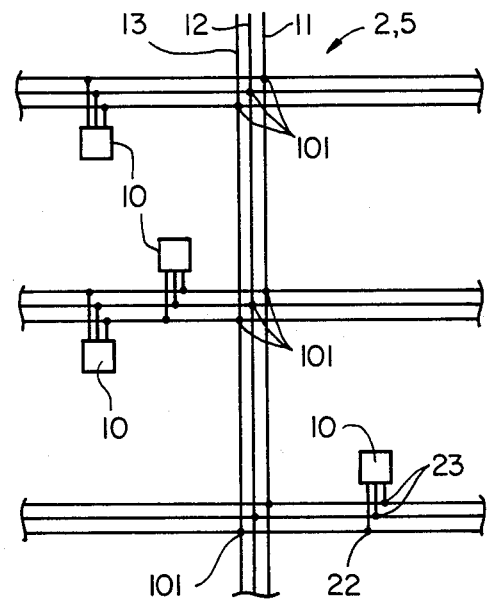
FIG_77
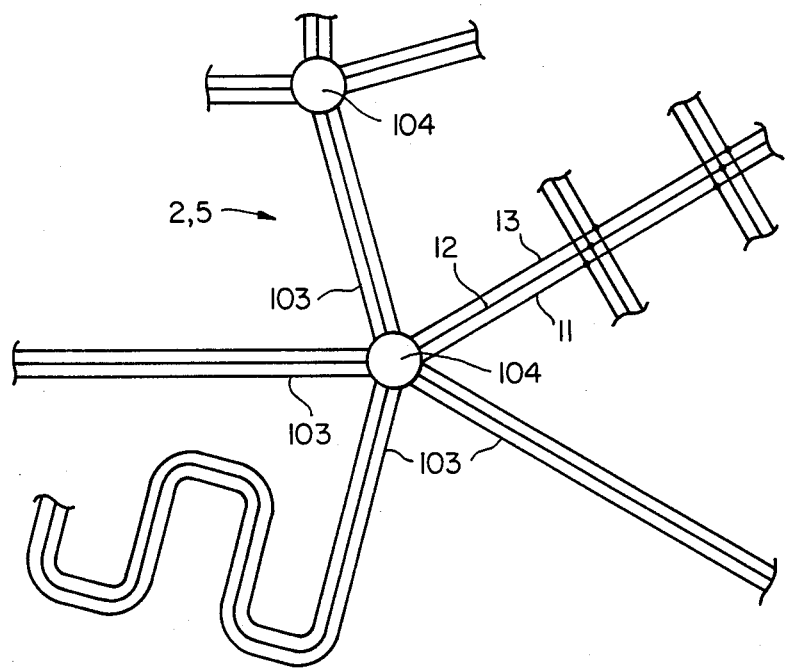
FIG_78

OPTICAL FIBER DISTRIBUTION NETWORK INCLUDING NONDESTRUCTIVE TAPS AND METHOD USING SAME

BACKGROUND OF THE INVENTION

The present invention relates to methods apparatuses for enhancing performance of optical fiber systems, and networks and systems usable therewith.

Optical fibers, due to their extremely high bandwidth capability and electromagnetic interference (EMI) immunity, have been extensively developed in recent years and are rapidly replacing other types of communication media. Specifically, in recent years extensive research and development into all aspects of optical fiber technology has rapidly moved the technology from the drawing board into the laboratory and into the field in commercial settings.

Distribution optical links differ fundamentally from long haul point-to-point links since in the latter the cost of the entire link, including signal generators, receivers, and repeaters, is distributed over the large number of subscribers served by the multiple signals handled by the link, whereas this is not possible with many distribution links. For example, a distribution optical fiber ring architecture network has been proposed as illustrated in FIG. 1 for servicing a plurality of stations 50 with an optical fiber 51 arranged so as to form a closed loop, with each station including an optical receiver 52 for reading information from the loop, and an optical generator 53 for transmitting the read information or alternatively new information onto the loop. Protocols are used to indicate the destination of information on the loop, and in general many stations 50 read and transmit the same information before it reaches its intended designation. A major disadvantage of such an architecture is that it comprises a plurality of point-to-point connections which requires that the information be regenerated numerous times to get around the loop, and since the loop comprises a plurality of series connections, unique backup systems need to be incorporated to prevent the entire system from shutting down when any one station ceases to properly operate. For an optical point-to-point distribution link, the cost of the dedicated optical generator, receiver, and fiber generally exceeds their electrical counterparts, and hence electrical communication media continue to be preferred over optics in point-to-point distribution applications.

It has long been known that potential enormous cost savings are obtainable if a nonpoint-to-point distribution link or network could be economically produced to replace point-to-point distribution links, and several commercially viable nonpoint-to-point architectural networks have been developed for electrical communication media, such networks generally being referred to as "bus" architectures or networks, one example being disclosed by Biba, U.S. Pat. No. 4,365,331.

As used herein throughout, the terms "bus architecture" and "bus network" comprise any multiple station nonpoint-to-point system wherein information normally passes through the system without having to be regenerated each time it passes a station. However, though nonpoint-to-point distribution networks have been economically produced, the major portion of these networks use electrical wire, rather than optical fiber, as the communication medium, even though optical fiber is recognized to offer numerous and significant advantages over wire as a communication medium.

One of the major reasons optical fiber has not been widely used in place of wire in such networks is that nonpoint-to-point optical fiber distribution networks are not sufficiently cost effective as compared to nonpoint-to-point wire distribution networks and when compared to point-to-point wire distribution networks, despite the extensive effort to develop nonpoint-to-point optical fiber distdribution networks. Rather, even though numerous nonpoint-to-point optical fiber communication networks have been proposed and developed in the prior art, each one suffers one or more serious disadvantages which results in serious cost problems when transferring the technology from the drawing board to the laboratory and from the laboratory to the field in a commercial setting. To date, the common problem to those having all levels of skill in the art has been the lack of development of a network capable of servicing a sufficiently large number of subscribers per repeater spacing to adequately reduce the cost per subscriber of the entire cost of the network.

The number of subscribers capable of being serviced by any given network per repeater can be limited by either (1) available network power and inherent power losses or (2) bandwidth, and as explained in more detail below, these limitations are not independent.

Regarding the first limitation, since optical transmitters, receivers, and fibers have finite operational ranges in that only finite maximum amounts of power can be injected into and supported by an optical fiber, and a finite minimum amount of optical power is required to detect the information, each network has an inherent power dynamic range of operation. For example, if a network is capable of generating and supporting as much as 10 mW of optical power and the network receivers are capable of detecting the information at a minimum optical power of 1 $\mu$w at a given bandwidth and given bit error rate, the power dynamic range of the network is 40 dB. For all known prior art bus architectures, each additional tap adds a finite amount of power attenuation to the network, and in this example assuming each tap adds 1.0 dB attenuation, it can easily be determined that the network is capable of servicing a maximum of 40 taps per repeater, the actual number of taps being less than this since some power must be reserved to compensate for losses in the optical fiber, splices connecting optical fibers, etc.

Regarding the second limitation, even if the network has sufficient power to service 40 taps per repeater, if the total bandwidth required by subscribers being served by the taps exceeds the available bandwidth of the network, then the number of subscribers or taps must be reduced or the number of repeaters increased, even though sufficient optical power otherwise exists in the network. For example, if each tap continuously requires 1.0 mHz bandwidth for subscribers serviced thereby, and if a fixed time multiplexing scheme is utilized which is capable of handling 30 mHz bandwidth, then only 30 taps could be serviced per repeater.

In addition, the first limitation (power) is dependent on the second limitation (bandwidth). Specifically, optical receiver sensitivity varies inversely to the operating network bandwidth, and accordingly if the bandwidth of the network increases from level A to level B, a receiver that is capable of determining information by detecting an optical signal as small as $-30$ dBm (30 decibels below 1.0 mw) at a given bit error rate at bandwidth A requires an optical signal higher than −30 dBm to achieve the same bit error rate at the higher bandwidth B, this being due to the fact that receiver noise increases directly with the square root of the bandwidth. Accordingly, as the bandwidth of the network is increased to accommodate additional taps and subscribers, the power dynamic range is reduced rendering the number of taps and subscribers the network can accommodate less; hence both limitations one and two set forth above must be mutually considered and satisfied.

In addition, in absolute terms, in general any given network can be modified to increase the power dynamic range or bandwidth, but each such modification adds cost to the network and oftentimes produces other disadvantages. For example, the power dynamic range of a network can easily be increased by replacing moderately priced optical receivers with higher priced top-of-the-line performing optical receivers; however, the cost increase incurred thereby may not justify the benefits obtained. Alternatively, a network designed for a monomode optical fiber can be modified to utilize a graded index multimode optical fiber which can support more optical power and hence increase the power dynamic range of the network, and even if the cost differential between the types of fibers is not significant, this modification will reduce the network bandwidth since monomode fiber is capable of transmitting information at higher bandwidths than graded index fiber. Hence, a variety of considerations require analysis to devise any kind of suitable optical fiber distribution network.

Numerous efforts have been directed to improving optical fiber bandwidth, and a major disadvantage of these efforts is that many of the solutions attenuate the optical power of the network an undue amount and/or add undue cost.

A significant limitation on bandwidth is due to modal dispersion, e.g., the tendency of different light modes of a single optical signal to propagate at different group velocities axially down an optical fiber. Modal dispersion results in pulse spreading which for step and graded index multimode fibers is a severe limitation on available bandwidth. Numerous approaches have been taken in the prior art to minimize or eliminate the effects of modal dispersion and hence increase the bandwidth of optical fibers and of networks incorporating these approaches. Common approaches have been to use various types of mode scramblers, mode strippers, or mode filters which eliminate outermost or slowest modes being supported by the fiber, the removal being accomplished by downward coupling of the outermost modes into lower order modes, or simply eliminating the outermost modes. Examples of such approaches are discussed by Marcatili, U.S. Pat. No. 3,777,149; Kaiser, U.S. Pat. No. 3,969,016; Gloge, U.S. Pat. No. 3,785,718; Midwinter, U.S. Pat. No. 3,944,811; Midwinter, U.K. patent No. 1,521,778; Dyott, U.K. specification No. 1,420,458; Storozum, "Mode Scrambling Can Enhance Fiber-Optic System Performance", *Electronics,* Feb. 24, 1981, pages 163–66, see page 166; Sakaguchi, Japanese Kokai No. 55-29847 (A); and Yanase, Japanese Kokai No. 52-32341.

Numerous other approaches have been taken, examples of which are Tien, U.S. Pat. No. 3,617,109; Jackson, U.S. Pat. No. 4,125,768; Cohen, U.S. Pat. No. 4,447,124; Marcuse, U.S. Pat. No. 3,909,110; Eve, U.S. Pat. No. 4,205,900; Ueno, Japanese Kokai No. 52-49040; and Bennett, "Extending the Range of Long Wave Length Multimode Optical Fibre Transmission Using Decision Feedback", SESSION A XII:SYSTEM (I). However, all these approaches are either unduly complex, absorb excessive optical power, or present other difficulties.

Though enhanced bandwidth is an important consideration in developing an optical fiber distribution network, in particular a bus network, a more fundamental problem has been how to access or "tap" the optical fiber in a passive manner so as to be able to inject information onto the network (e.g. "write") and/or withdraw information from the network (e.g. "read") such that light representative of the information remains in the network in amounts sufficient to allow a sufficiently large number of stations to be connected to the network per repeater to make it economically attractive. Numerous efforts have been directed by the prior art to developing suitable taps for nonpoint-to-point distribution networks, e.g. bus networks, and these efforts have met with very limited commercial acceptance due to complexities of components embodied therewithin (e.g. high cost) and operational limitations posed by such embodiments which result in relatively few stations being able to access the network per repeater.

For example, Love, U.S. Pat. No. 4,072,399, discloses a distribution network useable for either a ring or bus architecture which utilizes a plurality of taps 17–22. However, the network, and in particular the taps, are intricate in construction and craft sensitive to install, and a further disadvantage is that each tap produces an excessively large excess loss. The term "excess loss" as used herein represents the fraction of power normally expressed in per cent or dB, which is attenuated by a tap but not actually detected thereby, or passed on by the tap.

Polczynski, U.S. Pat. No. 4,089,584, describes an optical fiber bus architecture network wherein a plurality of subscribers sequentially inject light into a first portion of an optical fiber and subsequently sequentially withdraw light out of another adjacent section of the optical fiber 14. This network requires the use of an optical fiber cable which includes a core 14 having at least one planar side, with prism-type couplers 20 being disposed in contact with the planar side of the core 14 by removing a portion of a cladding 12 in a vicinity of each coupler. Accordingly, this network is disadvantageous in that it requires a specialized form of fiber, e.g. a fiber having a core with one rectangular side, as opposed to an ordinary fiber having a circular core, requires that a portion of the cladding of the optical fiber be removed prior to tapping which inherently is a time intensive and expensive procedure, and requires that a prism be disposed adjacent an exposed portion of the core where the cladding has been removed. Accordingly, the component parts making up the network are expensive as well as the time required to assemble it, and the network has a further disadvantage in that removing the fiber cladding is a factory operation that results in needing one splice on each side of the tap and hence a high excess loss.

Biard, U.S. Pat. No. 4,400,054, discloses a bus architecture network wherein a plurality of subscribers are radially connected with a rectangular scrambler rod 20 via eight rectangular optical fibers 31–38, which in turn are connected to further optical fiber arms 31a–38a via prisms 31b–38b. Again, the unique shape of the various optical waveguides disclosed by Biard, and the relatively complicated interconnected structure created thereby, render this network nonadaptable for widespread use due to cost.

Singh, U.S. Pat. No. 4,234,969, is another example of an optical fiber bus architecture which utilizes an intrically constructed and hence relatively expensive optical tap 18. The taps, illustrated in FIG. 2 of the reference, incorporate multiple reflecting surfaces therewithin which result in relatively high excess losses.

Palmer, U.S. Pat. No. 4,317,614, discloses a bus architecture utilizing optical taps 18, 24, 34, etc. each of which comprises first and second bent fibers 126, 128 which have had confronting surfaces lapped or ground and subsequently interconnected to create optical coupling therebetween. Lapping optical fiber surfaces as disclosed is an extremely craft sensitive procedure and hence expensive, and again the excess losses resulting when the fiber cladding is substantially removed are unduly large due to splice losses.

Ozeki, European patent application publication No. 0,080,829, discloses several unique architectural network designs aimed at increasing a number of subscribers served by the network. However, though the designs each have the advantage of increasing (a number of subscribers otherwise capable of being served by the network, each design has a common deficiency in that the couplers required are unduly complex and expensive, and furthermore the number of subscribers capable of being served by each network design is relatively low in view of the relatively high excess losses of the taps used in the network.

Steensma, U.S. Pat. No. 4,450,554, discloses a bus architecture utilizing a star coupler, and a common disadvantage of networks utilizing star couplers, as is well known, is that the excess losses imposed by star couplers is relatively large, being on the order of 2 dB and the power is divided by the number of subscribers, which necessarily limits the number of subscribers which can be served by the network.

It has long been known that light can be withdrawn from an optical fiber cladding at a bend, as taught by Kapany, N.S., "Fiber Optics; Principles and Applications", Academic Press, San Francisco (1967), that light withdrawal from the cladding is facilitated by using an optical coupler in contact with the fiber, as taught by Fujimura, U.S. Pat. No. 3,801,389, Goell et al., U.S. Pat. No. 3,982,123 and Miller, U.S. Pat. No. 3,931,518, and that light can be injected into an optical fiber at a bend using an optical coupler, as taught by Maslowski, German Offenlegungsschrift No. 2,064,503 (FIG. 4). A disadvantage of light taps which operate on optical fiber claddings at bends is that the stresses generated at the bends oftentimes tend to fracture the optical fiber, and this problem is aggravated since removal of the buffer to optically couple with the cladding exposes the cladding to humidity which quickly and seriously degrades the strength of the fiber and its ability to remain intact when bent and stressed.

Campbell et al., European Publication No. 0,063,954, discloses a method and means for injecting light into and withdrawing light from an optical fiber at a bend without removing the buffer so as to allow temporary in situ local launch and detect techniques to be used for aligning optical fibers prior to splicing. The method and means comprises disposing a bent portion of an optical fiber against an optical coupler such that injected light passes through the optical coupler and the fiber buffer as it is injected into the fiber core, and light to be withdrawn passes through the fiber buffer and into the optical coupler as the light is withdrawn from the fiber core. Since the buffered optical fibers are only bent temporarily during the aligning and splicing operations, the probabilities of fiber breakage are minimized.

To date, preferred taps for distribution network applications comprise star couplers, reflective, and biconic couplers. Each of these couplers can be provided as a separate component, with star couplers being capable of splitting an optical signal into as many as 128 smaller signals, an excess loss of such star couplers being in a range of 1–3 dB. Referring to FIG. 2, a star coupler 80 comprises a plurality of optical fibers 81, fused together at a central region 82 such that an optical signal 84 propagating into the central region from any one of the fibers on one side of the central region is split by the central region into a plurality of smaller signals 85 and propagate down each of the fibers extending from the other side of the central region, as illustrated by arrows in FIG. 2. The 1–3 dB excess loss created by such a star coupler is represented by arrow 83.

A biconic coupler 86, illustrated in FIG. 3, is similar to a star coupler, and comprises two optical fibers fused together at a signal splitting central region 87, the central region generally being formed so as to split an incoming large signal 88 into a relatively small drop signal 90, generally equal to 1–10% of the intensity of the signal 88, and a relatively large residual signal 89. Biconic couplers have excess losses 91 in excess of 0.5 dB.

SUMMARY OF THE INVENTION

The invention comprises a method and means for withdrawing light out of an optical fiber with a light read tap so as to create an unexpected and surprisingly low excess loss of light in the optical fiber, a method and means for withdrawing light out of an optical fiber with a light read tap so as to detect an extremely small percentage of the light within the optical fiber while creating an unexpected and surprisingly low excess loss, a method and means for withdrawing light from an optical fiber so as to unexpectedly and surprisingly increase the bandwidth of the optical fiber, a method and means for injecting light into an optical fiber so as to create an unexpected and surprisingly small attenuation of a signal already existent in the optical fiber, and a method and means for injecting light into and/or withdrawing light out of an optical fiber by having the light pass through an optical fiber buffer in a continuous manner at a bend so as to create an unexpected and surprisingly low probability of fracturing the optical fiber. These discoveries are useful in a vast array of embodiments including numerous network and system designs.

Preferred embodiments of the invention include a method and means for withdrawing light out of a side of an optical fiber, preferably through its buffer, preferably using an optical coupler, such that a surprising and unexpected low optical signal excess loss is created by the tap, the excess loss being the amount of light withdrawn, either expressed as a percentage or logarithmically as decibels (dB), which is not actually detected. The surprising and unexpected low excess loss is preferably achieved by modifying an integrated energy distribution across the core upstream of the side light read tap, the energy distribution preferably being modified by disposing a plurality of similarly constructed additional side light read taps upstream from the first side light read tap.

The invention further includes a method and means for injecting light into an optical fiber so as to multiplex signals therein such that an attenuation of a pre-existing optical signal in the optical fiber at the point of light injection is minimized, light injection preferably being accomplished by passing the signal to be multiplexed through the optical fiber buffer using an optical coupler, the surprising and unexpectedly low excess loss of the pre-existing signal optimally being accomplished by modifying an integrated energy distribution of the pre-existing optical signal across the optical fiber core upstream of the point of light injection, the energy intensity modification means preferably being a plurality of additional side light injection taps.

The invention further includes a method and means for increasing the bandwidth of an optical fiber, the bandwidth being increased by detecting less than all the modes representative of an optical signal, the detection being accomplished by withdrawing light out of the side of an optical fiber so as to detect principally only outermost modes so as to reduce a time of dispersion between detected modes and hence increase the bandwidth of the optical fiber, the side light withdrawal tap also increasing a bandwidth of a remaining optical signal in the fiber downstream of the tap since a disproportionate high percentage of outermost modes are withdrawn at the light read tap.

The invention further includes networks and systems usable with the various methods and means described above, in particular networks and systems capable of servicing a plurality of subscribers with either one-way or two-way information transfer, the information including any combination of audio, video, and data information, a preferred embodiment being the use of a bus architecture in one of many types of topologies, such as line, branch, and star, and combinations thereof. The bus architecture is characterized in that the multiple optical signals are multiplexed into a common optical fiber using the method and means for injecting light described above and multiple multiplexed optical signals are read from an optical fiber at a point downstream from the light injection means, with control means dictating to the various subscribers various times when it is appropriate for injecting information into the network or system, and for withdrawing information from the network or system.

BRIEF DESCRIPTION OF THE DRAWINGS

FIG. 1 illustrates a conventional prior art ring distribution architecture.

FIG. 2 illustrates a conventional prior art star coupler.

FIG. 3 illustrates a conventional prior art branch or biconic coupler.

FIG. 4 illustrates a bus architecture constructed according to an embodiment of the present invention.

FIG. 5 illustrates the principle of operation of a method and means for reading information from an optical fiber according to the invention.

FIG. 6 is a graph illustrating cumulative total losses achieved by read taps of the invention disposed in series as explained in Example 1.

FIG. 7 is a graph illustrating non-cumulative excess losses of read taps disposed in series in Example 1.

FIGS. 8 and 9 illustrate cumulative and non-cumulative total losses of simulated read taps constructed according to the invention, each of the simulated read taps having an identical construction as explained in Example 2.

FIG. 10 is a graph illustrating an amount of attenuation in an optical fiber as a function of total bend sector angle, the graph comparing the difference between consecutive fiber turns and discrete read taps as explained in Example 3.

FIGS. 11–17 are graphs illustrating point light intensity distributions across an optical fiber core when 0–6 read taps of the invention are sequentially attached to an optical fiber having an optical signal therein.

FIGS. 18–24 are respectively related to FIGS. 11–17, and illustrate integrated energy distributions of the optical signal in the optical fiber core obtained by integrating the point light intensity distributions of FIGS. 11–17 over a cross-sectional area of the core.

FIG. 25 illustrates regions of the core illustrated in FIGS. 11–24, in particular a center core region surrounded by a core annulus.

FIGS. 26–31 illustrate point light intensity distributions measured from simulated read taps of the invention.

FIGS. 32–37 are graphs illustrating the integrated energy distributions of the point light intensity distributions of FIGS. 26–31 respectively.

FIGS. 38 and 39 illustrate first and second embodiments of read taps of the invention.

FIG. 40 illustrates the principle of operation of means and methods for injecting light according to the invention.

FIG. 41 illustrates the path of an optical signal through an unbent portion of an optical fiber.

FIG. 42 illustrates the principle of injecting light into a core of an optical fiber through a side thereof at a bend.

FIG. 43 illustrates a reciprocal principle of withdrawing light out of a core of an optical fiber through a side thereof at a bend.

FIGS. 44 and 45 illustrate cumulative and non-cumulative attenuations of a pre-existing optical signal caused by multiple light write taps of the invention disposed in series on an optical fiber as explained in Example 7.

FIGS. 46 and 47 illustrate cumulative and non-cumulative attenuations of a pre-existing optical signal in an optical fiber caused by identically constructed simulated write taps of the invention.

FIGS. 48–54 illustrate point light intensity distributions across a core of an optical fiber of a pre-existing optical signal as it sequentially passes through 0–6 real side light write taps of the invention.

FIGS. 55–61 are graphs illustrating integrated energy distributions of FIGS. 48–54 respectively.

FIGS. 62–67 illustrate the point light intensity distributions across an optical fiber core as a pre-existing optical signal passes through 1–6 sequential simulated write taps of the invention.

FIGS. 68–72 are graphs illustrating integrated energy distributions of FIGS. 62–67.

FIGS. 73 and 74 illustrate first and second preferred embodiments of side light write taps of the invention.

FIG. 75 is a graph illustrating a representative signal on-to-off ratio as a function of modulation frequency of an optical fiber.

FIGS. 76–78 illustrate various line, tree and star topologies for bus architectures as illustrated in FIG. 4.

DESCRIPTION OF THE PREFERRED EMBODIMENTS

As used throughout herein, the term "optical fiber" refers to an optical waveguide having a core and cladding, the core preferably being made of glass. The cladding has an index of refraction slightly less than that of the core and therefore forms a waveguide therewith. The cladding can be formed of a glass or a polymeric material, and the invention is suitable for either type of fiber, though preferred embodiments utilize an optical fiber having a glass core and glass cladding since such fibers have overall lower attenuations than optical fibers having polymeric claddings. When the cladding is made of glass, the fiber further includes a protective layer surrounding the cladding which protects the glass core and glass cladding from moisture and from strain, this layer being known in the art as a buffer. The protective layer generally comprises a polymer and can be a single material layer, such as a silicone or acrylate layer, or a plurality of materials layered in sequence, for example a hydril layer surrounding an acrylate or silicone layer, or a nylon layer surrounding an acrylate or silicone layer, and the word "buffer" as used herein includes any and all combinations of such polymeric layers surrounding a glass cladding through which light passes as it is being injected from an optical coupler 32 into an optical fiber core or as light is being withdrawn into an optical coupler 132 from the optical fiber core.

When the cladding is made of a polymeric material rather than glass, the cladding functions as a protective layer for the glass core, and hence is considered both a cladding and a buffer, though the polymeric cladding can further be surrounded by additional polymeric layers which, for purposes of the invention, are part of the buffer when light passes through the fiber as the light travels between the optical coupler and the glass core, for either light injection or light detection.

Optical fibers are classified as monomode or multimode, and mutlimode fibers can have many types of index of refraction profiles, two common descriptions being step index and graded index. The invention is suitable for use with all these types of optical fibers, though multimode fibers are preferred.

FIG. 4 illustrates one preferred embodiment of the invention, whereby stations 10, substations 6, and/or subscribers 61 access networks 2, 5 by injecting light into optical fiber 11 using light write taps 22, and withdrawing light from optical fibers 12, 13, using light read taps 23. Since the light read taps 23 and the light write taps 22 constitute a fundamental advance in the art, and form an important part of the networks 2, 5, the function and structure of these taps will first be described.

METHOD AND MEANS OF LIGHT WITHDRAWAL

FIG. 5 illustrates the principle of operation of the read taps 23. Relative dimensions in FIG. 5 as well as in other figures have been greatly exaggerated for ease of illustration and clarity. For example, the size of the fiber 12 in FIG. 5 is greatly enlarged, and not to scale to other parts shown in this figure.

In FIG. 5, the optical fiber 12 containing an optical signal represented by arrow 31 is bent in a region 46 which causes part 25 of the optical signal 31 to be withdrawn from the optical fiber core into an optical coupler 32 by passing through the optical fiber cladding and buffer and be focused by lens 35 so as to be detected by detector 34, the lens and detector preferably being maintained in contact with the optical coupler 32 so as to minimize a magnitude of an excess loss 31" of the tap 23. The detected signal is then relayed by any appropriate means, such as wires 44. Though the detector and lens are illustrated as being embedded within the coupler 32, which is a preferred embodiment, the detector and/or lens can be disposed outside thereof. Also, though a detector 34 is illustrated, if EMI interference is a concern, the detector 34 could be removed from the tap 23 and remotely connected to the lens 35 via another optical fiber, though this modification will create some additional excess loss. In addition, though preferred, the lens 35 is not required if a sufficiently large detector 34 is used and placed relatively close to the fiber to collect withdrawn light.

Part of the original optical signal 31 continues to propagate down the optical fiber and is represented by arrow 31', and that portion of the original optical signal 31 which is attenuated by bending the optical fiber but which is not detected by the detector 34, hereinafter referred to as the "excess loss", is represented by the arrow 31". Though the excess loss 31" is illustrated as occurring entirely at the bent region 46, actually some of the excess loss 31" occurs at locations downstream of the bend region 46 (to the left of the bent region) since relatively high ordered unstable core modes, cladding modes, and buffer modes created by the bent region are continuously attenuated as they propagate down the fiber.

The purpose and function of the optical coupler 32 is to optimize reflective and refractive effects at the coupler-buffer interface. Without the coupler 32, significant amounts of light extracted from the fiber core by the bent region 46 which propagate toward coupling area 41 will be reflected off a buffer-air interface and remain within the fiber as a buffer mode due to the relatively large difference between the index of refraction of the buffer and air. The optical coupler 32 should be made of a material which is transparent at light wavelengths constituting the optical signal 31, preferably a material whose attenuation is as low as possible, and which has an index of refraction which optimizes an amount of light detected by the detector 34.

The material of the optical coupler 32 can be liquid or solid, or a combination thereof, and the solid material can be either deformable or nondeformable, and when deformable, either resiliently deformable or non-resiliently deformable. It is desirable that the coupler 32 be capable of making good surface contact with the buffer coupling area 41 to optimize optical coupling into the coupler. A preferred embodiment is a resiliently deformable material such as a polysiloxane. Since the outer layer of the buffer also generally tends to be resiliently deformable, good surface contact at the coupling area 41 is achieved. Liquids obviously also are capable of making good surface contact, but are disadvantageous in that means for containment thereof is necessary. A non-deformable solid material can also be used, an advantage thereof is that non-deformable materials such as glass have extremely low attenuations, and good surface contact with the buffer is possible when the outer layer of the buffer is relatively soft. A liquid film can also be disposed on the surface of the glass to improve surface coupling and contact, and all of the aforementioned optical couplers are included within the scope of the invention.

A bend region sector angle α is defined as the arc enclosing the bend region 46, which is determined by the intersection of first and second normal dash lines 47, 48 which are normal to and extend from points 43, 49 where the bent center axis, indicated by dash line 36, of the optical fiber 12 merges with first and second unbent center axes 28, 29 of the optical fiber 12 at opposite sides of the bent region 46.

The relatively sharp bend in the vicinity of the point 49 has been exaggerated for clarity of illustration. As illustrated in FIG. 5, the bent region 46 does not necessarily have to be bent about a uniform radius throughout, and in fact the radius of curvature of the bent region 46 can be nonuniform. When the bend radius is nonuniform, optimum results are obtainable if a minimum bend radius r of the bent region 46 occurs at a location 24 disposed upstream of the lens 35. Though theoretically bending the fiber downstream of the lens line of sight, e.g. downstream of point 26, tends to withdraw nondetectable parts of the signal 31 which adds to the magnitude of the excess loss 31", bending downstream of the point 26 allows the lens 35 to be positioned closer to the optical fiber and hence is advantageous and preferable. All types of bend radius profiles across the bent region 46, including both uniform and varying profiles, are included within the scope of the invention.

According to the invention, the excess loss 31" is dramatically reduced by minimizing the contact area 41 between the optical coupler 32 and the fiber buffer as well as the location of the area 41 so as to result in a maximum light withdrawal intensity impinging on a front face 30 of the lens 35. It has been found that surprising and unexpected small percentages of the light 31 can be detected, with associated surprising and unexpected excellent light collection efficiencies, e.g. extremely low excess losses 31", by appropriately optimizing the bend radius profile, the minimum fiber bend radius r, its location, a magnitude of the sector angle, and a size of the area 41, in particular a linear length thereof, over which the optical coupler 32 contacts an outer portion of the bent region 46.

For any given minimum bend radius r, bend radius profile, and sector angle α, it has been found that a point of optimum light withdrawal intensity exists and can be determined by moving the photodetector 34, lens 35, and a small portion of an optical coupler 32 connected thereto along an outer arc of the bend while continuously monitoring the level of the optical signal 25 detected, and noting the location at the bend where the withdrawn signal 25 is maximized. A center of the area 41, in particular a center of the lens 35, can then be conveniently identified by its offset angle θ from the unbent central axis 28 of the optical fiber located upstream of the bent region 46.

Preferably, the length and width of the area 41 should be maintained as small as possible but large enough to withdraw as much light propagating within the optical fiber buffer into the optical coupler 32 at appropriate angles so as to be focused by the lens 35 onto the photodetector 34. An excessively large area 41 is undesirable since some light will enter the optical coupler 32 at points along the bent region 46 too far remote from the front face 30 of the lens 35 so as not to be "seen" thereby, or at angles which cause the light to simply miss the lens 35, this light adding to the magnitude of the excess loss, which light otherwise might be detectable by the photodetector by using a smaller optical coupler. Too small an area 41 is undesirable since light within the optical fiber buffer which otherwise would be withdrawn into the optical coupler toward the front face 30 of the lens 35 will not be detected due to a lack of optically coupling with this light caused by the excessively small size of the area 41. Optimally, the exact contour of the area 41 is determined by the size and shape of the front face 30 of the lens 35, and the critical points on the buffer surface where light impinges at angles such that if withdrawn into the optical coupler would propagate toward the front face 30. Preferably the shape of the area 41 should be such that at least substantially all the critical buffer points are contacted by the optical coupler, with a minimum amount of contact occurring at non-critical points e.g., buffer points where withdrawal of the light thereat into the optical coupler results in the light missing the lens 35.

In addition, the optimum minimum bend radius r, optimum bend radius profile, and optimum sector angle α for a desired percentage of withdrawn optical signal 25 can also be determined by experiment. For the detection of small signals 25 of the order of 1 μw, when the signal 31 is >>1 μw, it has been determined that optimum values of θ occur somewhere between 5° and 45°, specifically between 5° and 30°, the exact value depending on the minimum bend radius r, the bend radius profile, the sector angle α, and the index of refraction of the optical coupler. Preferred optimum results have been obtained by setting the minimum bend radius r equal to a value between 2 mm and 6 mm, preferably between 3 mm and 5 mm, most preferably between 3.5 mm and 4.5 mm, setting the sector angle α between 20° and 90°, preferably 25°–70°, more preferably 25°–60°, and most preferably 30°–50°.

By using a relatively small optical coupler area 41 as described, and by setting r and θ equal to values within the ranges set forth above, detectable optical signals equal to and lower than 10 μw, and specifically lower than 1 μw, have been reliably and repeatedly withdrawn and detected from an optical fiber, with excess losses associated with any of these remarkably low withdrawal levels being reliably and repeatedly lower than 0.3 dB, 0.2 dB, 0.1 dB, 0.07 dB, 0.06 dB, 0.05 dB, 0.04 dB, 0.03 Db, 0.02 dB, and even lower than 0.01 dB. The total loss (excess loss 31" plus detected signal 25) created by such taps is for practicable purposes equal to the excess loss when the magnitude of the optical signal 31 is >>1 μw for small (e.g. 1 μw) detected signals 25. Since information represented by the signal can be easily determined when a magnitude of the detected signal 25 is 1 μw, such a magnitude is a preferred embodiment. More sensitive detectors 34 can determine the information with signal 25 magnitudes smaller than 1 μw, for example, 0.1 μw, 0.01 μw, and even smaller than 0.001 μw, such small detection magnitudes being possible with more sensitive receivers. However more sensitive receivers are more expensive than less sensitive receivers. The invention includes taps capable of detecting less than 5 μw, preferably less than 2 μw, more preferably less than 1 μw, and signals less than 0.1 μw, 0.01 μw, and 0.001 μw.

The advantages achieved with such unexpected and surprising low excess losses associated with such sensitive detection capabilities are extremely important. For example, 20 such read taps disposed in series on an optical fiber, each having a modest relatively high total loss of 0.05 dB with the excess loss being somewhat less than this, produces a total loss of 1 dB. In other words only 20.6% of the light in the optical fiber would be used by 20 drops connected to the taps. On the other hand, the best low or high power prior art taps each have an excess loss greater than about 0.5 dB, and accordingly twenty such taps disposed in series would create a total excess loss of 10 dB. In other words, 90% of the light would be lost. In addition, of the 10% of the light not lost, some has also been withdrawn and detected by these prior art taps so that the amount of light in the optical fiber (signal 31' downstream of the tap) is actually less than 10% of its original magnitude. This comparison is even more remarkable when it is realized that total losses less than 0.05 dB are obtainable according to many embodiments of the invention.

EXAMPLE 1

A graded index optical fiber having a core diameter of 100 μm, a cladding diameter of 140 μm, and a buffer diameter of 500 μm was spliced so as to create a 2.2 km link, and to one end thereof a laser was attached. At an opposite second fiber end a photodetector was connected to the optical fiber, and the optical power thereat was detected from the fiber end. A read tap as illustrated in FIG. 5, having a graded index lens 35 and a photodetector 34, was attached to the optical fiber 10 m from the laser and adjusted so as to detect 1 μw. The optical power at the opposite second end of the optical fiber was again noted, and the total and excess loss created by the read tap was calculated. The read tap was then replaced by a simulator which bent the fiber about an arc α and radius similar to that of the read tap and produced the same total loss in the fiber, and the read tap was then reattached to the optical fiber 10 m downstream from the simulator so as to again detect 1 μw of power. The optical power at the opposite second end of the fiber was again noted, and the total and excess loss created by the reattachment of the read tap were calculated. Thereafter, the read tap was then replaced by a second simulator which created an identical total loss. This procedure of sequentially reattaching the same read tap at 10 m intervals and then replacing it with a simulator which simulated the read tap's effect on the optical signal 31 was repeated until 218 simulators and the read tap, each separated by 10 m, were disposed on the optical fiber. The optical power sequentially detected at the second end of the fiber, total cumulative losses, and non-cumulative excess losses are set forth in Table 1, the total cumulative losses and non-cumulative excess losses being illustrated in FIGS. 6 and 7.

TABLE 1

| Tap Number | End Detected Power (mw) | Cum. Total Loss (Cum. Detected Power + Cum. Excess Loss) (dB) | Non-Cum. Excess Loss (dB) |
|---|---|---|---|
| 0 | 8.42 | | |
| 1 | 8.32 | 0.052 | 0.051 |
| 2 | 8.22 | 0.104 | 0.052 |
| 3 | 8.14 | 0.147 | 0.042 |
| 4 | 8.08 | 0.179 | 0.031 |
| 5 | 8.00 | 0.222 | 0.043 |
| 6 | 8.04 | 0.200 | 0.069 |
| 7 | 7.93 | 0.260 | 0.059 |
| 8 | 7.76 | 0.354 | 0.094 |
| 9 | 7.62 | 0.433 | 0.078 |
| 10 | 7.53 | 0.485 | 0.051 |
| 11 | 7.62 | 0.433 | 0.090 |
| 12 | 7.52 | 0.491 | 0.057 |
| 13 | 7.41 | 0.555 | 0.063 |
| 14 | 7.34 | 0.596 | 0.041 |
| 15 | 7.25 | 0.650 | 0.053 |
| 16 | 7.29 | 0.626 | −0.024 |
| 17 | 7.08 | 0.753 | 0.042 |
| 18 | 6.98 | 0.814 | 0.061 |
| 19 | 6.94 | 0.839 | 0.024 |
| 20 | 6.85 | 0.896 | 0.056 |
| 21 | 6.69 | 0.999 | 0.102 |
| 22 | 6.61 | 1.05 | 0.051 |
| 23 | 6.54 | 1.10 | 0.045 |
| 24 | 6.49 | 1.13 | 0.033 |
| 25 | 6.44 | 1.16 | 0.033 |
| 26 | 6.38 | 1.20 | |
| 27 | 6.34 | 1.23 | 0.027 |
| 28 | 6.27 | 1.28 | 0.047 |
| 29 | 6.22 | 1.31 | 0.034 |
| 30 | 6.16 | 1.36 | 0.041 |
| 31 | 6.11 | 1.39 | 0.035 |
| 32 | 6.07 | 1.42 | 0.028 |
| 33 | 6.03 | 1.45 | 0.028 |
| 34 | 6.00 | 1.47 | 0.021 |
| 35 | 5.97 | 1.49 | 0.021 |
| 36 | 5.93 | 1.52 | 0.050 |
| 37 | 5.89 | 1.55 | 0.029 |
| 38 | 5.85 | 1.58 | 0.029 |
| 39 | 5.81 | 1.61 | 0.029 |
| 40 | 5.76 | 1.65 | 0.037 |
| 41 | 5.84 | 1.59 | 0.036 |
| 42 | 5.81 | 1.61 | 0.022 |
| 43 | 5.77 | 1.64 | 0.029 |
| 44 | 5.74 | 1.66 | 0.022 |
| 45 | 5.69 | 1.70 | 0.037 |
| 46 | 5.64 | 1.74 | 0.037 |
| 47 | 5.61 | 1.76 | 0.022 |
| 48 | 5.58 | 1.79 | 0.022 |
| 49 | 5.52 | 1.83 | 0.046 |
| 50 | 5.48 | 1.86 | 0.031 |
| 51 | 5.46 | 1.88 | 0.015 |
| 52 | 5.46 | 1.88 | −0.001 |
| 53 | 5.47 | 1.87 | −0.009 |
| 54 | 5.45 | 1.89 | 0.015 |
| 55 | 5.42 | 1.91 | 0.023 |
| 56 | 5.38 | 1.94 | 0.031 |
| 57 | 5.34 | 1.98 | 0.031 |
| 58 | 5.28 | 2.03 | 0.048 |
| 59 | 5.25 | 2.05 | 0.024 |
| 60 | 5.23 | 2.07 | 0.016 |
| 61 | 5.29 | 2.02 | 0.040 |
| 62 | 5.26 | 2.04 | 0.024 |
| 63 | 5.25 | 2.05 | 0.007 |
| 64 | 5.22 | 2.08 | 0.024 |
| 65 | 5.19 | 2.10 | 0.024 |
| 66 | 5.16 | 2.13 | 0.024 |
| 67 | 5.14 | 2.14 | 0.016 |
| 68 | 5.10 | 2.18 | 0.033 |
| 69 | 5.07 | 2.20 | 0.025 |
| 70 | 5.03 | 2.24 | 0.033 |
| 71 | 4.99 | 2.27 | 0.034 |
| 72 | 4.96 | 2.30 | 0.025 |
| 73 | 4.92 | 2.33 | 0.034 |
| 74 | 4.91 | 2.34 | 0.008 |
| 75 | 4.90 | 2.35 | 0.008 |
| 76 | 4.93 | 2.32 | 0.025 |
| 77 | 4.91 | 2.34 | 0.017 |
| 78 | 4.86 | 2.39 | 0.043 |
| 79 | 4.84 | 2.40 | 0.017 |
| 80 | 4.83 | 2.41 | 0.008 |
| 81 | 4.83 | 2.41 | 0.044 |
| 82 | 4.80 | 2.44 | 0.026 |
| 83 | 4.79 | 2.45 | 0.008 |
| 84 | 4.76 | 2.48 | 0.026 |
| 85 | 4.74 | 2.49 | 0.017 |
| 86 | 4.70 | 2.53 | 0.036 |
| 87 | 4.68 | 2.55 | 0.017 |
| 88 | 4.66 | 2.57 | 0.018 |
| 89 | 4.63 | 2.60 | 0.027 |
| 90 | 4.61 | 2.62 | 0.018 |
| 91 | 4.51 | 2.71 | 0.047 |
| 92 | 4.47 | 2.75 | 0.038 |
| 93 | 4.44 | 2.78 | 0.028 |

TABLE 1-continued

| Tap Number | End Detected Power (mw) | Cum. Total Loss (Cum. Detected Power + Cum. Excess Loss) (dB) | Non-Cum. Excess Loss (dB) |
|---|---|---|---|
| 94 | 4.43 | 2.79 | 0.009 |
| 95 | 4.39 | 2.83 | 0.038 |
| 96 | 4.37 | 2.85 | 0.019 |
| 97 | 4.35 | 2.87 | 0.019 |
| 98 | 4.33 | 2.89 | 0.019 |
| 99 | 4.30 | 2.92 | 0.029 |
| 100 | 4.29 | 2.93 | 0.009 |
| 101 | 4.41 | 2.81 | −0.100 |
| 102 | 4.36 | 2.86 | −0.051 |
| 103 | 4.33 | 2.89 | 0.029 |
| 104 | 4.29 | 2.93 | 0.039 |
| 105 | 4.27 | 2.95 | 0.019 |
| 106 | 4.25 | 2.97 | 0.019 |
| 107 | 4.23 | 2.99 | 0.019 |
| 108 | 1.75 | 6.82 | 3.830 |
| 109 | 1.71 | 6.92 | 0.098 |
| 110 | 1.70 | 6.95 | 0.023 |
| 111 | 1.68 | 7.00 | 0.049 |
| 112 | 1.66 | 7.05 | 0.049 |
| 113 | 1.65 | 7.08 | 0.024 |
| 114 | 1.62 | 7.16 | 0.077 |
| 115 | 1.62 | 7.16 | −0.003 |
| 116 | 1.60 | 7.21 | 0.051 |
| 117 | 1.59 | 7.24 | 0.024 |
| 118 | 1.60 | 7.21 | −0.023 |
| 119 | 1.595 | 7.22 | 0.011 |
| 120 | 1.586 | 7.25 | 0.022 |
| 121 | 1.577 | 7.28 | 0.022 |
| 122 | 1.558 | 7.33 | 0.050 |
| 123 | 1.552 | 7.34 | 0.014 |
| 124 | 1.539 | 7.38 | 0.034 |
| 125 | 1.526 | 7.42 | 0.034 |
| 126 | 1.520 | 7.43 | 0.014 |
| 127 | 1.514 | 7.45 | 0.014 |
| 128 | 1.503 | 7.48 | 0.029 |
| 129 | 1.501 | 7.49 | 0.003 |
| 130 | 1.484 | 7.54 | 0.047 |
| 131 | 1.494 | 7.51 | −0.032 |
| 132 | 1.487 | 7.53 | 0.017 |
| 133 | 1.513 | 7.45 | −0.078 |
| 134 | 1.510 | 7.46 | 0.006 |
| 135 | 1.506 | 7.47 | 0.009 |
| 136 | 1.500 | 7.49 | 0.014 |
| 137 | 1.493 | 7.51 | 0.017 |
| 138 | 1.515 | 7.45 | 0.020 |
| 139 | 1.514 | 7.45 | 0.000 |
| 140 | 1.505 | 7.48 | 0.023 |
| 141 | 1.502 | 7.49 | 0.006 |
| 142 | 1.501 | 7.49 | 0.000 |
| 143 | 1.499 | 7.49 | 0.003 |
| 144 | 1.490 | 7.52 | 0.023 |
| 145 | 1.489 | 7.52 | 0.000 |
| 146 | 1.487 | 7.53 | 0.003 |
| 147 | 1.478 | 7.56 | 0.023 |
| 148 | 1.457 | 7.62 | 0.006 |
| 149 | 1.467 | 7.59 | −0.033 |
| 150 | 1.457 | 7.62 | 0.027 |
| 151 | 1.456 | 7.62 | 0.000 |
| 152 | 1.453 | 7.63 | 0.006 |
| 153 | 1.449 | 7.64 | 0.009 |
| 154 | 1.445 | 7.65 | 0.009 |
| 155 | 1.440 | 7.67 | 0.012 |
| 156 | 1.434 | 7.69 | 0.015 |
| 157 | 1.432 | 7.69 | 0.003 |
| 158 | 1.412 | 7.75 | 0.006 |
| 159 | 1.413 | 7.75 | −0.006 |
| 160 | 1.410 | 7.76 | 0.006 |
| 161 | 1.407 | 7.77 | 0.006 |
| 162 | 1.400 | 7.79 | 0.018 |
| 163 | 1.400 | 7.79 | −0.003 |
| 164 | 1.400 | 7.79 | −0.003 |
| 165 | 1.397 | 7.80 | 0.006 |
| 166 | 1.394 | 7.81 | 0.006 |
| 167 | 1.390 | 7.82 | 0.009 |
| 168 | 1.360 | 7.92 | 0.059 |
| 169 | 1.353 | 7.94 | 0.019 |
| 170 | 1.348 | 7.96 | 0.013 |
| 171 | 1.343 | 7.97 | 0.013 |
| 172 | 1.341 | 7.98 | 0.003 |
| 173 | 1.333 | 8.01 | 0.023 |
| 174 | 1.330 | 8.01 | 0.006 |
| 175 | 1.328 | 8.02 | 0.003 |
| 176 | 1.325 | 8.03 | 0.006 |
| 177 | 1.324 | 8.03 | 0.000 |
| 178 | 1.321 | 8.04 | −0.006 |
| 179 | 1.321 | 8.04 | −0.003 |
| 180 | 1.317 | 8.06 | 0.010 |
| 181 | 1.316 | 8.06 | 0.000 |
| 182 | 1.312 | 8.07 | 0.010 |
| 183 | 1.306 | 8.09 | 0.016 |
| 184 | 1.300 | 8.11 | 0.017 |
| 185 | 1.300 | 8.11 | −0.003 |
| 186 | 1.297 | 8.12 | 0.007 |
| 187 | 1.293 | 8.14 | 0.010 |
| 188 | 1.292 | 8.14 | 0.000 |
| 189 | 1.286 | 8.16 | 0.017 |
| 190 | 1.282 | 8.17 | 0.010 |
| 191 | 1.277 | 8.19 | 0.016 |
| 192 | 1.276 | 8.19 | 0.000 |
| 193 | 1.269 | 8.22 | 0.020 |
| 194 | 1.265 | 8.23 | 0.010 |
| 195 | 1.259 | 8.25 | 0.017 |
| 196 | 1.259 | 8.25 | −0.003 |
| 197 | 1.259 | 8.25 | −0.003 |
| 198 | 1.235 | 8.34 | −0.003 |
| 199 | 1.235 | 8.34 | −0.003 |
| 200 | 1.233 | 8.35 | 0.003 |
| 201 | 1.232 | 8.35 | 0.000 |
| 202 | 1.226 | 8.37 | 0.018 |
| 203 | 1.225 | 8.37 | 0.000 |
| 204 | 1.220 | 8.39 | 0.014 |
| 205 | 1.215 | 8.41 | 0.014 |
| 206 | 1.215 | 8.41 | −0.003 |
| 207 | 1.215 | 8.41 | −0.003 |
| 208 | 1.203 | 8.45 | 0.018 |
| 209 | 1.200 | 8.46 | 0.007 |
| 210 | 1.195 | 8.48 | 0.014 |
| 211 | 1.192 | 8.49 | 0.007 |
| 212 | 1.188 | 8.50 | 0.011 |
| 213 | 1.184 | 8.52 | 0.011 |
| 214 | 1.184 | 8.52 | −0.004 |
| 215 | 1.181 | 8.53 | 0.007 |
| 216 | 1.177 | 8.54 | 0.011 |
| 217 | 1.172 | 8.56 | 0.015 |
| 218 | 1.172 | 8.56 | −0.004 |
| 219 | 1.168 | 8.58 | 0.011 |

As Table 1 and FIGS. 6 and 7 indicate, though the first few taps (e.g. first 5 or 10) have extremely low excess losses, averaging less than 0.05 dB, the excess losses of taps downstream therefrom is even less, the average total loss for the 219 simulator tap experiment being 0.0217 dB. The apparent 3.83 dB drop between taps 107 and 108 was not a tap loss but rather a fiber loss. The experiment was started using only 1.1 km link of fiber since it was not expected that so many taps could be attached to a single fiber link and yet have power downstream therefrom, and after the 107th tap, another 1.1 km link of graded index fiber identical to that being used was spliced to the original link, and the total loss of the additional fiber link and splice was about 3.82 dB. The apparent negative total losses occasionally measured are believed the result of unnoticeably eliminating a slight attenuation causing bend in the optical fiber inadvertently created by application of a previous simulator or read tap, which attenuation causing bend would have caused a total loss for a prior tap to seem larger than that actually created by that tap. Since the method and means of withdrawing light of the invention is so efficient, it is not surprising that the attenuation caused by removal of such a slight attenuation causing bend exceeds the attenuation caused by the reattachment of the read tap which removed such a bend. Such attenuating bends are believed to have had a neglible effect on the experimental results considered as a whole, and no doubt an actual installed network using read taps of the invention would have some such occasional bends as well. Finally, the excess and total losses were all calculated based on actual end powers measured immediately before and after attaching the read tap. However, small fluctuations in laser output over the course of the experiment resulted in end detected measured powers which occasionally appear to not be consistent with the tabulated losses, all such apparent inconsistencies being due to the laser fluctuation.

It should further be noted that the same read tap was used for each measurement to minimize variations which could be caused by multiple optical couplers 32, lens 35, and photodetectors 34, with the read tap being adjusted at each of its locations so that a constant 1 μw of optical power was detected at each location.

EXAMPLE 2

As an extension of Example 1 whereby it is established that constant (1 μw) detectable amounts of light can be sequentially withdrawn from an optical fiber using light read taps of the invention, another experiment was done to establish that detectable table amounts of light could be sequentially withdrawn from sequential optical fiber bends using a constant sector angle and constant bend radius profile. Accordingly, upstream taps would be expected to withdraw and detect slightly larger amounts of light than downstream taps since the light intensity at upstream fiber locations would exceed downstream intensities. An advantage of detecting constant amounts of light as in Example 1 is electrical circuit simplification, a disadvantage being the creation of non-uniform bend radius profiles, and possibly nonuniform tap designs. An advantage of constant bend radius profiles is uniform network tap design, a disadvantage being the possible requirement of circuit equalization schemes.

The sector angles α and bend radius profiles of the last 30 taps in Example 1 were analyzed and found to be nearly constant, being about 30°, the minimum bend radius r being about 3.84 mm and being substantially constant over the bent region 46. Accordingly, 100 simulators were formed so as to each have a constant bend radius of 3.84 mm over a 30° sector angle α.

Another 1.1 km optical fiber link using the same type of graded index fiber used in Example 1 had one end connected to a laser, with a photodetector being attached to the opposite second fiber end, and the optical power at the photodetector was read. Subsequently, the simulators were attached to the optical fiber sequentially at 10 m intervals from the laser, and the optical power at the photodetector at the opposite second end was sequentially read after the attachment of each simulator, and the total attenuation induced by each simulator calculated. The results of this example are set forth in Table 2, and the cumulative and non-cumulative total losses are illustrated in FIGS. 8 and 9.

TABLE 2

| Simulator Number | End Detected Power (mw) | Cum. Total Loss (dB) | Non-Cum. Total Loss (dB) |
|---|---|---|---|
| 0 | 10.30 | 0.00 | 0.00 |
| 1 | 10.00 | 0.13 | 0.13 |
| 2 | 9.80 | 0.22 | 0.09 |
| 3 | 9.50 | 0.35 | 0.14 |
| 4 | 9.32 | 0.43 | 0.08 |
| 5 | 8.22 | 0.98 | 0.55 |
| 6 | 7.43 | 1.42 | 0.44 |
| 7 | 7.33 | 1.48 | 0.06 |
| 8 | 6.85 | 1.77 | 0.29 |
| 9 | 6.44 | 2.04 | 0.27 |
| 10 | 6.20 | 2.20 | 0.16 |
| 11 | 6.12 | 2.26 | 0.06 |
| 12 | 6.14 | 2.25 | 0.01 |
| 13 | 5.88 | 2.43 | 0.19 |
| 14 | 5.75 | 2.53 | 0.10 |
| 15 | 5.55 | 2.69 | 0.15 |
| 16 | 5.42 | 2.79 | 0.10 |
| 17 | 5.38 | 2.82 | 0.03 |
| 18 | 5.33 | 2.86 | 0.04 |
| 19 | 5.30 | 2.89 | 0.02 |
| 20 | 5.22 | 2.95 | 0.07 |
| 21 | can't locate | | |
| 22 | 5.20 | 2.97 | 0.02 |
| 23 | 5.16 | 3.00 | 0.03 |
| 24 | 5.10 | 3.05 | 0.05 |
| 25 | 5.02 | 3.12 | 0.07 |
| 26 | 4.98 | 3.16 | 0.03 |
| 27 | 5.00 | 3.14 | −0.02 |
| 28 | 4.92 | 3.21 | 0.07 |
| 29 | 4.87 | 3.25 | 0.04 |
| 30 | 4.83 | 3.29 | 0.04 |
| 31 | 4.82 | 3.30 | 0.01 |
| 32 | 4.82 | 3.30 | 0.00 |
| 33 | 4.75 | 3.36 | 0.06 |
| 34 | 4.78 | 3.33 | −0.03 |
| 35 | 4.73 | 3.38 | 0.05 |
| 36 | 4.68 | 3.43 | 0.05 |
| 37 | 4.66 | 3.44 | 0.02 |
| 38 | 4.61 | 3.49 | 0.05 |
| 39 | 4.61 | 3.49 | 0.00 |
| 40 | 4.58 | 3.52 | 0.03 |
| 41 | 4.55 | 3.55 | 0.03 |
| 42 | 4.50 | 3.60 | 0.05 |
| 43 | 4.45 | 3.64 | 0.05 |
| 44 | 4.43 | 3.66 | 0.02 |
| 45 | 4.42 | 3.67 | 0.01 |
| 46 | 4.41 | 3.68 | 0.01 |
| 47 | 4.39 | 3.70 | 0.02 |
| 48 | 4.37 | 3.72 | 0.02 |
| 49 | 4.32 | 3.77 | 0.05 |
| 50 | 4.30 | 3.79 | 0.02 |
| 51 | 4.27 | 3.82 | 0.03 |
| 52 | 4.23 | 3.86 | 0.04 |
| 53 | 4.21 | 3.89 | 0.02 |
| 54 | 4.17 | 3.93 | 0.04 |
| 55 | 4.14 | 3.96 | 0.03 |
| 56 | 4.11 | 3.99 | 0.03 |
| 57 | 4.09 | 4.01 | 0.02 |
| 58 | 4.06 | 4.04 | 0.03 |
| 59 | 4.04 | 4.06 | 0.02 |
| 60 | 4.03 | 4.08 | 0.01 |
| 61 | 4.01 | 4.10 | 0.02 |
| 62 | 3.96 | 4.15 | 0.05 |
| 63 | 3.94 | 4.17 | 0.02 |
| 64 | 3.91 | 4.21 | 0.03 |
| 65 | 3.87 | 4.25 | 0.04 |
| 66 | 3.86 | 4.26 | 0.01 |
| 67 | 3.83 | 4.30 | 0.03 |
| 68 | 3.81 | 4.32 | 0.02 |
| 69 | 3.80 | 4.33 | 0.01 |
| 70 | 3.77 | 4.36 | 0.03 |
| 71 | 3.74 | 4.40 | 0.03 |
| 72 | 3.74 | 4.40 | 0.00 |
| 73 | 3.72 | 4.42 | 0.02 |
| 74 | 3.70 | 4.45 | 0.02 |
| 75 | 3.68 | 4.47 | 0.02 |
| 76 | 3.64 | 4.52 | 0.05 |
| 77 | 3.62 | 4.54 | 0.02 |

TABLE 2-continued

| Simulator Number | End Detected Power (mw) | Cum. Total Loss (dB) | Non-Cum. Total Loss (dB) |
|---|---|---|---|
| 78 | 3.63 | 4.53 | −0.01 |
| 79 | 3.60 | 4.57 | 0.04 |
| 80 | 3.56 | 4.61 | 0.05 |
| 81 | 3.56 | 4.61 | 0.00 |
| 82 | 3.54 | 4.65 | 0.02 |
| 83 | 3.51 | 4.68 | 0.04 |
| 84 | 3.50 | 4.69 | 0.01 |
| 85 | 3.46 | 4.74 | 0.05 |
| 86 | 3.43 | 4.78 | 0.04 |
| 87 | 3.38 | 4.84 | 0.06 |
| 88 | 3.39 | 4.83 | −0.01 |
| 89 | 3.36 | 4.86 | 0.04 |
| 90 | 3.32 | 4.92 | 0.05 |
| 91 | 3.30 | 4.94 | 0.03 |
| 92 | 3.25 | 5.01 | 0.07 |
| 93 | 3.24 | 5.02 | 0.01 |
| 94 | 3.22 | 5.05 | 0.03 |
| 95 | 3.18 | 5.10 | 0.05 |
| 96 | 3.17 | 5.12 | 0.01 |
| 97 | 3.17 | 5.12 | 0.00 |
| 98 | 3.14 | 5.16 | 0.04 |
| 99 | 3.13 | 5.17 | 0.01 |
| 100 | 3.12 | 5.19 | 0.01 |

FIGS. 8 and 9 of example 2 illustrate trends remarkably similar to the trends revealed by FIGS. 6 and 7 of example 1. That is, the first several read taps produce total losses much higher than do later applied read taps, even though the same taps and simulators were used during the course of each experiment. In example 2, the first several simulators created a total average loss of about 0.2 dB with the remaining downstream simulators creating a total average loss of about 0.03 dB, with many of these remaining downstream simulators creating total losses much less than 0.03 dB. The difference in average total attenuation between the first several simulators and the remaining downstream simulators is larger than the difference in average total attenuation between the first several read taps and remaining downstream taps of example 1. In example 1, the read tap was adjusted at each position so as to detect only 1 μw of power and hence created relatively minor bend radius profiles at upstream locations where the fiber had its maximum optical power, whereas the upstream simulators of example 2 probably created more severe bend radius profiles than would be required to withdraw a predetermined minimum amount of power, and hence probably would have detected larger amounts of light than simulators downstream thereof, had the simulators included detection means therein.

Example 2 clearly verifies identically constructed taps are capable of sequentially withdrawing sufficient parts or portions of an optical signal from a fiber so as to allow sequential detection of the signal, and that the fiber does not "run out" of light modes detectable at bends. Examples 1 and 2 verify that networks utilizing read taps of the invention, whether uniform or nonuniform in design, will operate as intended to sequentially detect parts of an optical signal in the fiber in a low loss manner.

When light is withdrawn from an optical fiber through its side at a bend, outermost light modes are most likely to be withdrawn, with the probability of withdrawal decreasing for each decreasingly ordered mode. Also, if an optical fiber is continuously bent about a constant radius over an ever increasing sector angle, the outermost modes capable of being withdrawn are quickly depleted until a point is reached whereby a neglible amount of light or modes can be withdrawn by further increasing the sector angle. This phenomenon is known by the prior art, one example and application thereof being the practice of wrapping an optical fiber a plurality of turns about a constant radius in the laboratory in order to withdraw the outermost modes to achieve a stable steady state light mode distribution downstream of the fiber turns for experimental purposes. It is known that a stable steady state light mode distribution will be reached after about 5–7 turns, e.g. the relatively lossy outermost modes will substantially all have been withdrawn, and that further turns will not withdraw a significant amount of further light or modes. This is illustrated by example 3.

EXAMPLE 3

A graded index fiber of the type used in examples 1 and 2 had a laser attached to one end and a photodetector attached to an opposite second end. The fiber was then wrapped a plurality of turns about a constant radius of 3.84 mm, and the amount of light detected by the photodetector was measured at a 180° sector angle and at 360° increments thereof. The results are tabulated in Table 3 and illustrated in FIG. 10.

TABLE 3

| Sector Angle (degrees) | Turns | End Detected Power (mW) | Average Change per 30° Sector Angle (uW) |
|---|---|---|---|
| 0 | 0 | 1.745 | — |
| 180 | ½ | 1.180 | 47.1 |
| 540 | 1½ | 0.950 | 19.2 |
| 900 | 2½ | 0.810 | 11.7 |
| 1260 | 3½ | 0.770 | 3.3 |
| 1620 | 4½ | 0.745 | 2.1 |
| 1980 | 5½ | 0.730 | 1.3 |
| 2340 | 6½ | 0.720 | 0.83 |
| 2700 | 7½ | 0.710 | 0.83 |
| 3060 | 8½ | 0.703 | 0.58 |
| 3420 | 9½ | 0.703 | 0.00 |
| 3780 | 10½ | 0.700 | 0.25 |
| 4140 | 12½ | 0.692 | 0.67 |
| 4860 | 13½ | 0.690 | 0.17 |
| 5220 | 14½ | 0.685 | 0.42 |
| 5580 | 15½ | 0.685 | 0.00 |

In addition to illustrating the light attenuation results of example 3, FIG. 10 further illustrates the light attenuation results of experiment 2, which as will be recalled, sequentially bent an optical fiber about a bend radius equal to that used in example 3, with each 30° sequential bend being separated from each former 30° bend by 10 m. The data points for FIG. 10 taken from table 2 correspond with simulator number 6 (180° total bend sector angle (30°×6)), 18 (540° total sector angle), 30 (900°), 42 (1260°), etc. FIG. 10 demonstrates the discovery that sequential read taps of the invention function in a new and unexpected manner than would have previously been predicted, and are capable of withdrawing detectable amounts of light long after they could otherwise be expected to do so.

To determine why sequential read taps of the invention function in this new and unexpected manner, a further experiment was conducted to determine the fiber mode distribution as a function of the number of read taps on the fiber, this experiment being explained in example 4.

EXAMPLE 4

A graded index optical fiber of the type used in Examples 1-3 had a laser connected to one end and a near field pattern analyzer connected to an opposite second end thereof 1.1 km from the laser. The near field pattern analyzer was capable of determining the light intensity across the fiber core.

With no read taps attached to the fiber, the point light distribution across a diameter of the fiber was measured with the analyzer. Subsequently, a first read tap was attached to the fiber 20 m from the laser and adjusted to detect 1 μw of power, and the point light intensity distribution across the diameter of the fiber was again measured. Thereafter, with the first read tap left in place, a second read tap was attached to the fiber 10 m from the first tap and the point light intensity distribution was again measured. Then, third, fourth, fifth and sixth real read taps were sequentially attached to the fiber at intervals of 10 m, and the point light intensity distributions were sequentially measured. The measured point light intensity distributions are illustrated in FIGS. 11-17, respectively. Subsequently, the measured point light intensity distributions were integrated over the cross-sectional area of the core to determine the modal energy intensity distribution in the core, and the calculated energy intensity distributions are illustrated in FIGS. 18-24, respectively.

In each of FIGS. 11-24 a pair of vertical lines disposed on opposite sides of a center of the core are illustrated, an area between these lines representing a core center region 94 having a diameter of 50 μm, with an area outside these lines and bounded by the fiber buffer forming a core annulus 96 having a width of 25 μm, as illustrated in FIG. 25. In each of FIGS. 11-17, the average point light intensity across a diameter of the core center region 94 was calculated, and the average point light intensity of first and second annulus diameters 97, 98 was calculated and divided by the average point light intensity along a diameter of the center core region, this ratio being shown in FIGS. 11-17 in the left-most annular section of the drawings, the figure "1" in the core center region representing the average point light intensity in the center region normalized to 1. The average point light intensities are illustrated in Table 4. The diameters 95, 97 and 98 in FIG. 25 together form a complete diameter of the core of the graded index fiber, these diameters being shown slightly offset for ease of illustration. In each of FIGS. 18-24, the average energy in the central core region and annulus was calculated, and these values are illustrated in these figures and tabulated in Table 4.

EXAMPLE 5

To determine if the use of simulators accurately simulate the effect of real read taps, Example 4 was repeated by sequentially attaching six simulators to the graded index fiber at locations relative to the laser and analyzer identical to where the real read taps were attached so as to sequentially attenuate identical amounts of light as did the six read taps, and the sequential measured point light intensity distributions and normalized averages thereof are illustrated in FIGS. 26-31, and shown in Table 4. The integrated modal energy intensity distributions for the simulators are illustrated in FIGS. 32-37, and also shown in Table 4. Thereafter, an additional 100 simulators were sequentially attached at 10 m spacings to the optical fiber bringing the total number of attached simulators to 106. Point light intensity distributions were measured subsequent to the attachments of each tenth additional simulator, e.g. subsequent to simulator number 16, 26, 36, etc., and the average point light intensity ratio between the core annulus and core center region was calculated and is shown in Table 5.

By comparing FIGS. 12-17 with FIGS. 26-31, and FIGS. 19-24 with FIGS. 32-37, and by studying Table 4, and considering the effects of experimental error, it was found that the simulators accurately simulate the effect of real read taps, and in particular the effect thereof on a pre-existing source signal in an optical fiber.

TABLE 4

| Tap and Simulator Number | Ave. Point Light Intensity Dist. Ratio B/W Core Annulus & Center Region of ( :1): | | Percent Energy in Center Region for: | | Percent Energy in Core Annulus for: | |
| --- | --- | --- | --- | --- | --- | --- |
| | Real Tap | Simulator | Real Tap | Simulator | Real Tap | Simulator |
| 0 | 0.23 | 0.23 | 59.07 | 59.07 | 40.92 | 40.92 |
| 1 | 0.15 | 0.16 | 68.84 | 67.72 | 31.15 | 32.27 |
| 2 | 0.12 | 0.14 | 73.21 | 70.97 | 26.78 | 29.82 |
| 3 | 0.1 | 0.12 | 76.8 | 73.91 | 23.19 | 26.08 |
| 4 | 0.09 | 0.1 | 79.08 | 76.71 | 20.91 | 23.28 |
| 5 | 0.08 | 0.09 | 81.98 | 78.03 | 18.9 | 21.96 |
| 6 | 0.08 | 0.09 | 81.33 | 78.87 | 18.66 | 21.12 |

TABLE 5

| Simulator Number | Ave. Point Light Intensity Dist. Ratio B/W Core Annulus & Center Region ( :1) |
| --- | --- |
| 0 | 0.23 |
| 1 | 0.16 |
| 2 | 0.14 |
| 3 | 0.12 |
| 4 | 0.10 |
| 5 | 0.09 |
| 6 | 0.09 |
| 16 | 0.09 |
| 26 | 0.09 |
| 36 | 0.09 |
| 46 | 0.09 |
| 56 | 0.09 |
| 66 | 0.09 |
| 76 | 0.09 |
| 86 | 0.09 |
| 96 | 0.09 |
| 106 | 0.09 |

Table 5 reveals that the average point light intensity distribution between the core annulus and center regions falls by the addition of the first five simulators, and then remains relatively constant up to the attachment of the 106th simulator.

Since this ratio is indicative of the percent amount of tapable outermost modes in the optical fiber, the new and unexpected discovery is that sufficient mode regeneration occurs between taps to allow repetitive detection of an optical signal in an optical fiber, as opposed to when a fiber is continuously wrapped about a constant radius, and that detectable amounts of power can be withdrawn without utilizing special mode mixing schemes which attenuate light without detecting an optical signal.

Accordingly, numerous light read taps of the invention can be attached to an optical fiber to sequentially withdraw light therefrom, and since the excess loss of the light read taps of the invention is extremely small, a relatively large number of taps can be disposed on an optical fiber in series, as opposed to prior art taps which have much higher excess losses.

Though the examples cited above all used a particular type of graded index fiber, the invention is useable with other types of fibers having various index of refraction profiles extending across the fiber core and cladding, including multimode fibers having step index or graded index profiles and fibers having varying types of index of refraction cladding profiles. The invention is usable with monomode fiber as well, though monomode fiber is more sensitive to work with and supports less total power than multimode fiber.

FIGS. 38 and 39 illustrate two preferred embodiments of light read taps of the invention, FIG. 38 showing a read tap 23 having a rounded groove 70 having a contour conforming to an outer surface contour of the buffer of the fiber 12. Preferably the surface of the rounded groove 70 is made of a material which couples minimum to no light into the groove 70, the groove 70 having a "window" therein at the coupling area 41 whereat the optical coupler 32 confronts and contacts the bent region 46 of the optical fiber 12. The groove 70 could be made of an optically reflective material, and/or could be made of a material having an index of refraction sufficiently low so as to form a waveguide with the buffer at the bend so that light entering the buffer upstream of the coupling area 41 does not prematurely leave the buffer and enter the material of the groove, or be scattered by the groove, prior to reaching the optical coupler 32. Preferably a surface shape of the optical coupler 32 confronting the fiber buffer within the groove 70 is substantially the same as the shape of the bent fiber buffer at the coupling area 41 to minimize microbending stresses induced in the fiber 12.

The embodiment of FIG. 39 utilizes a V-groove 71 rather than the rounded groove 70 of FIG. 28, with the optical coupler 32 protruding within the V-groove 71 at the coupling area 41. Since a bottom 72 of the V-groove contains air which has an index of refraction of about 1, outermost buffer modes tend not to exit the outermost bent portion 73 of the buffer prior to reaching the coupling area 41. Preferably side walls of the groove 71 are made of a non-optical coupling material, such as an optically reflective material or a material having an index of refraction substantially lower than that of the outermost layer of the buffer.

In FIG. 39, the tap includes a short "pigtail" optical fiber 75 as could the embodiment of FIG. 38 as well as other tap embodiments, first and second ends 76, 77 of the fiber 75 being capable of being connected to an optical fiber 12 to be tapped. The use of a read tap having a pigtail optical fiber therein is advantageous in that factory alignment and optimization between coupling means 32, 34, 35 and a core of the fiber 75 is possible, a disadvantage is that the fiber 12 must be terminated and connected to the first and second ends of the fiber 75, and some slight attenuation will result at the connections. An advantage of connecting a read tap directly to the fiber 12 to be tapped without terminating the fiber 12 or "destroying" it in any way is the avoidance of the need to connectorize ends of fibers, which is troublesome and creates connectorization losses, a disadvantage is that in field alignment between the coupling means 32, 34, 35 and the core of the fiber 12 is required.

The tap embodiments of FIGS. 38 and 39 are exemplary only, the invention including all functional variations thereof embodying the invention illustrated and described with reference to the previous FIGS. .

It has further been determined that optical fiber minimum bend radii used in the previous experiments creates surprising and unexpected low probabilities of fiber breakage such that it is possible to utilize read and write taps of the invention on an optical fiber so as to substantially continuously permanently maintain various sections of the optical fiber in a bent attitude with minimum risk that any one of the fiber sections will fail by fracturing. In fact, it has theoretically and experimentally been determined that a permanent bend in an optical fiber of the type of the previous examples which has a minimum bend radius equal to 3.5 mm over a 45° sector angle creates less than a 10% chance of fracturing the fiber section in 20 years, and a 3.8 mm minimum bend radius over 45° creates less than a $1.5 \times 10^{-2}$% chance. of fracturing the fiber section in 20 years. Accordingly, as used herein, the term "substantially continuously maintained in a bent attitude" means that the fiber is maintained bent continuously over a substantial period of time, in particular in excess of a month, preferably in excess of 1 year, and even in excess of 5 and 10 years, preferably such that a probability of failure of the bent section is less than 0.1, more preferably less than $1.5 \times 10^{-2}$. Minimum bend radii equal to or in excess of 4.2 mm and 4.5 mm result in much lower probabilities of fiber breakage over extended periods of time, and are suitable for use with read and write taps of the invention. Hence, in the first aspect, the invention includes an optical fiber distribution network which comprises: an optical fiber; and N means for withdrawing N parts of an optical signal out of N optical fiber sections at N locations on the fiber such that the optical signal parts pass through a bent side of the N sections and through buffers thereat, the N sections being substantially continuously maintained in a bent attitude sufficient for continuously withdrawing the optical signal parts, N being an integer, the signal parts each being sufficiently large in magnitude for detecting information representative of the optical signal.

In another aspect, the invention includes an apparatus for reading information represented by an optical signal in an optical fiber, comprising; means for withdrawing a first part of the optical signal at a first location through a side of an optical fiber section, preferably through a buffer thereat, so as to create an optical signal excess loss less than 0.3 dB, preferably less than 0.1 dB, and most preferably less than 0.02 and 0.01 dB, and a detector for detecting the first part of the optical signal.

A yet further aspect of the invention is an apparatus for reducing a magnitude of an optical signal excess loss created by a light read tap which withdraws part of an optical signal representative of information out of an optical fiber through a side thereof, the apparatus comprising:

N means for modifying an energy distribution of an optical signal within an optical fiber upstream of a first location so as to reduce an integrated energy ratio between an outermost and an innermost section of a core of the optical fiber in a vicinity of the first location, N being an integer;

a first light read tap for withdrawing a first part of the optical signal at the first location through a side of an optical fiber section, an optical signal excess loss created by the first light read tap being less than an optical signal excess loss which would be created if the integrated energy ratio was not modified; and means for detecting the first part of the optical signal so as to detect information represented by the optical signal.

In the embodiments set forth above, N can be any number greater than 1, 5, 10, 15, 30, 50, 100, 150, 200, and even 219, as experimentally confirmed, and N can be as high as 500–1000 if such a network were deemed desirable, the only provision being that more powerful light sources than those used in the examples set forth above would be required for the furthest downstream taps to detect useful amounts of power.

In addition, it has further been discovered that sufficient mode regeneration between taps occurs within one meter downstream of any given tap, and accordingly the invention is usable in any network wherein a minimum spacing between taps is at least one meter.

Enhanced Bandwidth

An additional unexpected and surprising discovery of the invention is that of providing a novel and improved method and means of improving the bandwidth of optical fibers. The bandwidth of an optical fiber refers to the maximum frequency with which an optical signal can be modulated to achieve a predetermined minimum signal on-to-off ratio. If the optical signal is modulated at a frequency in excess of this maximum frequency and all other variables are maintained constant, the signal on-to-off ratio falls below the minimum ratio which increases a bit error rate beyond an acceptable limit for the network. FIG. 75 illustrates a typical graph of a signal on-to-off ratio as a function of modulation frequency, and from this figure it can be seen that the signal on-to-off ratio is maintained relatively constant up to a certain critical modulation frequency 55, and thereafter as the modulation frequency is increased above this point, the signal on-to-off ratio decreases. The graph of FIG. 75 assumes that the optical power detected at the various modulation frequencies remains constant. Obviously, if the amount of optical power detected is increased, assuming the noise level remains constant, the signal on-to-off ratio will increase as well.

Since bandwidth can limit the number of subscribers a network can service even if for practical purposes sufficient optical power exists in the network to accommodate additional subscribers, it can easily by realized that the available bandwidth limited by the minimum acceptable signal on-to-off ratio can be a limiting factor in a network. Accordingly, continual and extensive efforts have been made by the prior art to increase the bandwidth of optical fibers.

To increase bandwidth, skilled prior art workers have moved from step index multimode optical fibers, to graded index multimode optical fibers, and finally to monomode optical fibers. However, as is well known, since monomode optical fibers have relatively small fiber cores, being of the order of 5–10 microns, the use of a monomode optical fiber to increase bandwidth results in a network having less total optical power available for tapping since the amount of power a fiber can support increases with the size of the fiber care. In view of this drawback, extensive efforts have continued to be made by skilled art workers to increase the bandwidth of multimode optical fibers, both step and graded index, and these efforts and solutions created thereby each present problems and difficulties.

As the prior art has recognized, bandwidth is increased when the modes of light reach a detector at the same time. Prior art efforts to limit the number of modes reaching the detector have largely been focused on methods and means for eliminating the outermodes by either trying to get such modes to couple downward and/or by simply causing such modes to be parasitically attenuated, the desire being that no outermost modes arrive at the detector at times significantly different than the innermost modes. These efforts are all disadvantageous since bandwidth is increased at the expense of losing optical power since these efforts tend to attenuate some of the outermost modes, and many of these efforts are also unduly expensive to implement. In fact, the primary driving force behind the development of monomode fiber was to provide an improved method and means for eliminating the outermost modes and the different time of arrival times thereof as compared to innermost modes.

Other elaborate schemes have also been proposed for increasing bandwidth, such as the use of light funnels, or stripping the buffer and cladding from the optical fiber, such schemes attempting to separately detect the modes, and these schemes, though intriguing, are marginally productive, are relatively complicated, relatively expensive, and accordingly have to date not easily been adaptable for widespread use. Accordingly, efforts continue to be focused on simply eliminating the outermost modes in one way or another such that only innermost modes remain in the fiber in an attempt to achieve better bandwidth with multi-mode optical fiber.

According to the invention, bandwidth is increased, not by detecting only one or a few of the innermost modes as the prior art has attempted, but rather by detecting only one or a few of the outermost modes, the outermost modes being withdrawn from the optical fiber through the optical fiber buffer. The startling discovery is that side light read taps of the invention, in addition to producing all the surprising and unexpected advantages heretofore mentioned, can also significantly increase the bandwidth of an optical fiber otherwise believed by the prior art to be relatively poor in bandwidth, the bandwidth being increased in a relatively inexpensive manner as compared to prior art methods and means. To illustrate the effects and advantages of the method and means for increasing bandwidth of multimode optical fiber, either step or graded index, the following experiment was conducted.

EXAMPLE 6

A 1.1 km graded index fiber of the type used in the prior examples was connected to an end light source, and various bandwidth measurements were determined using a −3 dB method, that is, the modulation frequency was increased to determine at what point a maximum amplitude 57 of the signal on-to-off ratio fell 3 dB to point 56 illustrated in FIG. 75. The bandwidth of the fiber was first determined by detecting the light at the end of the optical fiber link using end detection techniques, and the bandwidth was again determined using various read taps of the invention which withdrew light out of a side of a fiber section at a bend, specifically read taps designed to withdraw 5%, 10% and 13%, respectively, of an optical signal in the fiber. The results of this experiment are set forth in Table 6.

TABLE 6

| Detector location (tap %) | Bandwidth (Mhz) |
|---|---|
| end detection | 128 |
| side read tap 5% | 222 |
| side read tap 10% | 224 |
| side read tap 13% | 181 |

As Example 6 indicates, the bandwidth of a graded index fiber is significantly increased by the use of read taps of the invention. In addition, it should be realized that the side read taps used in Example 6 were relatively high powered read taps in that they withdrew a relatively large amount of light from the optical fiber and hence a relatively large amount of optical signal modes which tends to introduce a relatively large time of arrival dispersion problem. By extrapolating the data of Table 6, it has been determined that a 1% light read tap would result in the end detection bandwidth being increased by a factor of 7½. It can readily be realized that using even lower powered read taps will result in even higher bandwidths since lower powered read taps require the withdrawal of fewer modes having less dispersion.

In addition, the bandwidth improvement of the invention, though significant for use with graded index fiber, is extremely significant when using step index optical fiber since time of arrival dispersion problems between modes is a significant problem with such fiber since a lensing effect achieved by graded index fiber is not achieved by step index fiber. Calculations indicate that the bandwidth improvement for step index fiber is two to three orders of magnitude, with a one order of magnitude improvement easily being possible. This is a significant advantage in situations where step index fiber is required rather than graded index fiber due to radiation hardness concerns or other concerns. In addition, the bandwidth improvement of the invention is more enhanced at operating light wavelengths were chromatic dispersion is minimum, e.g. approximately 1300 nanometers for silicon dioxide fibers, though significant improvements are achieved at optical fiber wavelengths where chromatic dispersion is greater, such as 820 nanometers.

Accordingly, the bandwidth invention includes the discovery and method utilized thereby of improving the bandwidth of an optical fiber, the method comprising the steps of injecting light pulses into an optical fiber, withdrawing a portion of the light pulses through a fiber buffer at a first location with a non-destructive light read tap, detecting light withdrawn by the light read tap using a detector so as to obtain a detected first power level and a first signal on-to-off ratio, the invention further including the step of injecting the light pulses into the optical fiber at a modulation frequency 58 in excess of a saturation modulation frequency 55, the saturation modulation frequency being that frequency whereby the detector would incur a second signal on-to-off ratio 59 which is less than the first signal on-to-off ratio 57 if the light pulses were detected by the detector at an end of the fiber at the first location at the first power level.

It can readily be understood that for consistency of comparison, due to pulse spreading along a length of an optical fiber, comparative measurements of bandwidth were done at a common location, e.g. "the first location", and that bandwidth comparisons between methods, such as side detection and end detection, necessarily must be made at identical detected signal power levels to give accurate comparisons since background noise generally tends to remain more or less constant.

Accordingly, it is seen that the invention includes a method of improving bandwidth of an optical fiber in a non-destructive manner, the non-destructive manner being withdrawing light out of a side of the optical fiber through its buffer, and with light read taps of the invention without extremely low excess losses, the bandwidth is improved at the expense of minimum power loss, the result being advantageous in that information representative of the optical signal is detected. In addition, from examining FIGS. 11-24 and FIGS. 26-37 it can readily be realized that the side light read taps of the invention have the additional effect of modifying the energy distribution within the core of an optical fiber so as to reduce a density of outermost modes therein which necessarily increases the bandwidth of the optical fiber at an end of the optical fiber downstream from the taps since time of arrival dispersion is minimized thereat. Accordingly, improved bandwidth downstream of side light read taps of the invention is achieved using either side or end detection techniques.

Method and Means of Light Injection

FIG. 40 illustrates the principle of operation of the write taps 22. Since FIG. 40 is in some ways similar to FIG. 5, FIG. 40 contains reference numerals increased by 100 to illustrate general parameters and components previously described in FIG. 5.

In FIG. 40, an optical signal 37 is propagating left to right in optical fiber 11. The optical signal 37 has previously been injected into the fiber 11 either through a side thereof or an end thereof.

The write tap 22 includes means for bending the fiber 11 so as to create a fiber bent region 146, and means for contacting an optical coupler 132 against an outermost layer of the fiber buffer at a coupling area 141 on an outside portion of the bent region 146. An optical signal 131 to be injected into the optical fiber 11 is generated by light source 134, preferably a laser or a light emitting diode (LED), and is focused by a lens 135, preferably a graded index lens, so as to propagate within the optical coupler 132 at an angle such that it will enter the fiber 11 within an angle of acceptance thereof and be bound within the fiber core, the bound signal being illustrated by arrow 131 at the right side of FIG. 40.

The right side of FIG. 40 further illustrates optical signal 37′, this signal corresponding to the portion of the optical signal 37 upstream of the bent region 146 which remains in the fiber core downstream of the bent region. The signal 37 is attenuated to some degree by the bent region 146 thus resulting in attenuated signal 37″. The attenuated portion of the signal 37 is illustrated by attenuation signal arrow 37‴, and though the attenuation 37″ is shown as occurring entirely at the bent region 146, as with light withdrawal, in actuality some of the attenuation 37″ occurs at locations downstream of the bent region 146 (to the right of the bent region) since relatively high ordered core modes, cladding modes, and buffer modes created by the bent region are continuously attenuated as they propagate down the fiber.

The purpose and function of the optical coupler 132 is similar to that of the coupler 32, that is, to optimize reflective and refractive effects at the coupler-buffer interface. Without the coupler 132, substantial amounts of the signal 131 would reflect off the outermost surface of the buffer or be refracted into the fiber 11 at angles outside a cone of acceptance of the fiber core created by the bent region 146. The optical coupler 132 can have a material composition and construction identical to the coupler 32, or can be different therefrom.

As with the coupler 32, the material forming the optical coupler 132 should have optimum transparency characteristics, be capable of making good surface contact with the buffer at buffer coupling area 141, and have an index of refraction which optimizes the light injection, all materials described as being suitable for the coupler 32 being usable for the coupler 132 and being included within the scope of the invention.

A bend region section angle $\psi$ is defined as an arc enclosing the bent region 146, which is determined by the intersection of first and second normal dash lines 147, 148 which are normal to and extend from points 143, 149 where the bent center axis, indicated by dash line 136, of the optical fiber 11 merges with first and second unbent center axes 128, 129 of the optical fiber 11 at opposite sides of the bent region 146.

The relatively sharp bend in the vicinity of the point 149 has been exaggerated for clarity of illustration. The bent region 146 does not necessarily have to be bent about a uniform radius throughout, and in fact the radius of curvature of the bent region 146 can be nonuniform. When the bend radius is nonuniform, optimum results are obtainable if a minimum bend radius R of the bent region 146 occurs at a location 124 disposed downstream of the lens 135. Though theoretically bending the fiber upstream of the lens line of sight, e.g. upstream of point 124, tends to attenuate the signal 37 and does not add to a magnitude of a core cone of acceptance generated by the bent region, bending upstream of the point 126 allows the lens 135 to be positioned closer to the optical fiber 11 and hence is advantageous and preferable. All types of bend radius profiles across the bent region 146, including both uniform and varying profiles, are included within the scope of the invention.

The invention includes a method and means of injecting the optical signal 131 into the optical fiber so as to create an unexpected and surprisingly small attenuation 37″ of the upstream signal 37, the upstream signal having been previously injected into the optical fiber using side or end launch techniques. Attenuations less than 1.0 dB, 0.5 dB, 0.4 dB, 0.3 dB, 0.2 dB, 0.1 dB, 0.06 dB, and even less than 0.04 dB have repetitively been accomplished in accordance with the invention.

It has long been known that a fundamental problem with multiplexed optical fiber bus architectures carrying multiple optical signals generated at multiple positions and injected into the fiber at multiple points is that the means used for injecting any one of a plurality of optical signals into an optical fiber already carrying a pre-existing optical signal therein necessarily attenuates some percentage of the pre-existing optical signal, and that the percentage of attenuation increases with the injection efficiency of the injecting means. A common rule of thumb in the art is that normally there is a close relationship between the injection efficiency and the percentage of attenuation of the pre-existing signal already in the fiber, e.g. a 90% injection efficiency from a source generating a first signal causes 90% of the pre-existing signal to be attenuated, a 50% injection efficiency causes 50% attenuation, a 10% injection efficiency causes 10% attenuation, etc. There are deviations from this rule of thumb depending on the mode distribution of the pre-existing signal, the particular light injection method used, etc., but these deviations have not been very significant in improving this ratio and the rule of thumb continues to be a good best estimate approximation.

According to the invention, it has unexpected and surprisingly been discovered that a side light write tap is capable of producing an injection efficiency which is far higher than a percentage of attenuation induced to a pre-existing signal in the fiber, if the tap 22 is used in a specific manner. Specifically, if N additional means 22, which are similar in construction to a write tap 22 shown in FIG. 40, are disposed between an upstream position where the pre-existing optical signal is injected into the fiber and a downstream position where a Nth+1 write tap injects its Nth+1 signal into the fiber, with N being an integer, even for relatively low values of N, the injection efficiency/attenuation ratio for the Nth+1 tap 22 can be dramatically increased, this ratio becoming extremely large for values of N greater than about 10–15, with significant improvements occurring for values of N as small as 1, 2 and 3. In addition, though the N intervening means 22 produce some loss, the overall average loss per means 22 quickly falls to relatively low values far below the average otherwise obtained by application of other prior art method and means for light injection. The means 22 can comprise a series of additional write taps 22, can comprise a series of bending elements which bend the fiber in a manner similar to the write tap 22 so as to cause mode coupling within the core, or can comprise combinations of such write taps and bending elements. If bending elements are used, additional side write taps which inject light into a side of the fiber at a straight section can be used if disposed in close proximity upstream of a bending element since the bending element will downward couple cladding and/or buffer modes into the fiber core. The use of additional write taps allows for signal multiplexing. Also, the Nth+1 tap can be a tap which injects light into a fiber at a side bend, as illustrated in FIG. 40, or can inject light at a side at a straight fiber section with the fiber bend being immediately downstream thereof to achieve mode coupling.

The invention also includes an apparatus for multiplexing optical signals into an optical fiber so as to reduce an attenuation of a pre-existing optical signal already in the optical fiber, the apparatus comprising N light write taps disposed in series at N optical fiber sections downstream of a point where a pre-existing optical signal is injected into an optical fiber for injecting N optical signals, N being an integer, an Nth tap being disposed downstream of other ones of the N taps, the first tap being disposed upstream of other ones of the N taps, an Nth ratio of an injection efficiency of an Nth injected optical signal to an attenuation of the pre-existing optical signal being more than twice a first ratio of an injection efficiency of a first optical signal injected by the first tap to an attenuation of the preexisting optical signal created by the first tap, the invention further including an apparatus where the Nth ratio is more than three times the first ratio, more than five times the first ratio, alternatively more than ten times the first ratio, alternatively more than fifteen times the first ratio, and even more than thirty times the first ratio. Again, the N taps can inject light at a bend into a fiber, or at a straight section with the fiber subsequently being bent, or combinations thereof.

An unexpected and surprising embodiment of this discovery is that the injection efficiency/attenuation ratio increase applies to any kind of pre-existing optical signal, including those signals side injected into the fiber by any one of the N additional write taps, those signals being referred to as the N additional optical signals, and hence bus architectures utilizing a plurality of side write taps in series is feasible and practicable.

In addition, this discovery is even more surprising in view of the predicted operation of side write taps 22. Specifically, it is known that if an optical signal is to be injected directly into a core of an optical fiber through its buffer, the fiber must be bent to do so, the extent and nature of the bend being referred to herein as the fiber bend radius profile. If the fiber is not bent and it is attempted to inject an optical signal into a core of a fiber through a side thereof, the signal will simply be refracted at opposite sides of the core in a reciprocal manner. Hence, the optical signal will enter one side of the core and exit through an opposite side thereof, and only negligible amounts of randomly scattered light will be injected into a core in this manner.

More specifically, referring to FIG. 41, if an optical signal 60 is injected into the side of optical fiber 11 having a core 61, a cladding 62, and a buffer 63 using an optical coupler 132, the signal 60 forms a finite angle 68 at a core-cladding interface 64, and is refracted toward a normal 66 of the interface. As the signal enters the core, at an opposite second core-cladding interface 65, the signal is refracted away from a parallel normal 67 and enters the cladding 62 at the opposite second side at an angle 69 which equals the angle 68.

Referring to FIG. 42, it is further known that an optical signal 93 can be directly injected into a core of an optical fiber from a side thereof if the fiber is bent in a vicinity of a point where the signal enters the fiber since angle 92 is less than angle 91, and if a fiber bend radius is made small enough, the angle 92 will be smaller than an acceptable angle for the core and hence remain therein as a guided mode. In effect, the bend creates a small cone of acceptance for a signal to be injected such that light falling within this cone of acceptance will be directly injected into the core as bound light in the form of various accepted light modes. However, the accepted modes tend to be predominately higher order modes since the difference in values between the angles 91 and 92 tends to be small due to the extremely small size of the fiber core and cladding.

Just as light can be injected into a fiber at a bend, by reciprocity, it can also be withdrawn, as illustrated in FIG. 43. In other words, a relatively high ordered mode 93', being totally reflected within a fiber core so as to form repetitive angles 92' at the core-cladding interface, is withdrawn at a bend since an angle of incidence 91' formed at an outside section of the bend is greater than the angle 92' and can be made greater than the fiber critical angle, e.g. greater than the angle of the fiber's cone of acceptance.

From this mode analysis, it is readily evident that if a mode 93 is injected into a core of an optical fiber at a bend 101, such a mode would be expected to be withdrawn from the fiber if it encountered a second bend 101' having a bend radius profile similar or identical to the first bend 101 due to reciprocity. Hence, if an optical signal consisting of a group of modes 93 is injected into an optical fiber at a bend 101 having a certain bend radius profile, those modes 93 constituting the signal would be expected to be withdrawn from the fiber at a second similar bend 101' induced in the fiber for multiplexing a second signal into the fiber thereat, and the amount of attenuation of the first signal would be expected to substantially deviate from the rule of thumb set forth above such that an extremely high percentage of attenuation would be expected. In addition, the amount of attenuation would also be expected to exponentially grow in magnitude as the first signal passes through sequential bends similar to bends 101, 101' for sequentially multiplexing additional signals into the fiber, with the expectation that a bus write architecture using write side taps 22 of the type described in series would not be feasible.

Indeed, it has been discovered that though a first optical signal side launched into an optical fiber is substantially attenuated at a bend 101', the amount of attenuation of the signal falls off dramatically as additional bends 101' are encountered such that the injection efficiency/attenuation ratio becomes extremely high, and in fact the first signal is capable of passing through hundreds of bends 101'.

EXAMPLE 7

A graded index optical fiber of the type used in Examples 1–6 had a side of its buffer at a bend connected to a first side light write tap 22 as illustrated in FIG. 40 and the tap was adjusted so as to be able to inject approximately 30–40% of its signal into the fiber as guided modes. The optical power injected into the core was measured at an end of the fiber approximately 2 km from the first write tap. Subsequently, with the first tap left in place, a second write tap identical to the first was disposed on a side of the fiber 10 m from the first write tap, and adjusted the same as the first write tap so as to be able to inject about 30–40% of its signal into the fiber. With the second write tap light source turned off, the attenuation of the first optical signal caused by the second write tap was determined by end light detection. Next, the second write tap was removed and replaced with a first write tap simulator which created an optical fiber bend radius profile similar to that of the second write tap such that the intensity of the first optical signal measured at the end of the fiber with the first simulator in place exactly duplicated that caused by the second write tap. Subsequently, with the first simulator left in place the second write tap was reattached to the fiber 20 m from the first write tap and adjusted as before and in its off state, the combined attenuation of the first optical signal caused by the first simulator and the second write tap was again determined. The second write tap was then replaced with a second simulator as before such that the second simulator attenuated the first optical signal in a manner identical to the second tap at the 20 meter location, and the second tap was then reattached to the optical fiber 30 meters from the first write tap. This procedure was repeated by sequentially moving the second write tap in 10 meter increments along the optical fiber, noting the additional attenuation caused thereby on the first optical signal after passing through all preceding simulators, replacing the second write tap with a new simulator which duplicated the noted attenuation, and reattaching the second write tap to the optical fiber at an additional location located 10 meters further from the first write tap. The measured intensities of the first optical signal and the attenuation caused by each successive attachment of the second write tap are listed in Table 7, the attenuations being graphed in FIGS. 44 and 45.

TABLE 7

| Tap No. downstream of initial side tap injecting first signal | End Det. intensity of 1st signal (nw) | Non-cum loss of 1st signal (dB) |
|---|---|---|
|  | 73,400 | 2.75 |
| 1 | 39,000 | 1.91 |
| 2 | 25,100 | 1.37 |
| 4 | 14,000 | 0.74 |
| 5 | 11,800 | 0.72 |
| 6 | 10,000 | 0.51 |
| 7 | 8,900 | 0.57 |
| 8 | 7,800 | 0.47 |
| 9 | 7,000 | 0.39 |
| 10 | 6,400 | 0.28 |
| 11 | 6,000 | 0.30 |
| 12 | 5,600 | 0.32 |
| 13 | 5,200 | 0.08 |
| 14 | 5,100 | 0.17 |
| 15 | 4,900 | 0.14 |
| 16 | 4,750 | 0.14 |
| 17 | 4,600 | 0.14 |
| 18 | 4,450 | 0.15 |
| 19 | 4,300 | 0.15 |
| 20 | 4,150 | 0.14 |
| 21 | 4,020 | 0.13 |
| 22 | 3,900 | 0.16 |
| 23 | 3,760 | 0.12 |
| 24 | 3,660 | 0.12 |
| 25 | 3,560 | 0.12 |
| 26 | 3,460 | 0.10 |
| 27 | 3,380 | 0.10 |
| 28 | 3,300 | 0.08 |
| 29 | 3,240 | 0.09 |
| 30 | 3,170 | 0.11 |
| 31 | 3,090 | 0.11 |
| 32 | 3,010 | 0.10 |
| 33 | 2,940 | 0.07 |
| 34 | 2,890 | 0.05 |
| 35 | 2,860 | 0.05 |
| 36 | 2,830 | 0.06 |
| 37 | 2,790 | 0.11 |
| 38 | 2,720 | 0.05 |
| 39 | 2,690 | 0.08 |
| 40 | 2,640 | 0.08 |
| 41 | 2,590 | 0.07 |
| 42 | 2,550 | 0.09 |
| 43 | 2,500 | 0.09 |
| 44 | 2,450 | 0.07 |
| 45 | 2,410 | 0.09 |
| 46 | 2,360 | 0.13 |
| 47 | 2,290 | 0.08 |
| 48 | 2,250 | 0.10 |
| 49 | 2,200 | 0.10 |
| 50 | 2,150 | 0.12 |
| 51 | 2,090 | 0.11 |
| 52 | 2,040 | 0.11 |
| 53 | 1,990 | 0.11 |
| 54 | 1,940 | 0.09 |
| 55 | 1,900 | 0.09 |
| 56 | 1,780 | no tap |
| 57 | 1,750 | 0.07 |
| 58 | 1,700 | 0.13 |
| 59 | 1,650 | 0.13 |
| 60 | 1,610 | 0.11 |
| 61 | 1,550 | 0.16 |
| 62 | 1,500 | 0.14 |
| 63 | 1,470 | 0.09 |
| 64 | 1,400 | 0.21 |
| 65 | 1,350 | 0.16 |
| 66 | 1,310 | 0.13 |
| 67 | 1,270 | 0.13 |
| 68 | 1,230 | 0.14 |
| 69 | 1,200 | 0.11 |
| 70 | 1,180 | 0.07 |
| 71 | 1,160 | 0.07 |
| 72 | 1,120 | 0.15 |
| 73 | 1,080 | 0.16 |
| 74 | 1,050 | 0.12 |
| 75 | 1,036 | 0.06 |
| 76 | 1,016 | 0.08 |
| 77 | 998 | 0.08 |
| 78 | 968 | 0.13 |
| 79 | 948 | 0.09 |
| 80 | 930 | 0.08 |
| 81 | 915 | 0.07 |
| 82 | 889 | 0.13 |
| 83 | 874 | 0.07 |
| 84 | 860 | 0.07 |
| 85 | 840 | 0.10 |
| 86 | 820 | 0.10 |
| 87 | 805 | 0.08 |
| 88 | 790 | 0.08 |
| 89 | 770 | 0.11 |
| 90 | 755 | 0.09 |
| 91 | 735 | 0.12 |
| 92 | 725 | 0.06 |
| 93 | 705 | 0.12 |
| 94 | 695 | 0.06 |
| 95 | 685 | 0.06 |
| 96 | 675 | 0.06 |
| 97 | 670 | 0.03 |
| 98 | 660 | 0.07 |
| 99 | 655 | 0.08 |
| 100 | 645 | 0.07 |
| 101 | 635 | 0.07 |
| 102 | 625 | 0.07 |
| 103 | 610 | 0.11 |
| 104 | 600 | 0.07 |
| 105 | 590 | 0.07 |
| 106 | 580 | 0.07 |
| 107 | 572 | 0.06 |
| 108 | 568 | 0.03 |
| 109 | 564 | 0.03 |
| 110 | 559 | 0.04 |
| 111 | 549 | 0.08 |
| 112 | 544 | 0.04 |

As example 7 illustrates, an attenuation of 2.75 dB (46.9%) to the first optical signal was created by the first position of the second write tap having an injection efficiency capability of 30–40%. The second position of the second write tap created an additional 1.91 dB attenuation (35.6%) of the first optical signal. The first optical signal attenuations caused by progressive further downstream second write tap positions decreased dramatically, with an average attenuation of less than 0.1 dB (2.28%) occurring after the first 25 second write tap positions, with the attenuation often being less than 0.08 dB (1.83%), 0.06 dB (1.37%), and 0.04 dB (0.97%). In addition, the beneficial effect of the relatively far downstream positions of the second write tap far outweighed the relatively high attenuations caused by upstream positions, as evidenced by the relatively low average attenuation of 0.199 dB (4.49%).

Four further experiments were done to confirm the results of example 7, two with the first write tap injecting the first signal to be attenuated with an LED, and two with a laser, and each experiment was terminated after reattaching the second real write tap twenty-four times to the fiber since all experimental results were consistent with those of Example 7.

EXAMPLE 8

An additional experiment was done using only simulators to further confirm the results of Example 7. After evaluating the bend radius profiles of the last 20 or so write simulators on the optical fiber in Example 7, 100 metal simulators were manufactured, each simulator having a constant bend radius of 3.84 mm which extended over a 30° sector angle and hence were believed to be quite stable and identical in function with one another. A first side light write tap like that used in Example 7 was attached to a graded index fiber of the type of the previous examples so as to inject a first optical signal into the optical fiber by passing the signal through the optical fiber buffer, and the signal intensity was measured at an end of the optical fiber 1.1 km away from the first light write tap. Subsequently, the simulators were attached in 10 meter intervals onto the optical fiber from the first light write tap, and the intensity of the first optical signal was measured subsequent to the attachmant of each simulator by end detection techniques, the results being tabulated in Table 8 and illustrated in FIGS. 46, 47.

TABLE 8

| Simulator Number | End Det. Power (nw) | Cum. Total Loss (dB) | Non-cum Total loss (dB) |
| --- | --- | --- | --- |
| 0 | 30,300.0 | 0.00 | 0.00 |
| 1 | 11,700.0 | 4.13 | 4.13 |
| 2 | 10,800.0 | 4.48 | 0.35 |
| 3 | 9,500.0 | 5.04 | 0.56 |
| 4 | 8,850.0 | 5.34 | 0.31 |
| 5 | 6,500.0 | 6.69 | 1.34 |
| 6 | 3,950.0 | 8.85 | 2.16 |
| 7 | 3,440.0 | 9.45 | 0.60 |
| 8 | 2,220.0 | 11.35 | 1.90 |
| 9 | 1,420.0 | 13.29 | 1.94 |
| 10 | 914.0 | 15.20 | 1.91 |
| 11 | 798.0 | 15.79 | 0.59 |
| 12 | 746.0 | 16.09 | 0.29 |
| 13 | 500.0 | 17.82 | 1.74 |
| 14 | 400.0 | 18.79 | 0.97 |
| 15 | 304.0 | 19.99 | 1.19 |
| 16 | 257.0 | 20.72 | 0.73 |
| 17 | 232.0 | 21.16 | 0.44 |
| 18 | 196.0 | 21.89 | 0.73 |
| 19 | 182.0 | 22.21 | 0.32 |
| 20 | 162.0 | 22.72 | 0.51 |
| 21 | can't locate | | |
| 22 | 151.0 | 23.02 | 0.30 |
| 23 | 140.0 | 23.35 | 0.33 |
| 24 | 126.0 | 23.81 | 0.46 |
| 25 | 113.0 | 24.28 | 0.47 |
| 26 | 112.3 | 24.31 | 0.03 |
| 27 | 111.5 | 24.34 | 0.03 |
| 28 | 106.5 | 24.54 | 0.20 |
| 29 | 97.0 | 24.95 | 0.41 |
| 30 | 90.1 | 25.27 | 0.32 |
| 31 | 86.8 | 25.43 | 0.16 |
| 32 | 82.5 | 25.65 | 0.22 |
| 33 | 80.7 | 25.75 | 0.10 |
| 34 | 80.8 | 25.74 | −0.01 |
| 35 | 75.5 | 26.03 | 0.629 |
| 36 | 73.0 | 26.18 | 0.15 |
| 37 | 70.8 | 26.31 | 0.13 |
| 38 | 70.0 | 26.36 | 0.05 |
| 39 | 69.0 | 26.43 | 0.06 |
| 40 | 66.2 | 26.61 | 0.18 |
| 41 | 63.5 | 26.79 | 0.18 |
| 42 | 59.0 | 27.11 | 0.32 |
| 43 | 61.3 | 26.94 | −0.17 |
| 44 | 59.3 | 27.08 | 0.14 |
| 45 | 57.8 | 27.20 | 0.11 |
| 46 | 56.0 | 27.33 | 0.14 |
| 47 | 53.6 | 27.52 | 0.19 |
| 48 | 52.1 | 27.65 | 0.12 |
| 49 | 53.0 | 27.57 | −0.07 |
| 50 | 55.8 | 27.35 | −0.22 |
| 51 | 55.2 | 27.40 | 0.05 |
| 52 | 53.8 | 27.51 | 0.11 |
| 53 | 52.6 | 27.60 | 0.10 |
| 54 | 52.0 | 27.65 | 0.05 |
| 55 | 51.0 | 27.74 | 0.08 |
| 56 | 49.8 | 27.84 | 0.10 |
| 57 | 48.5 | 27.96 | 0.11 |
| 58 | 47.2 | 28.08 | 0.12 |
| 59 | 45.8 | 28.21 | 0.13 |
| 60 | 45.2 | 28.26 | 0.06 |
| 61 | 44.7 | 28.31 | 0.05 |
| 62 | 44.5 | 28.33 | 0.02 |
| 63 | 43.6 | 28.42 | 0.09 |
| 64 | 42.7 | 28.51 | 0.09 |
| 65 | 42.4 | 28.54 | 0.03 |
| 66 | 41.4 | 28.64 | 0.10 |
| 67 | 41.0 | 28.69 | 0.04 |
| 68 | 41.5 | 28.63 | −0.05 |
| 69 | 41.3 | 28.65 | 0.02 |
| 70 | 41.0 | 28.69 | 0.03 |
| 71 | 40.3 | 28.76 | 0.07 |
| 72 | 40.0 | 28.79 | 0.03 |
| 73 | 39.8 | 28.82 | 0.02 |
| 74 | 39.5 | 28.85 | 0.03 |
| 75 | 38.8 | 28.93 | 0.08 |
| 76 | 38.2 | 28.99 | 0.07 |
| 77 | 38.2 | 28.99 | 0.00 |
| 78 | 37.9 | 29.03 | 0.03 |
| 79 | 37.7 | 29.05 | 0.02 |
| 80 | 35.8 | 29.28 | 0.22 |
| 81 | 35.8 | 29.28 | 0.00 |
| 82 | 34.6 | 29.42 | 0.15 |
| 83 | 34.4 | 29.45 | 0.03 |
| 84 | 34.0 | 29.50 | 0.05 |
| 85 | 34.0 | 29.50 | 0.00 |
| 86 | 33.3 | 29.59 | 0.09 |
| 87 | 32.5 | 29.70 | 0.11 |
| 88 | 31.8 | 29.79 | 0.09 |
| 89 | 31.8 | 29.79 | 0.00 |
| 90 | 32.1 | 29.75 | −0.04 |
| 91 | 32.6 | 29.68 | −0.07 |
| 92 | 32.5 | 29.70 | 0.01 |
| 93 | 32.0 | 29.76 | 0.07 |
| 94 | 32.0 | 29.76 | 0.00 |
| 95 | 32.0 | 29.76 | 0.00 |
| 96 | 31.0 | 29.90 | 0.14 |
| 97 | 30.0 | 30.04 | 0.14 |
| 98 | 30.0 | 30.04 | 0.00 |
| 99 | 30.0 | 30.04 | 0.00 |
| 100 | 30.0 | 30.04 | 0.00 |

The simulated results of Example 8 confirm those found in the prior experiments; that is, extremely high injection efficiency/attenuation ratios are obtainable by the invention.

Further experiments were done to analyze the fiber mode volume as a function of the number of real and simulated write taps, as detailed in Examples 9 and 10.

EXAMPLE 9

A source side real write tap was attached to a graded index fiber of the type used in the previous examples, and with no additional write taps attached to the fiber, the point light intensity distribution across a diameter of the fiber was measured with a near field pattern analyzer at an end of the fiber 1.1 km from the source write tap to analyze a source signal injected by the source tap. Thereafter, a "first" real write tap was attached to the fiber 10 m from the source tap so as to create a bend radius profile appropriate for injecting another optical signal, and the point light intensity distribution of the source signal (or "pre-existing" signal) was again measured. Then, second, third, fourth, fifth and sixth real write taps were sequentially attached to the fiber at intervals of 10 m so as to create additional bend radius profiles appropriate for injecting further signals, and the point light intensity distributions of the source signal were sequentially measured. The measured point light intensity distributions are illustrated in FIGS. 48-54. Subsequently, these measured point light intensity distributions were integrated over the cross-sectional area of the core to determine the modal energy intensity distribution in the core, and the calculated energy intensity distributions are illustrated in FIGS. 55-61, respectively.

In each of FIGS. 48-61, a pair of vertical lines disposed on opposite sides of a center of the core are illustrated, a core area between these lines representing the center core region 94, and a core area outside these lines representing the outer core annulus 96, as illustrated in FIG. 25, and previously explained with regard to FIGS. 11-24 and 26-37. The ratio between the average point light intensity in the annulus and center core region, with the center core region average intensity normalized to 1, are illustrated in FIGS. 48-54, and tabulated in Table 9. In each of FIGS. 55-61, the average energy in the central core region and annulus was calculated, and these values are illustrated in FIGS. 55-61 and tabulated in Table 9.

EXAMPLE 10

To determine if the use of write simulators accurately simulate the effect of real write taps, Example 9 was repeated by sequentially attaching six write simulators at 10 m intervals downstream from a source real write tap which side launched a source optical signal into a graded index fiber of the type previously used, and the sequential measured point light intensity distributions and normalized averages thereof are illustrated in FIGS. 62-67, with the normalized averages being tabulated in Table 9. Again, these measured point light intensity distributions were integrated over the cross sectional area of the core to determine the modal energy intensity distribution in the core, and the integrated energy distributions are illustrated in FIGS. 68-73. The normalized average energy in the core center region and outer annulus are also shown in FIGS. 68-73, and are tabulated in Table 9.

TABLE 9

| Tap & Sim No. | Ave Pt. Lt. Int. Dist. Ratio B/W Core Annulus & Center Region of ( :1) | | Percent Energy in Center Region for: | | Percent Energy in Core Annulus for: | |
|---|---|---|---|---|---|---|
| | Real Tap | Sim | Real Tap | Sim | Real Tap | Sim |
| 0 | 0.67 | 0.67 | 38.43 | 38.43 | 61.56 | 61.56 |
| 1 | 0.55 | 0.55 | 43.58 | 43.2 | 56.41 | 56.79 |
| 2 | 0.47 | 0.49 | 47.24 | 46.31 | 52.75 | 53.68 |
| 3 | 0.38 | 0.41 | 52.93 | missing | 47.86 | missing |
| 4 | 0.31 | 0.27 | 57.44 | 60.3 | 42.55 | 39.69 |
| 5 | 0.29 | 0.26 | 58.72 | 61.38 | 41.27 | 38.61 |
| 6 | 0.25 | 0.25 | 62.17 | 61.94 | 37.82 | 38.85 |

By comparing FIGS. 49-54 with FIGS. 62-67, and FIGS. 56-61 with FIGS. 68-73, and by studying table 9, and considering the effects of experimental error, it was found that the simulators accurately simulated the effect of real write taps, and in particular the effect thereof on a preexisting source signal in an optical fiber. Table 8 further establishes that after only 6 real write taps disposed downstream from a source write tape generating a source signal, the source signal, which originally was extremely high in outermost mode density and hence prone to excessively high attenuation by side light injection techniques, becomes relatively low in outermost mode density so as to allow minimal additional attenuation of the source signal by write taps further downstream, as verified by Examples 7 and 8.

Though the invention of minimizing attenuation of a pre-existing source signal while injecting further signals into an optical fiber has heretofore been described with reference to a side launched source signal, the invention is equally applicable to an end launched source signal as well. Since light can be injected into a fiber using a bend radius profile 146 the same as or similar to the bend radio profile 46 for withdrawing light, the description of the attenuation of an end launched optical signal being repetitively tapped by read taps set forth above with reference to FIGS. 11-37 confirms that progressive write taps will induce a progressively smaller attenuation on an end launched signal as they do to a side launched signal. Accordingly, write taps 22 disposed in series will modify an energy distribution of an end launched source signal so as to decrease an of outermost modes in the fiber susceptible of being attenuated at a bend to sufficiently low enough values such that unexpected and surprisingly small attenuations of the source signal will be created by additional write taps 22.

Hence, the invention includes a method and means for multiplexing an optical signal at a first location into an optical fiber so as to reduce an attenuation caused by the write tap at the first location of a pre-existing, optical signal in the optical fiber. The attenuation is reduced by disposing N means for modifying an energy distribution of the pre-existing optical signal within the optical fiber upstream of the first location so as to reduce an integrated energy ratio between an outermost 96 and an innermost 94 section of a core of the optical fiber in a vicinity of the first location, N being an integer, the N means preferably being side write taps of the invention which produces the additional advantage of multiplexing further optical signals into the optical fiber therewith. Hence, the first light write tap injects or multiplexes its optical signal into an optical fiber section through a side of the optical fiber at the first location, and preferably through a buffer at the first optical fiber section such that an attenuation of the pre-existing optical signal created by the light write tap is less than an attenuation of the pre-existing signal if the N means were not used to modify the integrated energy distribution of the pre-existing signal, the improvement being as great as a factor of 3, 5, 10, 15 and even better than 30.

The invention further includes a method and means for multiplexing an optical signal into an optical fiber so as to reduce an attenuation of a pre-existing signal already in the optical fiber, the method and means including the use of N light write taps disposed in series at N optical fiber sections downstream of a position where a pre-existing optical signal is injected into the optical fiber, the N light write taps injecting first through N optical signals into the optical fiber respectively through a side thereof, and preferably through a buffer of the optical fiber section, N being an integer, an Nth one of the write taps having an Nth optical signal injection efficiency/pre-existing optical signal attenuation ratio twice an Nth optical signal injection efficiency/pre-existing optical signal attenuation ratio of the first write tap. In other words, an Nth ratio of an injection efficiency of the Nth optical signal to an attenuation of the pre-existing optical signal measured in percent actually created by the Nth light write tap is more than twice a first ratio of an injection efficiency of the first optical signal to an attenuation of the pre-existing optical signal measured in percent. The discovery and invention is that the side light write taps of the invention are unexpectedly and surprisingly more efficient in injecting optical signals into an optical fiber so as to produce minimal attenuations of a preexisting optical signal therein than has heretofore been previously expected, and that the surprisingly low attenuations of the pre-existing signal generated by even a first light write tap are dramatically improved by yet further light write taps to an extent that even when attenuations as large as 2 or 3 dB are initially caused by the first light write tap, further downstream light write taps similar in construction to the first light write tap have attenuations much smaller than the first light write tap.

FIGS. 73 and 74 illustrate two preferred embodiments of light write taps 22 of the invention. Since these figures are similar to FIGS. 38, 39, FIGS. 73, 74 contain reference numerals increased by 100 to illustrate parameters and components previously described in FIGS. 38, 39. FIG. 73 shows a write tap 22 having a rounded groove 170 having a contour conforming to an outer surface contour of the buffer of the fiber 11. Preferably the surface of the rounded groove 170 is made of a material which couples a minimum amount of a preexisting source signal out of the optical fiber buffer so that any buffer modes created by the bend 146 will have an opportunity to be coupled back into the core as guided modes. To this end, the groove 170 could be made of an optically reflective material, and/or could be made of a material having an index of refraction sufficiently low so as to form a waveguide with the buffer at the bend so that the preexisting signal is not unduly attenuated.

Groove 170 further has a "window" therein at the coupling area 141 whereat the optical coupler 132 confronts and contacts the bend region 146 of the optical fiber 11. Preferably a surface shape of the optical coupler 132 confronting the fiber buffer within the groove 70 is substantially the same as the shape of the bent fiber buffer at the coupling area 141 to minimize microbending stresses induced in the fiber 11.

The embodiment of FIG. 74 utilizes a V groove 171 rather than the rounded groove 170 of FIG. 73, with the optical coupler 132 protruding within the V-groove 171 at the coupling area 141. Since a bottom 172 of the V-groove contains air which has an index of refraction of about 1, outermost buffer modes induced in a preexisting signal by the bend tend to remain in the fiber, especially if side walls of the groove 171 are made of a non-coupling material, e.g. optically reflective or refractive because of a low index of refraction. Hence these outermost buffer modes of the preexisting signal 37 will only be principally coupled out of the fiber at the coupling area 141, which optimally should be made as small as practicable.

In FIG. 74, the tap 22' includes a short pigtail optical fiber 175 as could the embodiment of FIG. 74 as well as other tap embodiments, first and second ends 176, 177 of the fiber 175 being capable of being connected to an optical fiber 11 in a network 2. As with the read taps, an advantage of the pigtail optical fiber design is factory alignment, a disadvantage being the necessity for fiber connectorizations and losses associated therewith.

Referring back to FIG. 40, a focal point of the lens 135 optimally lies within the fiber core and is so adjusted. However, other preferred embodiments are to set the lens 135 so that its focal point is on one side or another of the fiber core a short distance. Though with these embodiments less efficient injection efficiencies result, a variation in the sensitivity of the tap tends to be smaller and hence more stable. Specifically, if the tap is designed so that the lens 135 and fiber 11 are "in focus", a slight relative movement between the lens and the fiber would result in defocussing and hence a relatively large injection efficiency variation, which could adversely affect detection equipment. However, if the tap is designed so that the lens 135 and the fiber 11 are normally "out of focus," then slight relative movements would result in a less dramatic change in the injection efficiency. Relative movements could be caused by temperature changes, vibrations, material ageing, etc.

SYSTEMS

FIG. 4 illustrates a communication distribution bus network 1 which includes a two-way communication distribution bus network 2 and a one-way communication distribution bus network 5. The two-way network 2 is suitable for any use requiring two-way information transfer, such as a telephone system which is intended to provide any combination of two-way audio, video or data transmission. The one-way network 5 is suitable for any use requiring only one-way information transfer, such as video reception, e.g. television, in particular cable television, and though not illustrated in FIG. 1, a one-way network which only writes, rather than reads as does network 5, is also included within the scope of the invention, such an embodiment being useful where it is desired for a plurality of subscribers to input information to a central terminal, and there is no need for the subscribers to obtain information from the terminal.

According to the embodiment of FIG. 4, the network 1 services a plurality of stations 10. Each station 10 can comprise a neighborhood, plant, office, home, etc., and as illustrated, any particular station 10 can further serve a plurality of substations 6, e.g., again a neighborhood, plant, office, home, etc., and each particular substation can in turn utilize more than one communication subscriber line 7, 9. For example, a substation 6 could comprises a local area network 2' servicing a plurality of users 6', or simply be a home needing only one or a few telephone lines.

The network 2 includes a write optical fiber 11 and a read optical fiber 12, with the network 5 including read optical fiber 13. Though the optical fibers 12, 13 of the network 1 could comprise a single optical fiber with head end 16 for the network 5 being directly connected to head end 8 of the network 2 and such is included within the scope of the invention, separate networks 2, 5 and associated head ends 8, 16 and fibers 12, 13 are illustrated for ease of illustration of various aspects of the invention. Also, though the optical fibers 11, 12 of the network 2 could comprise a single optical fiber and such is included within the scope of the invention, in the embodiment of FIG. 4, the optical fibers 11, 12 are shown as comprising separate optical fibers interconnected by a head end 8 which includes an amplifier 14 and intelligence means 17 which comprises a central processing unit. Line in communication line 18 and line out communication line 20 provide means for the network 2, communication between the stations 10 or substations 6, 6[1] within the network 2 being possible without the need for use of lines 18, 20, though the use of such lines may be desirable in some embodiments if, for example, the intelligence means 17 is to be located remote from the network 2, rather than as an integral part thereof. The lines 18, 20 can comprises electrical or optical fiber cables, and the same is true for the substation or subscriber lines 7, 9, and all such variations are included within the scope of the invention. Each station 10 accesses the write optical fiber 11 and the read optical fiber 12 via a write tap 22 and a read tap 23, and in the network 5 access to the optical fiber 13 by the stations 10 is via additional read taps 23, which can be identical to or slightly modified from the design of the light read taps 23 as optimization dictates.

Since bandwidth of optical fibers is generally much greater than the continuous bandwidth requirement of any one subscriber line 7 or any one station 10 especially with the use of the read taps 23 of the invention, a variety of access control schemes can be utilized according to the invention so that information is received from the network 2 and supplied to the network 2 by each line 7 in a manner sufficient to provide essentially continuous access to the network 2.

A preferred access control scheme of the invention comprises a varied time multiplexing control scheme. According to such a scheme, assuming that the bandwidth capability of the network 2 is more than 1,000 times the continuous bandwidth required by any subscriber line 9 when in continuous use, when any given subscriber line 9 needs access to the network 2, the central processing unit 17 can allocate to that line 9 any one of 1,000 time slots which sequentially exist in time and are controlled by a clock pulse. With such a control scheme, assuming 1,000 subscriber lines 9 are accessing the network 2 simultaneously, each line 9 writes into the network 2 and reads from the network 2 sequentially for very short periods of time, with each line 9 accessing the fiber continuously in an intermittent manner over time. With such a control scheme, it can readily be understood that more than 1,000 subscriber lines 9 could be adequately served by the network 2 since the likelihood of all the lines 9 requiring access to the network 2 at the same time in many applications would be extremely small, and hence 10,000 or as many as 100,000 lines 9 could be adequately served by the network 2, the exact number depending on the estimated percent time usage of each line 9 of the network and the criticality of any given line 9 being denied access, such as by a busy signal, due to all the time slots being used by other lines 9.

In FIG. 4, it is seen that one of the substations 6 can actually include a local area network 2' which can be similar to, or functionally identical to the network 2, and it can readily be realized that the possible architectures made possible by the invention are virtually unlimited by interconnection of various types of the networks 2, 2', such that entire areas or continents could be served by the invention. Of course the network 2' does not have to incorporate any aspect of the invention and be compatible with the network 2 since interfaces between networks 2, 2' is readily accomplished by lines 7.

FIGS. 77, 78 and 79 illustrate various topologies useful with the invention, FIG. 77 illustrating a line topology, FIG. 78 illustrating a branch topology, and FIG. 79 illustrating a line and branch topology incorporated in a star topology.

Referring in particular to FIG. 77, it is seen that the networks 2, 5 can be disposed in a topological manner in a continuous line type topology so as to run through neighborhoods and cities, whereas FIG. 78 illustrates a branch topology wherein optical fibers 11, 12 and 13 are branched off using branch couplers 101, which can be any type of conventional coupler, such as a biconic coupler or even a side light withdrawal coupler. In the embodiment of 79, a star coupler 104 is utilized for creating a plurality of branches 103 which extend from a common star coupler 104, star couplers being well known in the art. The various branches 103 extending from the star coupler can utilize further star coupler topologies, branch topologies, or line topologies, as illustrated. The particular topology chosen preferably is optimized to minimize an overall length of optical fibers required to serve an area, and is dependent on the layout of the stations 10 within the area.

What is claimed is:

1. A method of increasing bandwidth of a multimode optical fiber capable of transmitting information by supporting light pulses in a plurality of modes, the fiber including a core, a cladding, and a buffer, comprising the steps of:

injecting light pulses into the optical fiber;

withdrawing a portion of the light pulses through the fiber buffer at a first location with a non-destructive light read tap so as to detect predominantly higher order modes;

detecting light withdrawn by the light read tap using a detector thereby obtaining a detected first power level and a first signal on-to-off ratio;

the light pulses being injected into the optical fiber at a modulation frequency in excess of a saturation modulation frequency, the saturation modulation frequency being that frequency whereby the detector would incur a second signal on-to-off ratio which is less than the first signal on-to-off ratio if the light pulses were detected by the detector at an end of the fiber at the first location at the first power level.

2. The method of claim 1, the second signal on-to-off ratio being more than 3 dB lower than the first signal on-to-off ratio.

3. The method of claim 1, the second signal on-to-off ratio being more than 10 dB lower than the first signal on-to-off ratio.

4. The method as claimed in claim 1, further comprising the step of injecting the light pulses into the optical fiber using a laser.

5. The method as claimed in claim 1, further comprising the step of injecting the light pulses into the fiber using a LED.

6. The method as claimed in claim 1, the light pulses being injected into the optical fiber at a wavelength between 750 and 850 nm.

7. The method as claimed in claim 1, the light pulses being injected into the optical fiber at a wavelength between 1250 and 350 nm.

8. The method as claimed in claim 1, the optical fiber having a step refractive index profile.

9. The method as claimed in claim 1, the optical fiber having a graded refractive index profile.

10. The method as claimed in claim 1, a bit error rate resulting from the first signal on-to-off ratio being less than a bit error rate resulting from the second signal on-to-off ratio.

11. An optical fiber distribution network, comprising:
a multimode optical fiber including an optical signal therein representative of information;
a plurality of taps disposed serially on the optical fiber, each tap creating a bend in the fiber having a bend radius and sector angle such that at least part of the optical signal can be withdrawn from the optical fiber by passing the optical signal through a buffer of the fiber at the bend so as to enable detection of the optical signal part withdrawn, a number of the taps and a spacing therebetween being such so as to allow sufficient more regeneration of the optical signal between the taps to allow repetitive detection of the optical signal in the optical fiber by the taps, the taps creating a cumulative sector angle bend in the fiber in excess of 900° and being separated a linear distance along the optical fiber in excess of 300 meters.

12. The network of claim 11, further comprising means for detecting the optical signal part withdrawn by each of the taps.

13. The network of claim 11, each of the taps being separated linearly from adjacent taps along the optical fiber by a distance in excess of 10 meters, a number of the taps exceeding 30.

14. The network of claim 11, each of the taps including an optical coupler and withdrawing the optical signal part through the buffer of the optical fiber at the bend by using the optical coupler.

15. The network of claim 12, the network comprising a telephone distribution system.

16. The network of claim 11, a spacing between the taps being sufficiently large and the taps being constructed such that an average point light intensity ratio between a fiber core annulus and a core center region does not fall below about 0.08:1, the fiber core center region being defined as a centermost section of the core having a diameter equal to a difference between an outside and inside diameter of the fiber core annulus, the fiber core annnulus surrounding the core center region and together with the core center region forming the fiber core.

17. The network of claim 16, the optical fiber comprising a waveguide having a glass core and a glass cladding, the optical fiber being surrounded by the buffer.

18. The network of claim 11, the optical fiber comprising a waveguide having a glass core and a polymer cladding.

19. The network of claim 17, the optical fiber comprising a graded index optical fiber.

20. The network of claim 17, the optical fiber comprising a step index optical fiber.

21. The network of claim 19, each of the taps withdrawing the optical signal part through the fiber buffer at its respective fiber bend by using an optical coupler, and further comprising a pigtail optical fiber and a receiver, the optical signal part from at least one of the taps being withdrawn into the pigtail optical fiber which is connected to the receiver.

22. The network of claim 11, each of the taps creating a bend in the optical fiber having a radius between 2 and 6 millimeters.

23. The network of claim 22, the radius being between 3 and 5 millimeters.

24. The network of claim 11, each of the taps bending the optical fiber about a sector angle between 20° and 90°.

25. The network of claim 11, each of the taps bending the optical fiber about a sector angle between 25° and 60°.

26. A method of distributing information using multimode optical fiber, comprising the steps of:
connecting a plurality of taps serially on the multimode optical fiber, the taps creating a plurality of bends in the optical fiber, each bend having a radius and sector angle such that at least part of the optical signal can be withdrawn from the optical fiber at the bend through a buffer of the fiber so as to enable detection of the optical signal part withdrawn by each tap, the taps creating a cumulative sector angle bend in the optical fiber in excess of 900°, a spacing of the taps along the fiber exceeding a linear distance of 300 meters.

27. The method of claim 26, further comprising means of detecting the optical signal part withdrawn by each of the taps.

28. The method of claim 26, each of the taps being separated linearly from adjacent taps along the optical fiber by a distance in excess of 10 meters, a number of the taps exceeding 30.

29. The method of claim 26, further comprising the step of withdrawing each optical signal part through the buffer of the optical fiber by using an optical coupler.

30. The method of claim 27, the network comprising a telephone distribution system.

31. The method of claim 26, a spacing between the taps being sufficiently large and the taps being constructed such that an average point light intensity ratio between a fiber core annulus and a core center region does not fall below about 0.08:1, the fiber core center region being defined as a centermost section of the core having a diameter equal to a difference between an outside and inside diameter of the fiber core annulus, the fiber core annulus surrounding the core center region and together with the core center region forming the fiber core.

32. The method of claim 31, the optical fiber comprising a waveguide having a glass core and a glass cladding, the optical fiber being surrounded by the buffer.

33. The method of claim 26, the optical fiber comprising a waveguide having a glass core and a polymer cladding.

34. The method of claim 32, the optical fiber comprising a graded index optical fiber.

35. The method of claim 32, the optical fiber comprising a step index optical fiber.

36. The method of claim 34, each of the taps withdrawing the optical signal part through the fiber buffer at its respective fiber bend by using an optical coupler, and further comprising a pigtail optical fiber and a receiver, the optical signal part from at least one of the taps being withdrawn into the pigtail optical fiber which is connected to the receiver.

37. The method of claim 26, each of the taps creating a bend in the optical fiber having a radius between 2 and 6 millimeters.

38. The method of claim 37, the radius being between 3 and 5 millimeters.

39. The method of claim 26, each of the taps bending the optical fiber about a sector angle between 20° and 90°.

40. The method of claim 26, each of the taps bending the optical fiber about a sector angle between 25° and 60°.

41. The network of claim 11, a number of the taps exceeding 50.

42. The network of claim 11, a number of the taps exceeding 100.

43. The network of claim 11, a number of the taps exceeding 150.

44. The network of claim 11, a number of the taps exceeding 200.

45. An optical fiber information distribution network, comprising:
a multimode optical fiber;
a plurality of write taps disposed in series along the fiber, each tap including an optical coupler and creating a bend in the fiber having a bend radius and sector angle such that an optical signal can be injected into the optical fiber by passing the optical signal through the optical coupler and a buffer of the fiber at the fiber bend so as to inject predominantly higher order modes into the fiber, the taps injecting at least two such optical signals into the fiber, each optical signal injected representing information from a telecommunication apparatus.

46. The network of claim 45, further comprising means for detecting the information generated by each telecommunication apparatus.

47. The network of claim 46, the detecting means detecting the optical signal from an end of the optical fiber.

48. The network of claim 45, each of the taps being separated from adjacent taps by a minimum distance of 10 meters.

49. The network of claim 45, the network comprising a telephone network, the apparatus including a plurality of telephones connected to the write taps for injecting telephone signals into the optical fiber.

50. The network of claim 49, the apparatus further including means for transmitting data.

51. The network of claim 45, the taps being ordered sequentially from a first tap located upstream of all the taps to an Nth tap located downstream from all the taps, the first tap injecting a first optical signal, the fiber and the taps being constructed such that a ratio of an injection efficiency of an Nth signal injected by the Nth tap divided by an attenuation percentage induced thereby to the first optical signal to an injection efficicency of a second signal injected by the second tap divided by an attenuation percentage induced thereby to the first optical signal is greater than 2.

52. The network of claim 51, the ratio being greater than 3.

53. The network of claim 51, the ratio being greater than 5.

54. The network of claim 51, the ratio being greater than 15.

55. The network of claim 51, the ratio being greater than 30.

56. The network of claim 53, the Nth tap creating a bend radius profile substantially similar to that created by the second tap.

57. The network of claim 54, the Nth tap creating a bend radius profile substantially similar to that created by the second tap.

58. The network of claim 45, a number of the taps being greater than 5.

59. The network of claim 45, a number of the taps being greater than 10.

60. The network of claim 45, a number of the taps being greater than 15.

61. The network of claim 45, a number of the taps being greater than 30.

62. The network of claim 45, a number of the taps being greater than 50.

63. The network of claim 45, a number of the taps being greater than 100.

64. The network of claim 45, a number of the taps being greater than 150.

65. The network of claim 45, a number of the taps being greater than 200.

66. A method of multiplexing information into a multimode optical fiber, comprising the steps of:
connecting a plurality of write taps serially on the multimode optical fiber, each tap including an optical coupler and creating a plurality of bends in the optical fiber, each bend having a radius and sector angle such that an optical signal can be injected into the optical fiber by passing the signal through the optical coupler and a buffer of the fiber so as to inject predominantly higher order modes into the fiber, the taps injecting at least two such optical signals into the fiber, each optical signal injected represented information from a telecommunication apparatus.

67. The method of claim 66, further comprising the step of detecting the information generated by each telecommunication apparatus.

68. The method of claim 67, the information being detected from an end of the optical fiber.

69. The method of claim 66, each of the taps being separated from adjacent taps by a minimum distance of 10 meters.

70. The method of claim 66, the apparatus including a plurality of telephones connected to the write taps for injecting telephone signals into the optical fiber.

71. The method of claim 70, the apparatus further including means for transmitting data.

72. The method of claim 66, the taps being ordered sequentially from a first tap located upstream of all the taps to an Nth tap located downstream from all the taps, the first tap injecting a first optical signal, the fiber and the taps being constructed such that a ratio of an injection efficency of an Nth signal injected by the Nth tap divided by an attenuation percentage induced thereby to the first optical signal to an injection efficiency of a second signal injected by the second tap divided by an attenuation percentage induced thereby to the first optical signal is greater than 2.

73. The method of claim 72, the ratio being greater than 3.

74. The method of claim 72, the ratio being greater than 5.

75. The method of claim 72, the ratio being greater than 15.

76. The method of claim 72, the ratio being greater than 30.

77. The method of claim 75, the Nth tap creating a bend radius profile substantially similar to that created by the second tap.

78. The method of claim 75, the Nth tap creating a bend radius profile substantially similar to that created by the second tap.

79. The method of claim 66, a number of the taps being greater than 5.

80. The method of claim 66, a number of the taps being greater than 10.

81. The method of claim 66, a number of the taps being greater than 15.

82. The method of claim 66, a number of the taps being greater than 30.

83. The method of claim 66, a number of the taps being greater than 50.

84. The network of claim 45, a number of the taps being greater than 100.

85. The method of claim 66, a number of the taps being greater than 150.

86. The method of claim 66, a number of the taps being greater than 200.

87. An optical fiber distribution network, comprising:
a first multimode optical fiber;
a plurality of write taps disposed in series along the first fiber, each write tap including an optical coupler and creating a bend in the first fiber having a bend radius and sector angle such that an optical signal can be injected into the first fiber by passing the optical signal through the optical coupler and a buffer of the first fiber at the write fiber bend so as to inject predominantly higher order modes into the first fiber, the taps injecting at least two such optical signals into the first fiber, each optical signal injected representing information form a telecommunication apparatus;
a second multimode optical fiber including a further optical signal therein representative of information;
a plurality of read taps disposed serially on the second fiber, each read tap creating a bend in the second fiber having a bend radius and second angle such that at least part of the further optical signal can be withdrawn from the second fiber by passing the further optical signal through a buffer of the second fiber at the read tap bend so as to enable detection of the further optical signal part withdrawn.

88. The network of claim 87, further comprising means for detecting the information generated by each telecommunication apparatus from an end of the first fiber.

89. The network of claim 88, the network comprising a telephone network, the apparatus including a plurality of telephones connected to the read and write taps for injecting telephone signals into the fiber and for withdrawing telephone signals therefrom.

90. The network of claim 87, a number of the read taps and a number of the write taps each being greater than 10.

91. The network of claim 90, the number being greater than 15.

92. The network of claim 90, the number being greater than 30.

93. The network of claim 87, further comprising:
means for injecting the further optical signal into the second multimode optical fiber, a read tap furtherest from the injecting means detecting the further optical signal at its fiber location so as to obtain a detected first power level and a first signal on-to-off ratio;
the further optical being injected into the second optical fiber at a modulation frequency in excess of a saturation modulation frequency being that frequency whereby the furtherest read tap would incur a second signal on-to-off ratio which is less than the first signal on-to-off ratio if the light pulses were detected by the detector at an end of the fiber at the fiber location at the first power level.

94. The network of claim 93, the second signal on-to-off ratio being more than 3 dB lower than the first signal on-to-off ratio.

95. The network of claim 94, the second signal on-to-off ratio being more than 10 dB lower than the first signal on-to-off ratio.

* * * * *

UNITED STATES PATENT AND TRADEMARK OFFICE
CERTIFICATE OF CORRECTION

PATENT NO. : 4,768,854
DATED : September 6, 1988
INVENTOR(S) : Campbell et al

It is certified that error appears in the above-identified patent and that said Letters Patent is hereby corrected as shown below:

Column 5, line 24, delete "(".

Column 26, line 6, delete "care" and insert --core--.

Column 42, line 53, delete "350" and insert --1350--.

Column 43, line 4, delete "more" and insert --mode--.

Column 47, line 15, delete "form" and insert --from--.

Column 48, line 18, after "optical", insert --signal--;

Column 48, line 20, after "frequency", insert -- , the saturation modulation frequency--.

Signed and Sealed this

Twenty-fifth Day of July, 1989

Attest:

DONALD J. QUIGG

Attesting Officer

Commissioner of Patents and Trademarks